US007464057B2

(12) United States Patent
Cole et al.

(10) Patent No.: US 7,464,057 B2
(45) Date of Patent: Dec. 9, 2008

(54) METHOD AND SYSTEM FOR MULTI-CURRENCY ESCROW SERVICE FOR WEB-BASED TRANSACTIONS

(75) Inventors: Alan Cole, Yardley, PA (US); Deborah Bennett, New York, NY (US); Hachadur Hashasian, Cliffside Park, NJ (US)

(73) Assignee: Citibank, N.A., New York, NY (US)

( * ) Notice: Subject to any disclaimer, the term of this patent is extended or adjusted under 35 U.S.C. 154(b) by 1419 days.

(21) Appl. No.: 10/109,782

(22) Filed: Mar. 29, 2002

(65) Prior Publication Data

US 2002/0161707 A1 Oct. 31, 2002

Related U.S. Application Data

(60) Provisional application No. 60/280,182, filed on Mar. 30, 2001.

(51) Int. Cl.
*G06Q 99/00* (2006.01)

(52) U.S. Cl. ............................ 705/42; 705/39; 705/38; 705/37

(58) Field of Classification Search .................. 705/42, 705/37, 38, 39
See application file for complete search history.

(56) References Cited

U.S. PATENT DOCUMENTS

| | | | | |
|---|---|---|---|---|
| 5,426,281 | A | 6/1995 | Abecassis | |
| 5,787,402 | A * | 7/1998 | Potter et al. | 705/37 |
| 6,029,146 | A * | 2/2000 | Hawkins et al. | 705/35 |
| 6,058,379 | A | 5/2000 | Odom et al. | |
| 6,269,348 | B1 | 7/2001 | Pare et al. | |
| 6,829,590 | B1 * | 12/2004 | Greener et al. | 705/38 |
| 6,865,559 | B2 * | 3/2005 | Dutta | 705/75 |
| 7,127,406 | B2 * | 10/2006 | Triola | 705/1 |
| 7,155,409 | B1 * | 12/2006 | Stroh | 705/37 |
| 2001/0037247 | A1 * | 11/2001 | Haseltine | 705/22 |
| 2002/0087461 | A1 * | 7/2002 | Ganesan et al. | 705/39 |
| 2003/0040947 | A1 * | 2/2003 | Alie et al. | 705/7 |

(Continued)

OTHER PUBLICATIONS

Ken Landis, Top 10 bank software growth companies, Feb. 1989, Computers in Banking, vol. 6, No. 2, pp. 26(12).*

(Continued)

*Primary Examiner*—James P. Trammell
*Assistant Examiner*—Behrang Badii
(74) *Attorney, Agent, or Firm*—George T. Marcou; King & Spalding LLP

(57) ABSTRACT

A method and system for escrow service for web-based transactions is web-accessible and accepts registrations from exchanges and/or portal partners. The completion of registration and transactions is allowed to entitled users who access the system via the web. The system maintains an internal banking engine to act as a deal manager, messaging service and accounts sub-ledger and escrows funds entrusted to it. The transaction process is composed of a number of transaction statuses, and reporting of those statuses to users is accomplished online and via web query. The system supports several methods of payment, such as credit cards, authorized Automated Clearing House (ACH) or equivalent direct debit/credit and wire transfer payments, and all funds movements are electronic. The system supports transaction level detail through its banking engine accounts; funds movements from its currency accounts, and escrows funds to currency based escrow accounts. Buyers completing goods/services inspections after delivery initiate settlements.

32 Claims, 44 Drawing Sheets

U.S. PATENT DOCUMENTS

2003/0208440 A1* 11/2003 Harada et al. ................. 705/39
2006/0259418 A1* 11/2006 Feaver et al. .................. 705/37

OTHER PUBLICATIONS

Penny Lunt, At a telecom crossroads, Feb. 1996, ABA banking Journal, 68-69.*

PCT/US02/09567 International Search Report, mailed Mar. 5, 2004.

Preliminary Examination Report for Application No. PCT/US02/09567, dated Oct. 13, 2004.

* cited by examiner

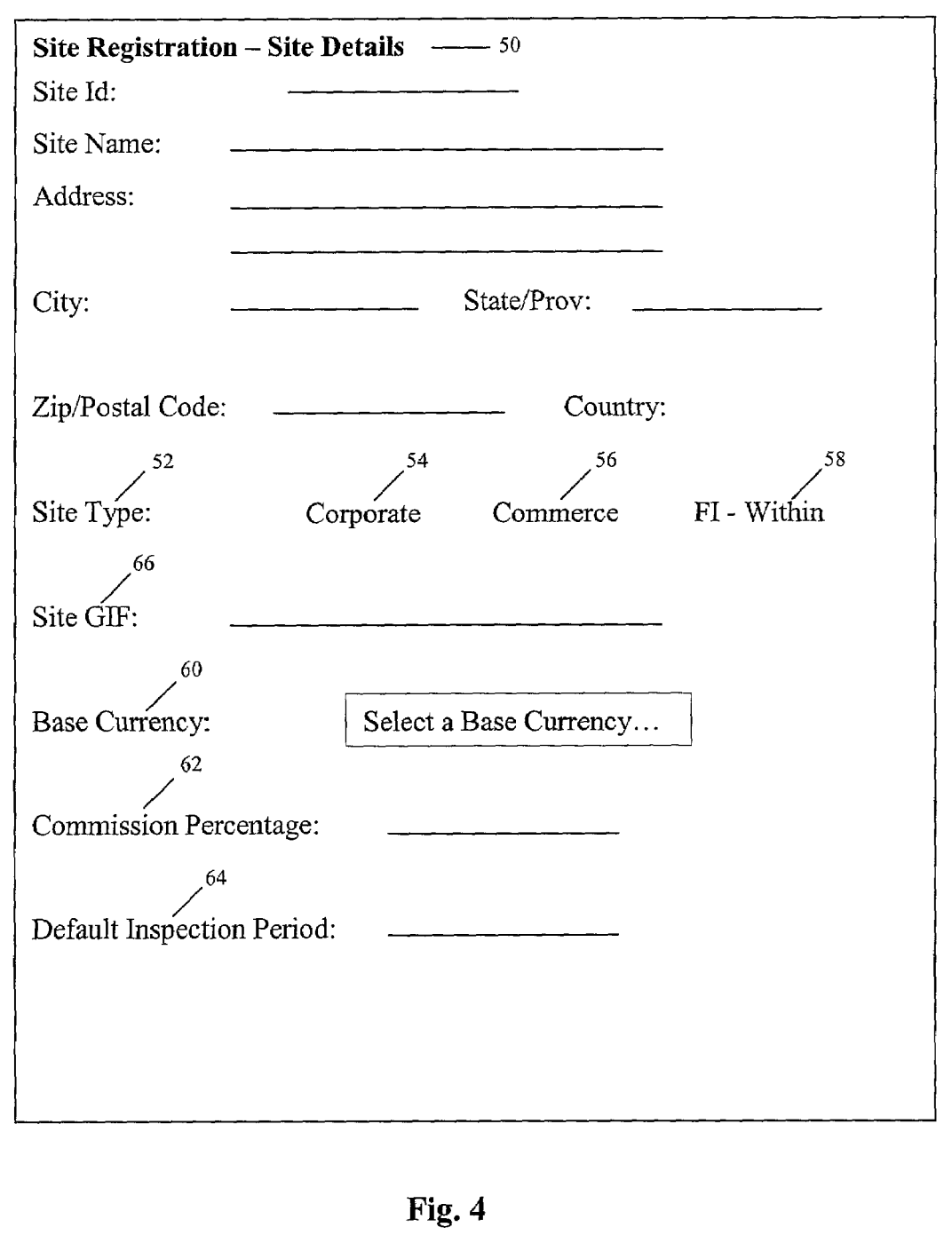

Site Registration – Site Details — 50

Site Id: ______

Site Name: ______

Address: ______

______

City: ______ State/Prov: ______

Zip/Postal Code: ______ Country:

52 54 56 58

Site Type: Corporate Commerce FI - Within

66

Site GIF: ______

60

Base Currency: Select a Base Currency…

62

Commission Percentage: ______

64

Default Inspection Period: ______

Fig. 4

Figure 5:
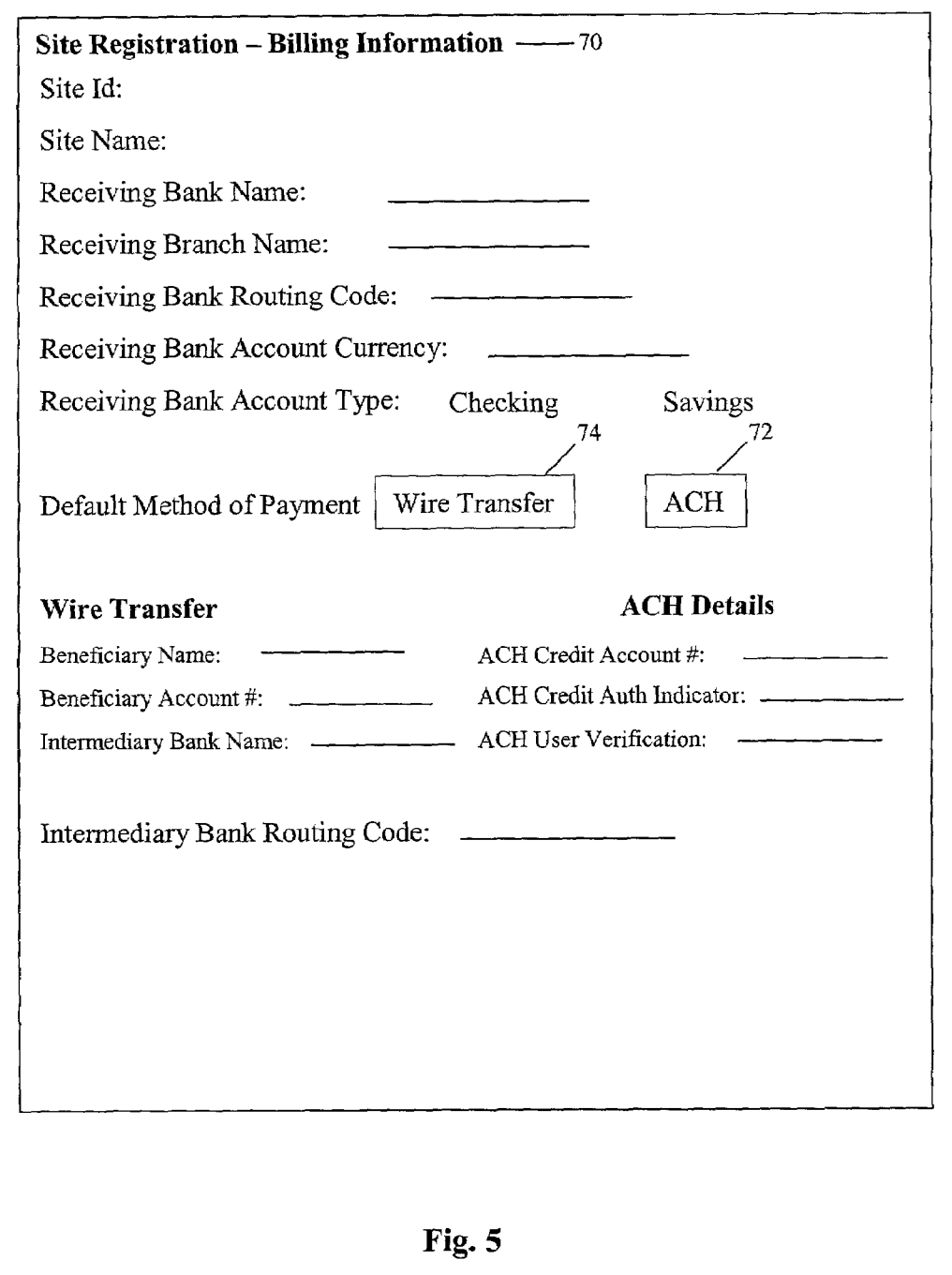

Site Registration – Billing Information —— 70

Site Id:

Site Name:

Receiving Bank Name: __________

Receiving Branch Name: __________

Receiving Bank Routing Code: __________

Receiving Bank Account Currency: __________

Receiving Bank Account Type: Checking Savings 74 72

Default Method of Payment [Wire Transfer] [ACH]

Wire Transfer

Beneficiary Name: __________

Beneficiary Account #: __________

Intermediary Bank Name: __________

ACH Details

ACH Credit Account #: __________

ACH Credit Auth Indicator: __________

ACH User Verification: __________

Intermediary Bank Routing Code: __________

Escrow Services - Netscape citibank escrow service @Powered by Crossmar

Figure 8:
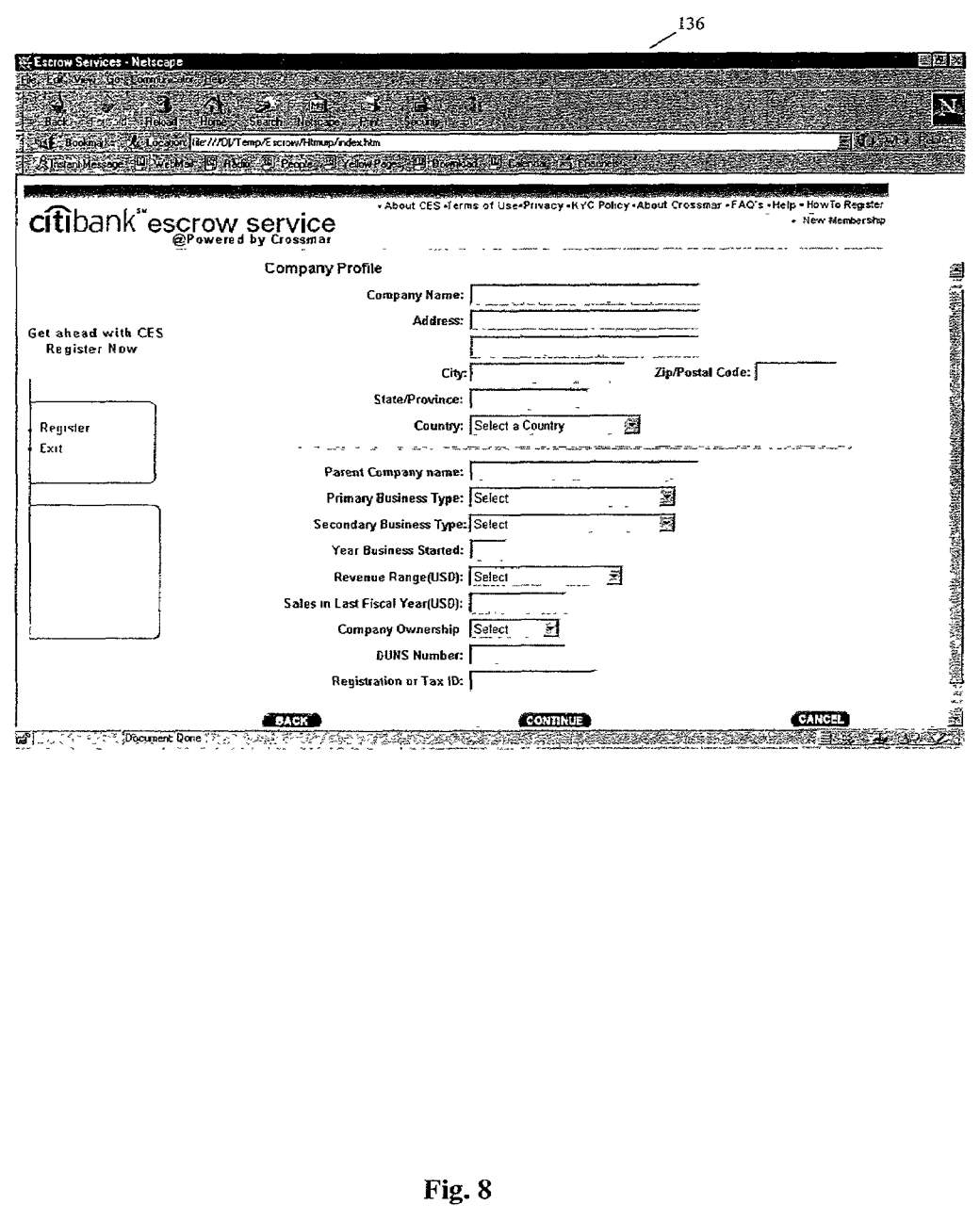

• About CES • Terms of Use • Privacy • KYC Policy • About Crossmar • FAQ's • Help • How To Register • New Membership Get ahead with CES Register Now Register
Exit Company Profile Company Name:
Address:
City:
Zip/Postal Code:
State/Province:
Country: Select a Country
Parent Company name:
Primary Business Type: Select
Secondary Business Type: Select
Year Business Started:
Revenue Range(USD): Select
Sales in Last Fiscal Year(USD):
Company Ownership Select
DUNS Number:
Registration or Tax ID:

BACK CONTINUE CANCEL

Document Done

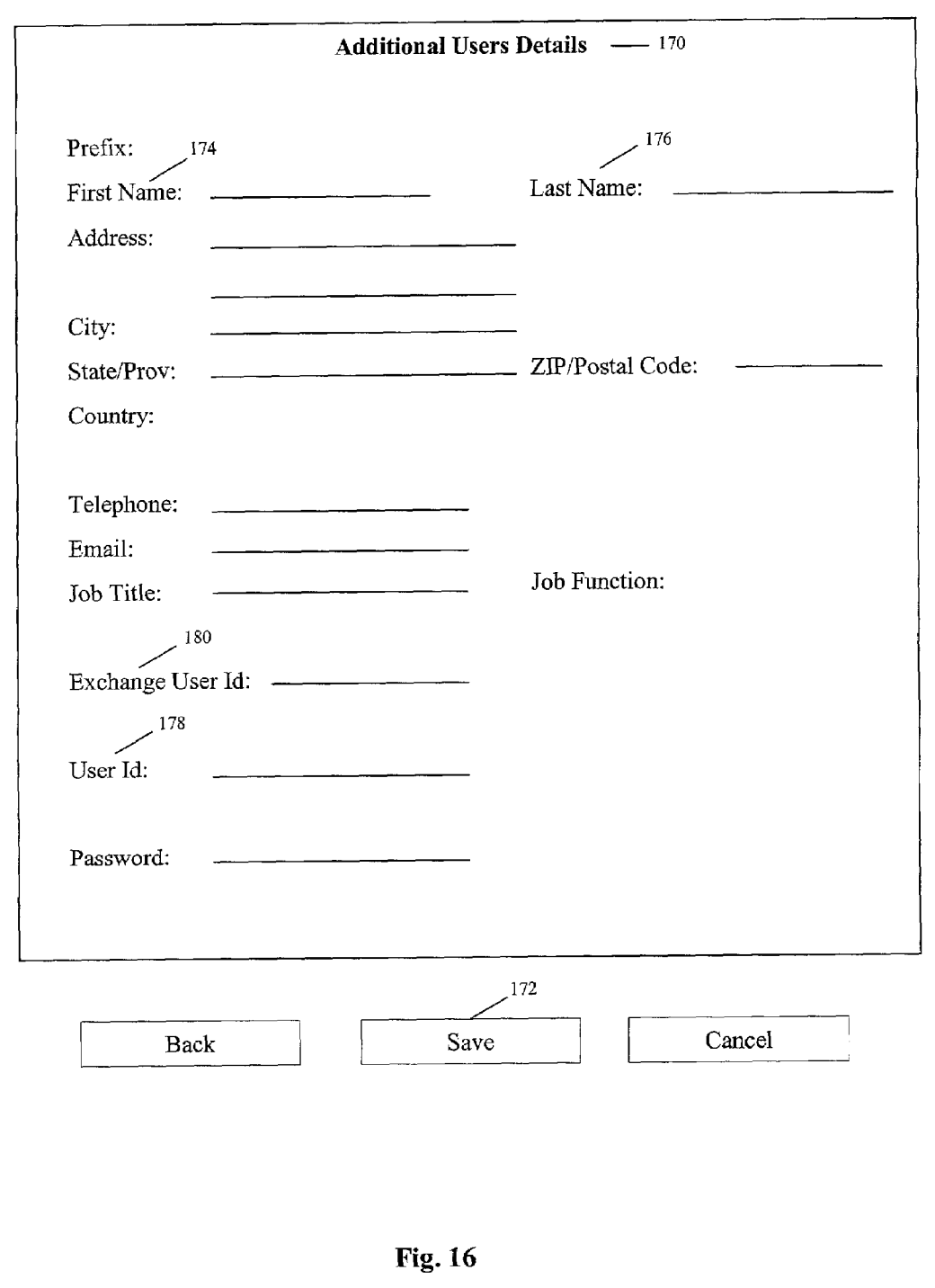

Additional Users Details — 170

Prefix: 174

First Name: ______ 176 Last Name: ______

Address: ______

______

City: ______

State/Prov: ______ ZIP/Postal Code: ______

Country:

Telephone: ______

Email: ______

Job Title: ______ Job Function:

180

Exchange User Id: ______

178

User Id: ______

Password: ______

172

Back | Save | Cancel

Fig. 16

Pre Validated Member Registration Use Case – Escrow Service

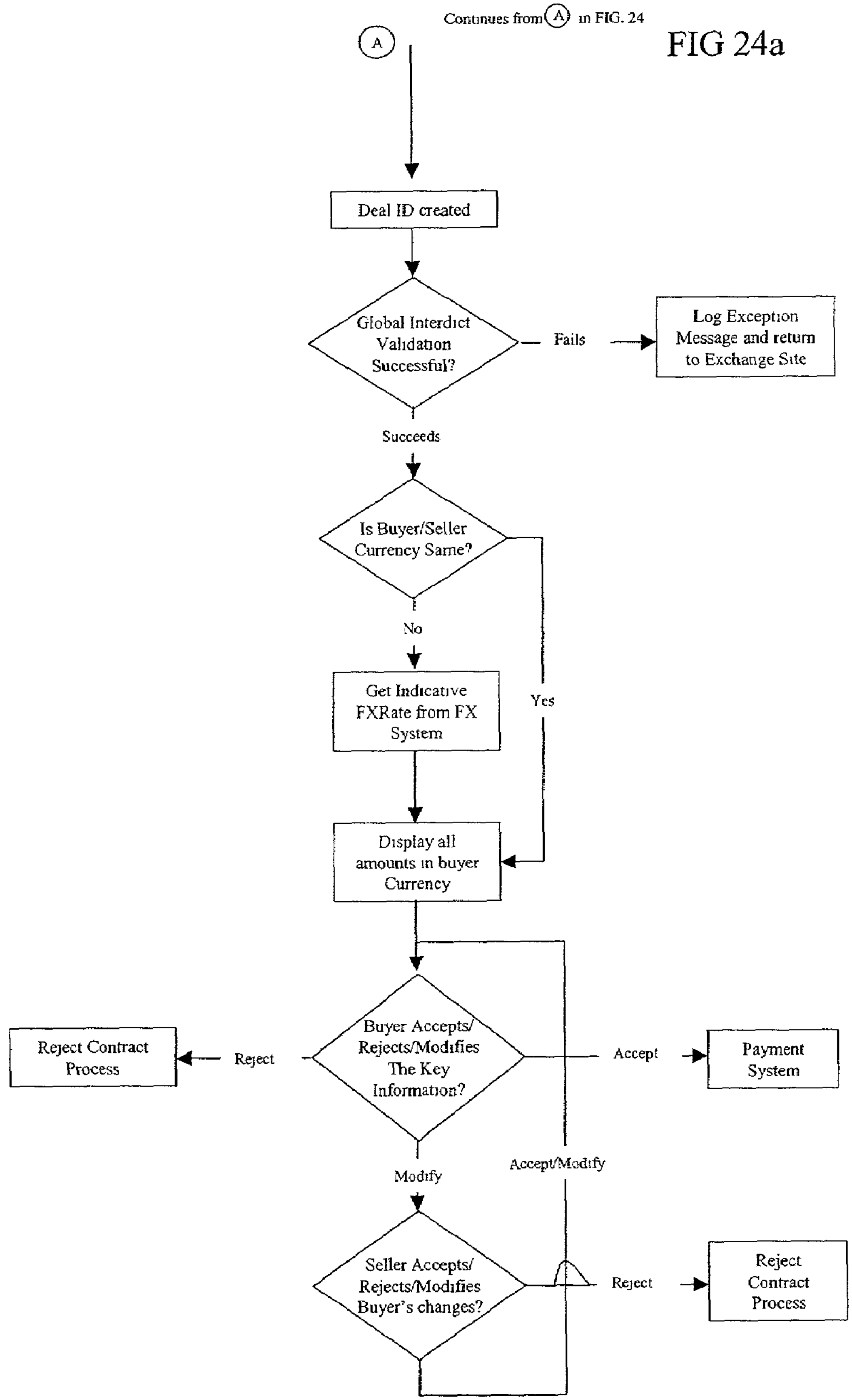
Continues from A in FIG. 24
FIG 24a
A
Deal ID created
Global Interdict Validation Successful?
Fails
Log Exception Message and return to Exchange Site
Succeeds
Is Buyer/Seller Currency Same?
No
Yes
Get Indicative FXRate from FX System
Display all amounts in buyer Currency
Buyer Accepts/ Rejects/Modifies The Key Information?
Reject
Reject Contract Process
Accept
Payment System
Modify
Accept/Modify
Seller Accepts/ Rejects/Modifies Buyer's changes?
Reject
Reject Contract Process

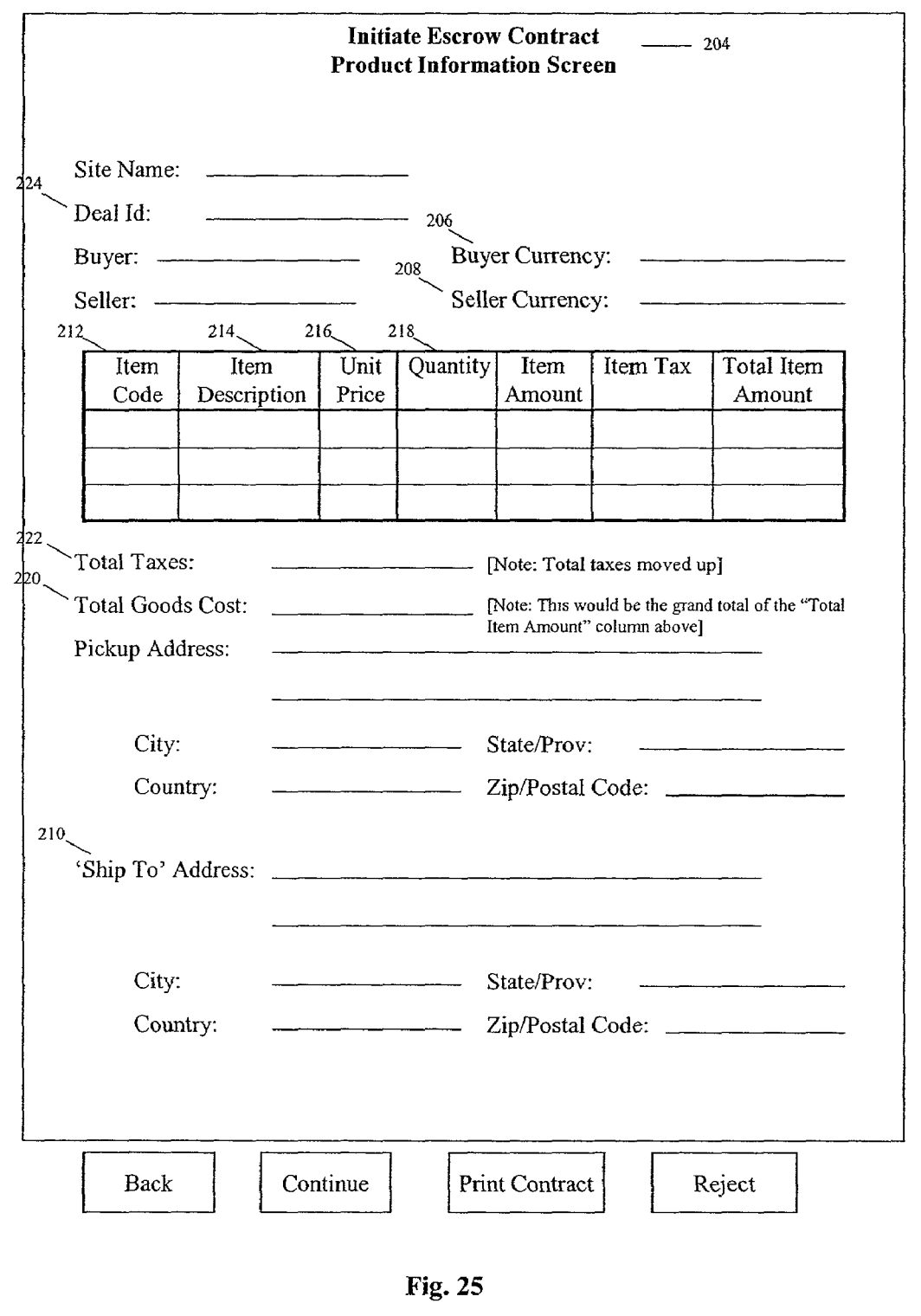

Initiate Escrow Contract
Product Information Screen 204

224 Deal Id:

Site Name: ______

Deal Id: ______

Buyer: ______ 206 Buyer Currency: ______

Seller: ______ 208 Seller Currency: ______

212 214 216 218

| Item Code | Item Description | Unit Price | Quantity | Item Amount | Item Tax | Total Item Amount |
|---|---|---|---|---|---|---|
| | | | | | | |
| | | | | | | |
| | | | | | | |

222 Total Taxes: ______ [Note: Total taxes moved up]

220 Total Goods Cost: ______ [Note: This would be the grand total of the "Total Item Amount" column above]

Pickup Address: ______

City: ______ State/Prov: ______

Country: ______ Zip/Postal Code: ______

210 'Ship To' Address: ______

City: ______ State/Prov: ______

Country: ______ Zip/Postal Code: ______

Back | Continue | Print Contract | Reject

Fig. 25

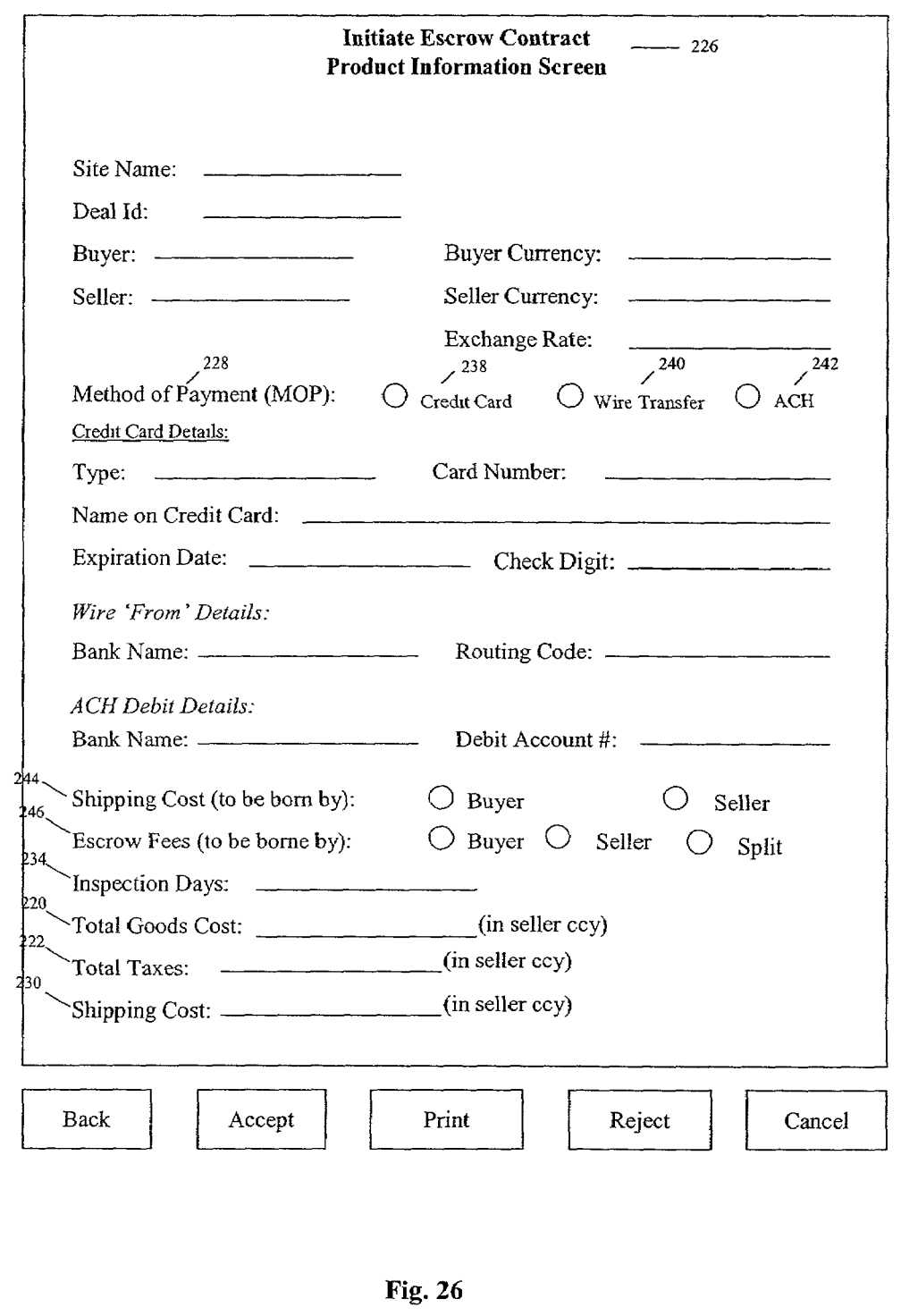

Initiate Escrow Contract
Product Information Screen — 226

Site Name: ____________

Deal Id: ____________

Buyer: ____________ Buyer Currency: ____________

Seller: ____________ Seller Currency: ____________

Exchange Rate: ____________

228 Method of Payment (MOP): 238 ○ Credit Card 240 ○ Wire Transfer 242 ○ ACH

Credit Card Details:

Type: ____________ Card Number: ____________

Name on Credit Card: ____________

Expiration Date: ____________ Check Digit: ____________

*Wire 'From' Details:*

Bank Name: ____________ Routing Code: ____________

*ACH Debit Details:*

Bank Name: ____________ Debit Account #: ____________

244 Shipping Cost (to be born by): ○ Buyer ○ Seller

246 Escrow Fees (to be borne by): ○ Buyer ○ Seller ○ Split

234 Inspection Days: ____________

220 Total Goods Cost: ____________(in seller ccy)

222 Total Taxes: ____________(in seller ccy)

230 Shipping Cost: ____________(in seller ccy)

Back | Accept | Print | Reject | Cancel

Fig. 26

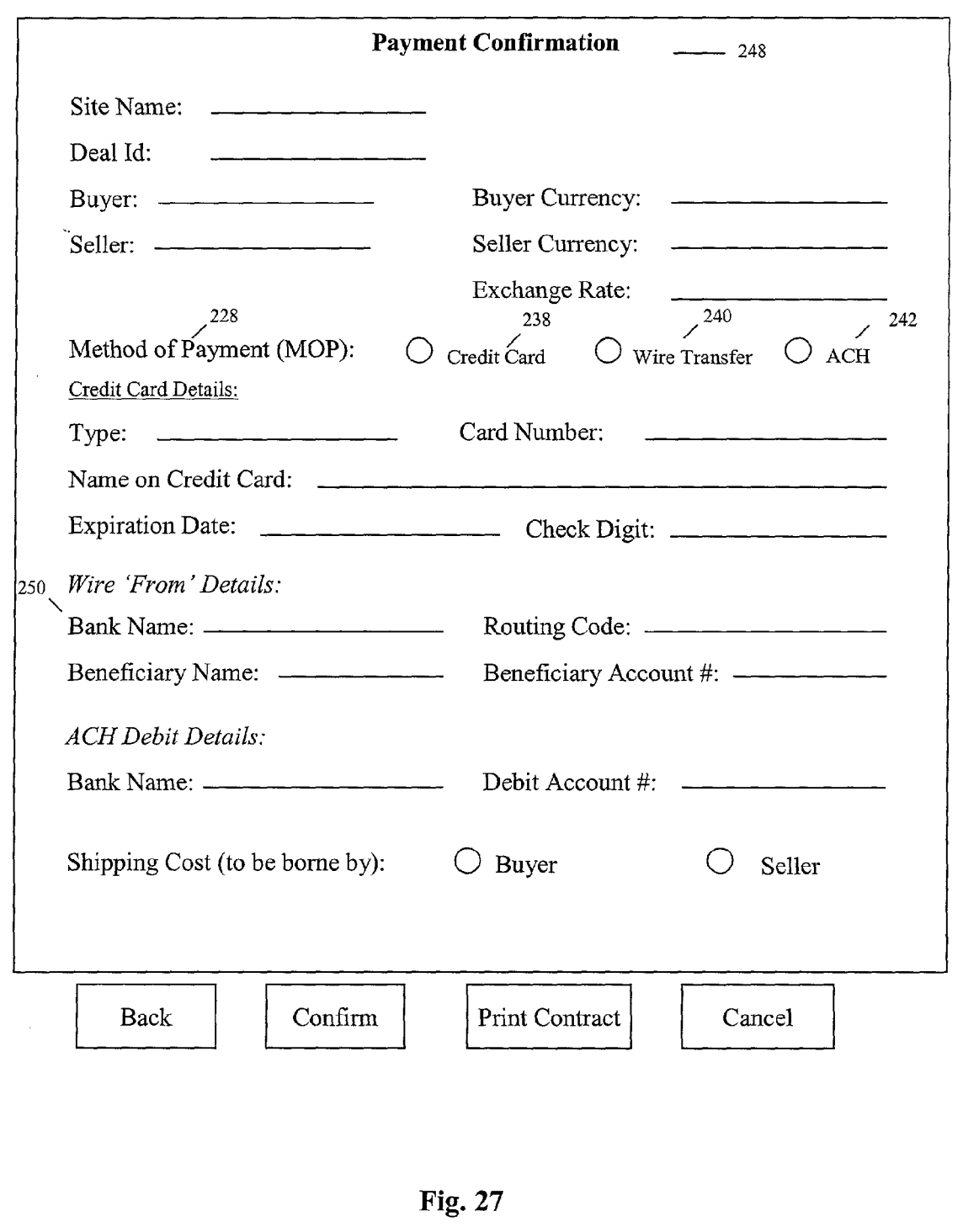

Payment Confirmation 248

Site Name: ________

Deal Id: ________

Buyer: ________ Buyer Currency: ________

Seller: ________ Seller Currency: ________

Exchange Rate: ________

228 238 240 242

Method of Payment (MOP): ○ Credit Card ○ Wire Transfer ○ ACH

Credit Card Details:

Type: ________ Card Number: ________

Name on Credit Card: ________

Expiration Date: ________ Check Digit: ________

250 *Wire 'From' Details:*

Bank Name: ________ Routing Code: ________

Beneficiary Name: ________ Beneficiary Account #: ________

*ACH Debit Details:*

Bank Name: ________ Debit Account #: ________

Shipping Cost (to be borne by): ○ Buyer ○ Seller

Back | Confirm | Print Contract | Cancel

Fig. 27

Pending Deals List — 256

Buyer/Seller: ________________ (Name of Buyer/Seller Company)

258 260 262

| Site Name | Deal Date | Seller/Buyer | Deal ID | Deal Currency | Total Deal Amount | Last Approved By | Approval Date |
|---|---|---|---|---|---|---|---|
| | | | | | | | |
| | | | | | | | |
| | | | | | | | |
| | | | | | | | |

View Details    Print

Fig. 29

Pending Payments List — 264

Buyer/Seller: ________________ (Name of Buyer/Seller Company)

266 268

| Site Name | Deal Date | Seller/Buyer | Deal ID | Deal Currency | Buyer Payable Amount | Payment Due Date |
|---|---|---|---|---|---|---|
| | | | | | | |
| | | | | | | |
| | | | | | | |
| | | | | | | |

View Details

Print

Fig. 30

Pending Shipment Details 286

Site Name: ____________

Deal Id: ____________ Deal Date: ____________

Buyer: ____________ Buyer Currency: ____________

Seller: ____________ Seller Currency: ____________

| Item Code | Item Description | Quantity | Currency | Unit Price | Total Item Amount | Total Item Tax | Select |
|---|---|---|---|---|---|---|---|
| | | | | | | | |
| | | | | | | | |
| | | | | | | | |

Outstanding Shipment Amount: ____________

Total Deal Amount: ____________

'Ship To' Address: ____________

____________

City: ____________ State/Prov: ____________

Country: ____________ Zip/Postal Code: ____________

Back Save Cancel

FIG. 35

Tracking Details — 288

Site Name: ______________ Deal Date: ______________

Deal Id: ______________

Shipped By: ______________

'Shipped To' Address: ______________________________

______________________________

City: ______________ State/Prov: ______________

Country: ______________ Zip/Postal Code: ______________

| Item Code | Item Description | Quantity | Unit Price | Amount |
|---|---|---|---|---|
| | | | | |
| | | | | |
| | | | | |

Total Shipment Amount: ______________

*Shipment Details*:

Shipment Id: ______________

Shipment Carrier:

Back Save Close

Fig. 36

BUYER INSPECTION 290

Shipment Inspection — 292

294

Site Name: ____________

Deal Id: ____________ Deal Date: ____________

298

Buyer: ____________ Buyer Currency: ____________

Seller: ____________ Seller Currency: ____________

| Item Code | Item Description | Quantity | Currency | Unit Price | Total Item Amount | Total Item Tax | Accept |
|---|---|---|---|---|---|---|---|
| | | | | | | | |
| | | | | | | | |
| | | | | | | | |

Total Shipment Amount Accepted: ____________

Total Shipment Amount: ____________

296

Shipment Id: ____________

Shipment Received Date: ____________

Back

Accept 300

Reject All 302

Accept Part 304

Fig. 38

Reject Shipment Details — 314

Site Name: ____________

Deal Id: ____________ Deal Date: ____________

Buyer: ____________ Buyer Currency: ____________

Seller: ____________ Seller Currency: ____________

Shipment Id: Shipment Date: ____________

Shipment Received Date: Inspection Date: ____________

'Return to' Address: ____________

____________

City: ____________ State/Prov: ____________

Country: ____________ Zip/Postal Code: ____________

| Item Code | Item Description | Quantity | Unit Price | Total Item Amount | Total Item Tax |
|---|---|---|---|---|---|
| | | | | | |
| | | | | | |
| | | | | | |

Back Save Cancel

Fig. 41

Return Shipment Tracking Details — 316

Site Name: __________

Deal Id: __________ Deal Date: __________

Buyer: __________ Buyer Currency: __________

Seller: __________ Seller Currency: __________

'Return to' Address: __________

City: __________ State/Prov: __________

Country: __________ Zip/Postal Code: __________

| Item Code | Item Description | Quantity | Unit Price | Amount |
|---|---|---|---|---|
| | | | | |
| | | | | |
| | | | | |

Total Shipment Amount Rejected: __________

*Shipment Details*

Reject Shipment Id: __________

Shipment Carrier: __________

Back Close

Fig. 42

METHOD AND SYSTEM FOR MULTI-CURRENCY ESCROW SERVICE FOR WEB-BASED TRANSACTIONS

PRIORITY APPLICATION

This application claims the benefit of U.S. Provisional Application No. 60/280,182 entitled "Method and System for Multi-Currency Escrow Service for Web-Based Transactions (Multi-Currency Escrow)", filed Mar. 30, 2001 and incorporated herein by this reference.

FIELD OF THE INVENTION

The present invention relates generally to the field of electronic commerce ("e-commerce"), and more particularly to a method and system for escrow service for web-based transactions, such as multi-currency web-based transactions.

BACKGROUND OF THE INVENTION

The explosion of e-commerce through the Internet has raised issues that are essentially business issues that did not need to be addressed prior to the explosion of e-commerce. A situation now exists, for example, in a business-to-business environment, as well as in other environments, such as a business-to-consumer environment or even the reverse case of a consumer-to-business environment, in which the parties simply have had no prior contact and there is neither a business nor credit history between trading partners. The Internet creates an environment in which the physical location nature of businesses becomes transparent. In other words, they become virtual businesses. The buyers and/or sellers can be anywhere in the world, so the physical nature of business transactions is effectively disrupted. There is a present need to alleviate at least some of the issues that make e-commerce business among strangers less uncertain.

SUMMARY OF THE INVENTION

It is a feature and advantage of the present invention to provide a method and system for escrow service for web-based transactions, such as multi-currency web-based transactions, that supports the needs of two unfamiliar parties doing business by exchanging money for goods and/or services in business-to-business marketplaces.

It is a further feature and advantage of the present invention to provide a method and system for escrow service for web-based transactions, such as multi-currency web-based transactions, that provides subscribing members with the ability to establish deal terms with one another, track deals through delivery and inspection, and settle their transaction securely through a trusted third party on a global basis.

It is another feature and advantage of the present invention to provide a method and system for escrow service for web-based transactions, such as multi-currency web-based transactions, that provides links through electronic connections to electronic exchanges and payment systems where funds from the buyer are electronically collected by the trusted third party at the time of sale and released to the seller when purchased goods/services have been received and approved by the buyer, which represents an 'interrupted payments' scheme not previously in existence in the marketplace.

It is an additional feature and advantage of the present invention to provide a method and system for escrow service for web-based transactions, such as multi-currency web-based transactions, that provides value-added services to the marketplace by providing a globally recognized trusted third party, local currency/multi-currency capability, and the tracking of shipments through electronic contacts with logistics firms.

It is a still further feature and advantage of the present invention to provide a method and system for escrow service for web-based transactions, such as multi-currency web-based transactions, that allows anyone to reach the system, while limiting access by segregating the primary activities at the home and secondary pages to limit navigational capabilities to non-registrants.

It is still another feature and advantage of the present invention to provide a method and system for escrow service for web-based transactions, such as multi-currency web-based transactions, that utilizes electronic messaging to support administrative staff to manage "Know-Your-Customer ("KYC") activities.

It is still an additional feature and advantage of the present invention to provide a method and system for escrow service for web-based transactions, such as multi-currency web-based transactions, that provides escrow accounts in many different currencies.

It is still another feature and advantage of the present invention to provide a method and system for escrow service for web-based transactions, that provides for a "one-to-many-to-one" tripartite escrow relationship between buyer and seller parties, with the current invention being the constant party.

It is a further feature and advantage of the present invention to provide a method and system for escrow service for web-based transactions, such as multi-currency web-based transactions, that enables registrants to track deal activities through a series of status reports that are made available online and automatically generated email messages.

To achieve the stated and other features, advantages and objects, an embodiment of the present invention provides a method and system for escrow service for web-based transactions, such as multi-currency web-based transactions, that is web-accessible and accepts registrations from exchanges and/or portal partners. The completion of registration and transactions is allowed to entitled users who access the system via the web. The system maintains an internal banking engine to act as a deal manager, messaging service and accounts sub-ledger and escrows the funds entrusted to it. The transaction process is essentially composed of a number of transaction statuses, and reporting of those statuses to users is accomplished online and via web query. The system supports several methods of payment, such as credit cards, authorized Automated Clearing House (ACH) or equivalent direct debit/credit and wire transfer payments, and all funds movements are electronic. The system supports transaction level detail through its banking engine accounts; funds movements from its currency accounts, and escrows funds to currency based escrow accounts. Buyers completing goods/services inspections after delivery initiate settlements.

According to an embodiment of the present invention, an exchange site is allowed to register on a registration module on the escrow service server by initiating an application form to register which includes exchange site details information. An admin operations manager of the escrow service performs a verification of the exchange site details information including, for example, verifying the credit capability, financial backing, and business capability of the exchange site. If the verification is successful, the exchange site is registered by the admin operations manager. A user is allowed to register as a buyer and/or a seller on the registration module of the escrow service server only via the registered exchange site. In order to register, the user must submit user registration information on a web site of the escrow service via the registered exchange site. The admin operations manager performs a validation of the user registration information including, for example, validating the user registration information according to predefined credit, know-your-customer, and anti-money laundering banking standards. If the verification is successful, the admin operations manager updates the registration for the user to an active status.

When the user registered as a buyer wishes to use the escrow service for a transaction, the user registered as the buyer is allowed to enter information for the transaction with a second user registered as a seller. The transaction information is entered on a transaction module on the escrow service server from the exchange site via a link. The transaction information includes, for example, at least a selection of a method of payment for the transaction, which is preferably an electronic payment method, such as a wire transfer, a credit card account charge, or an automated clearing house debit. If the buyer currency pre-selected by the user registered as the buyer and the seller currency pre-selected by the user registered as the seller are different, the user registered as the buyer is prompted for acceptance of a currency exchange rate by the transaction module, based on a currency exchange rate quote received from a currency exchange data management system via a banking module of the escrow service server.

If the user registered as the buyer elects to proceed with the transaction and executes a buyer payment for the transaction, upon receipt of the buyer payment by the transaction module in the buyer currency, according to the method of payment selected by the user registered as the buyer, within a predetermined period of time, the transaction module notifies the user registered as the seller to ship goods according to the transaction. If the buyer payment is not received by the transaction module within the predetermined period of time, the transaction module notifies the user registered as the seller of cancellation of the transaction. If the buyer payment is received and if the user registered as the seller elects to proceed with the transaction and ships at least part of the goods to the user registered as the buyer, the user registered as the seller enters tracking details of the shipment on the transaction module to enable tracking and updating receipt by the user of the shipment by the admin operations manager on the transaction module.

If the user registered as the seller ships at least part of the goods, upon receipt of the shipment, the user registered as the buyer enters an acknowledgement on the transaction module of receipt of the shipment. Upon receipt of the acknowledgement, the transaction module initiates a predetermined period of time for inspection of the shipment by the user registered as the buyer, within which the user registered as the buyer can elect either acceptance or rejection of the shipment. If no rejection is received by the transaction module from the user registered as the buyer within the inspection period, the transaction module confirms an acceptance of the shipment. Upon the occurrence of either the receipt by the transaction module of an election to accept the shipment or the expiration of the inspection period without receiving an election to reject the shipment, the transaction module initiates a transfer via the banking module of at least part of the buyer payment to a seller transaction account for the user registered as the seller in the seller currency according to the preselected seller method of payment. In addition, the transaction module initiates a transfer via the banking module of at least part of the buyer payment to a transaction account for the exchange site for a commission on the transaction in a preselected exchange site currency. However, if the transaction module receives an election to reject the shipment within the inspection period, the transaction module initiates a return of at least part of the buyer payment to the user registered as the buyer in the buyer currency according to the buyer method of payment.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 4 shows a sample Site Registration—Site Details GUI screen for an embodiment of the present invention;

FIG. 5 shows a sample Site Registration-Billing Information GUI screen 70 for an embodiment of the present invention;

FIG. 8 shows a sample of a Company Profile GUI screen for an embodiment of the present invention;

FIG. 16 is an example of an Additional Users Details GUI screen for an embodiment of the present invention;

FIGS. 24 and 24*a* is a flow chart that illustrates an example of the Initiate Contract process for an embodiment of the present invention;

FIG. 25 is a sample Initiate Escrow Contract—Product Information screen for an embodiment of the present invention;

FIG. 26 is an example of an Initiate Escrow Contract Financial Information GUI screen for an embodiment of the present invention;

FIG. 27 shows an example of a Payment Confirmation (from Buyer) GUI screen for an embodiment of the present invention;

FIG. 29 shows a sample Pending Deals GUI screen for an embodiment of the present invention;

FIG. 30 is an example of a Pending Payments GUI screen for an embodiment of the present invention;

FIG. 35 shows a sample Pending Shipment Details GUI screen for an embodiment of the present invention;

FIG. 36 shows an example of a Tracking Shipments (including Return) GUI screen for an embodiment of the present invention;

FIG. 38 shows a sample Shipment Inspection GUI screen for an embodiment of the present invention;

FIG. 41 shows a sample Reject Shipment Details GUI screen for an embodiment of the present invention;

FIG. 42 shows a sample Return Shipment Tracking Details GUI screen for an embodiment of the present invention.

DETAILED DESCRIPTION

Figure 1:
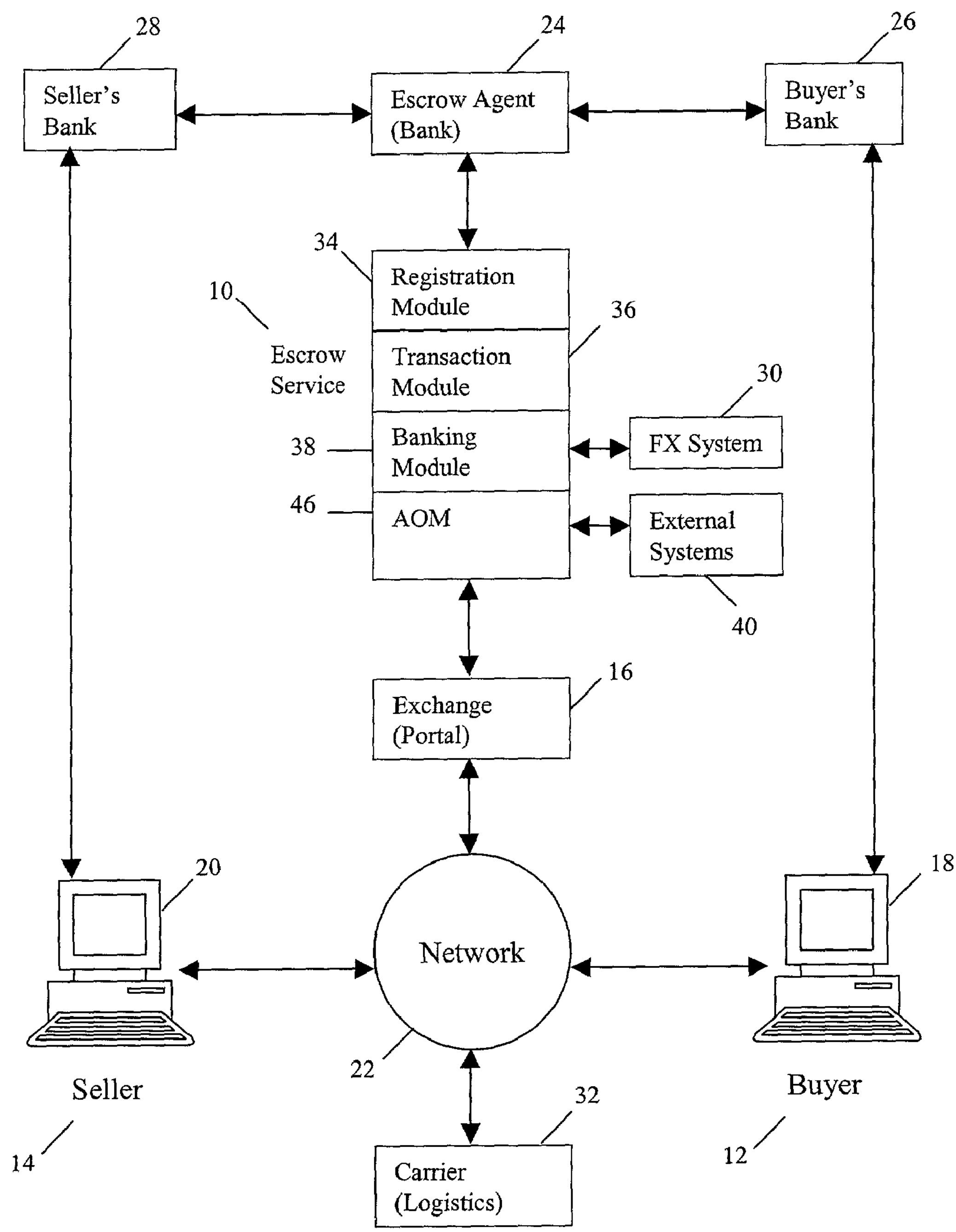
FIG. 1 is a schematic diagram that shows an example overview of key components and the flow of information between key components for an embodiment of the present invention.

Referring now in detail to an embodiment of the invention, an example of which is illustrated in the accompanying drawings, the present invention provides a method and system for escrow service for web-based transactions, such as multi-currency web-based transactions, that alleviates some of the business issues that make e-commerce business among strangers less certain. The method and system of the present invention utilizes a bank's point of view, in that it is not an open system. All users of the system, whether they are buyers or sellers, or whether they are in fact a combination of buyer and seller, must be registered in the system. The importance of this feature is that the process initiates a series of know-your-customer ("KYC") and anti-money laundering ("AML") questions, such that customers are vetted before they become active customers on the system. In other words it is not simply a "Hello; how are you; give us your name and address; and send us your money." While there is typically no physical visit to a customer within the system, state of the art mechanisms are used that are interfaced with the system in order to determine whether or not a particular user should be allowed to do business with the system under acceptable U.S. banking standards.

The escrow service of the present invention becomes a trusted third-party, and although the system acts as an agent rather than as a principal once a transaction is initiated, it has the power of a financial institution, such as a bank, behind it in the sense that when funds are escrowed, they are actually put into escrow with the financial institution. In other words the funds are not put into the general corporate funds of the bank or the business. The capabilities of the system actually work with three parties, including the buyer and the seller and the exchange that brings those initial two parties together. The exchange represents a focal point for business whereby a customer may be seeking to sell, for example, media content, chemicals, electronic hardware, or services.

Thus, the method and system for an embodiment of the present invention provides a web based escrow service that supports the needs of two unfamiliar parties doing business by exchanging money for goods and/or services in a business-to-business (B2B) marketplace. The present invention provides subscribing members with the ability to settle their transactions securely via a trusted third party. The method and system of the present invention bridges both "trust" and foreign currency issues, making the offering global. Electronic connections link exchanges and payment systems to the system of the present invention, where funds from the buyer are electronically collected by the service at the time of sale. The release of funds to the seller occurs once purchased goods have been received and inspected by the buyer. The present invention provides value-added services to the marketplace by providing a globally recognized trusted third party, local currency/multi-currency capability and by tracking shipments through electronic contacts with logistics firms.

While, the system for an embodiment of the present invention can support an exchange where there can be many buyers and many sellers who do not know each other who want to do business using the escrow service, the system is also applicable to the extent that an exchange or a marketplace may be set up by a single buyer or a single seller who is reaching out, in the case of a seller, to new customers, that it does not know and wishes to offer a mechanism such as escrow that can help create transaction volume on that marketplace. The system for an embodiment of the present invention can be used when shipment of goods is involved, but can also be used, for example, in the provision of services. For example, a shipper can use the escrow service of the present invention to settle transactions in which the service that is provided is actually a service of shipping goods.

Figure 2:
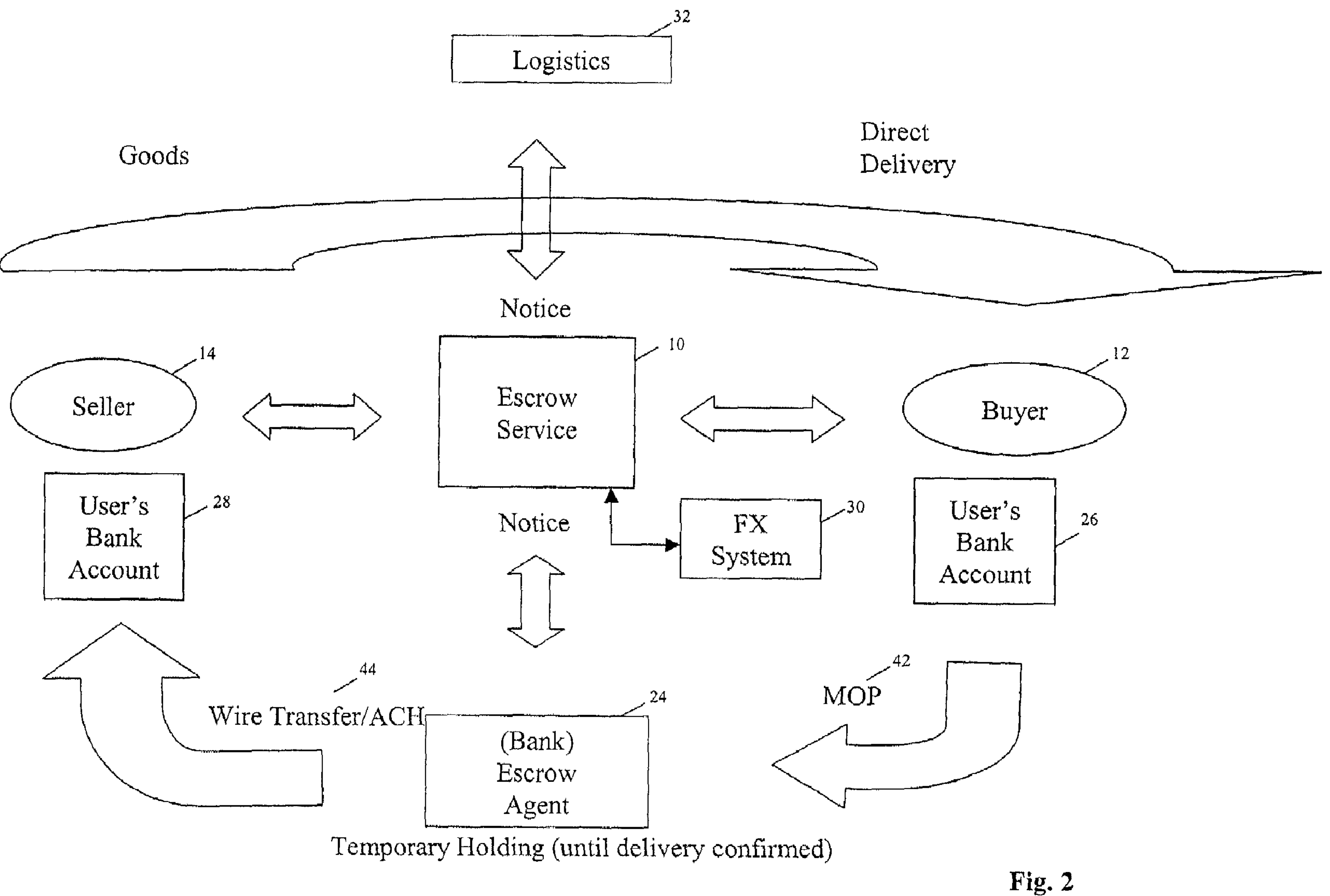
FIG. 2 is a schematic diagram that provides further detail concerning the key components and flow of information between key components shown in FIG. 1.

FIG. 1 is a schematic diagram that shows an example overview of key components and the flow of information between key components for an embodiment of the present invention. FIG. 2 is a schematic diagram that provides further detail concerning the key components and flow of information between key components shown in FIG. 1. The escrow service 10 of the present invention deals not only with the buyer 12 and/or seller 14 as a customer, but also treats the exchange 16 as a customer. Thus, the escrow service 10 vettes the exchange 16 and interfaces directly with the exchange 16, as opposed to other systems that may be utilized on the Internet in which the customer must leave a website and sign on to another website. The escrow service 10 for an embodiment of the present invention directly connects, although the escrow service 10 is a hosted system and not embedded within the exchange site 16. The escrow service 10 utilizes electronic technology to draw information that is registered within the exchange system directly to itself such that the experience of the user is more seamless.

Referring to FIGS. 1 and 2, the method and system for an embodiment of the present invention utilizes, for example, a buyer's computing device, such as the buyer's personal computer (PC) 18 and a seller's computing device, such as the seller's PC 20 coupled over a network, such as the Internet 22, to the escrow system 10 via a portal, such as the exchange 16. The system also makes use of the escrow agent 24, such as a bank; the buyer's bank 26; the seller's bank 28; a foreign exchange (FX) system 30; and a carrier 32. The escrow service 10 has, for example, a registration module 34, a transaction module 36, and a banking module 38.

The system and method the present invention addresses the issue of many buyers or sellers who are likely to be relevant to execute and settle transactions with strangers. The escrow service 10 of the present invention acts as a trusted party for both buyers and sellers. The buyer 12 is provided with an ally that holds the money until the seller 14 has agreed upon and has successfully concluded the seller's part of the contract, such as supplying merchandise of some kind to the buyer 18. The escrow service 10 assures that the buyer 12 gets that merchandise. The escrow service 10 also provides the buyer 12 the ability to inspect that merchandise before funds are ultimately released to the seller 14. The sellers also get a benefit in that they are more certain to be paid for the goods or services provided, and sellers are able to attract more business from buyers who would normally back away because they do not know who the sellers are. To that end, the seller's original contract that was agreed to with the buyer 12 is passed electronically from the exchange 16 to the escrow service 10 for an embodiment of the present invention. The escrow service 10 enables the two parties, i.e., the seller 14 and the buyer 12, to conduct e-commerce business in an Internet 22 environment with relative safety for both parties. A major benefit of utilizing the system for an embodiment of the present invention is that the instance of successful utilization of e-commerce by both sets of parties increases and benefits commerce for all parties involved, whether it is the seller 14, the buyer 12, or the exchange 16.

An important aspect of the system for an embodiment of the present invention is the registration process. The system provides a web-based service that is designed to support the business-to-business needs of buyers and sellers who do not know one another. The escrow service 10 of the present invention provides to subscribing members the ability to settle their transactions via a trusted third party, and allows them to do that with both trust and in their own currency. Since the system is not an open system, an initial aspect of the system is that the parties must register. The registration process is a beginning process, and no transactions can occur until the registration process is completed. It is one of the key processes that must be successfully concluded before any party can become active, and an important feature of the system is the effective use of banking guidelines on establishing what kind of customers are allowed into the system.

An embodiment of the present invention involves, for example, four parties, one of which is the system itself that provides the escrow service 10 and which is a computer system and an enabler. The second party to enable this process to work is the exchange 16. The system provides registration capabilities to the exchange 16 and registers the exchange 16 to the system. The registration requires full research into the longevity of the exchange 16, the capabilities of the exchange 16, the backer(s) of the exchange 16, the financial backing behind the exchange 16, and the type and kind of commerce in which the exchange 16 engages. In most cases, the same credit checking is performed for an exchange 16 as would be completed for a normal banking credit customer. Before a contract is signed to do business with the exchange 16, the escrow service 10 ensures that the exchange 16 has credit capability and is credit supported and is in fact designed to conduct business.

Another party in the system of the present invention is the seller 14, or the buyer 12, which is not able to go to the system directly but must initially register with the exchange site 16. After registration with the exchange 16, the seller 14 or the buyer 12 may want to subscribe to the system of the present invention. For this purpose, a button is displayed, for example, on the display screen of the seller's computer 20, which is a click-through button embedded within the exchange site 16. The seller 14 or the buyer 12 can click on this click-through button and be sent to the registration area of the system for an embodiment of the present invention. Along with the mechanism that sends the seller 14 or the buyer 12 to the registration area, which is done using Extensible Markup Language (XML) technology, is a full security mechanism by which the exchange 16 itself is authenticated for the registration conversation, so that the system knows with a sense of absolute certainty, that the seller 14 or the buyer 12 is the party seeking registration on the system and that the seller 14 or the buyer 12 is using the mechanism of the previously registered exchange 16 to do so.

The system for an embodiment of the present invention uses a series of XML messages for this purpose, and in fact, the final XML message that comes to the escrow service 10 includes the registration details that consist of several sets of information. A first set of information is the key contact information of the individual who represents, for example, the buyer company. A second set of information is company information that represents the key contact and provides company information. A third set of information is banking information, since the escrow service 10 is expected to handle financial activity and provide a payments mechanism for the parties. Thus, the system is required to capture, for example, banking information, bank account information, location of banks, credit card information, and perhaps the ability to debit or credit an account automatically for a buyer 12 or exchange 16.

The escrow service 10 of the present invention captures this information, and as much information as the exchange 16 already has in its database about the company is also passed from the exchange 16 to the escrow service 10. In a matter of moments, the customer is able to see a registration form and is not required to repeat anything that has already been completed. The seller 14 will most likely have to add the financial data, and as a fourth set of information, the seller 14 will also be requested to add some optional reference information. The escrow service 10 electronically contacts a service which vettes whether or not a key contact is really who he/she claims to be by physically contacting one or more senior persons within the seller's organization. The registrant must complete the registration form in totality with, for example, between one hundred and one hundred fifty data elements. Once that is completed, a series of email messages and online messages go to the registrant including, for example, online messages indicating whether or not the registrant has completed the form successfully or whether certain data needs to be furnished.

Everything about the registration process for an embodiment of the present invention is optional. The system allows the registrant to determine whether or not it wants to actually register or whether it wants to leave. The registrant can, in fact cancel the registration process, but the system does not then save information. Once the registrant has successfully completed the information required, a secure, automated email is sent to the registrant's email address to let the registrant know that it is not possible to perform any transactions until all the registration information has been validated. Using online and offline mechanisms, the system of the present invention validates the company, the company contact, the company banking information, and the company history. In addition, the system can use an off system capability to call one or more contacts furnished by the registrant in the registration form to validate whether or not the registrant is genuine.

A unique aspect of the escrow service 10 for an embodiment of the present invention is that it has interfaces to other banking systems 40. For example, a U.S. government office known as the Office of Foreign Asset Control ("OFAC") has an OFAC files database to which the escrow service 10 has an interface that is used to validate key names and information online against the data that the customer provides. This enables the escrow service 10 to prevent conducting business with entities or people or countries globally with which the U.S. does not allow trade. The escrow service 10 has an online interface, for example, to the OFAC files database which provides a background check of the company and of the person involved. This process is known as the Global Interdiction Database within the company to insure that names and addresses and countries and key items that are provided are appropriate names with which the escrow service 10 of the present invention can do business.

The validation process for a buyer 12 is exactly the same as the validation process for the seller 14. There is absolutely no difference between the level of validation performed by the system of the present invention between the seller 14 and the buyer 12, and the mechanism is exactly the same. For example, the buyer 12 comes to the exchange 16 and registers with the exchange 16. The buyer 12 is allowed to click through to the system and register with the escrow service 10. The exact same methodologies are followed for the seller 14, and only valid customers are then provided with permanent passwords and enabled to conduct business. Thus, the escrow service 10, acting as a hosted mechanism, allows buyers and sellers, who do not know one another, to conduct background checks through the system. The buyer 12 and seller 14 are able to do this following a series of steps that are totally system supported.

Turning now to a more detailed explanation of the functional aspects of registration for the system of the present invention, all registrations and transactions originate from exchange/portal partners, such as exchange 16. The completion of registration and transaction, tracking and reporting are allowed to entitled users who access the system via the web 22. The escrow service 10 of the present invention maintains an internal banking engine 38 to act as a transaction manager, messaging service and accounts sub-ledger. The system escrows the funds entrusted to it using the escrow function provided by a financial institution, such as a bank 24. The transaction process is essentially composed of several transaction statuses. Reporting of those statuses to users is accomplished on-line and via web query. An embodiment of the present invention supports several methods of payment 42, including credit cards, and authorized automated clearing house (ACH) or equivalent direct debit/credits, and all funds movements 44 are electronic. The system of the present invention supports transaction level detail through its banking engine accounts, funds movements from its currency accounts, and escrows funds to currency based escrow accounts.

In an embodiment of the invention, a customer agreement is established between the escrow service 10 and its registrants that ensures that the system and the financial institution 24 are collectively recognized as a "trusted third party" and not as an integral party to the underlying transaction. The system of the invention also employs KYC and/or AML protections during three separate stages of operation. The system validates key customer data at registration, validates shipping/delivery methods at the transaction level, and surveys completed transactions to ensure that patterns of behavior do not accumulate that evidence inappropriate funds movement. The escrow service 10 of the present invention is used by end-users, such as buyer 12 and seller 14, to escrow transactions executed at the exchange site 16. The buyer 12 and seller 14 can access the web site for the system of the invention from various commerce exchanges and/or corporate exchanges, such as exchange 16.

Each exchange or portal that wishes to use the escrow service 10 of the present invention is defined as a site in the system. The enrollment of the exchange 16 in the system is done by an administration function available only to an Admin Operations Manager (AOM) 46. The system generates a unique site ID that is communicated to the exchange 16 for all future communication. A company on the escrow service 10 of the present invention is a customer. It is the company who is the buyer 12 or the seller 14 on the site for the system of the invention. The company is identified uniquely by a company ID generated by the site or set up on the site, a registration or tax ID and a base currency. The exchange 16 passes an XML message containing an external company reference ID, a registration or a tax ID.

A key contact specifies the base currency while registering the company on the site. The key contact also defines whether the membership type of the company is 'Buyer' or 'Seller' or 'Buyer/Seller'. The escrow service 10 generates an internal company ID. If there is already an internal company ID in the system whose registration or tax id and the base currency are the same (e.g., when the same company registers from different exchange sites), the system links the external company reference Id (from site) to the particular internal company ID. This results in an internal company ID linked to more than one company from two different sites. In case a company wants to transact in more than one base currency (specified on the web site for the system) from an exchange site, the company must register separately. For each registration (company and base currency), there is one key contact active and one or more subordinate users who are allowed to use the escrow service 10 of the system of the present invention. The registration process is performed by the key contact. Transactions can be performed for a company by the key contact or one of the subordinate users.

A key contact is the primary representative of the company who is authorized to transact on behalf of a company. There can be only one key contact active from each company from the exchange site 16. If a company registers on the system of the present invention from an exchange site with different base currencies, there can a different key contact for each registration. The key contact is allowed to enroll other subordinate users who will have the same operational rights as the key contact. However, only the key contact can amend the registration details of the company. Each key contact creates a system user ID. This user ID is unique and different for the same key contact registering from two different sites or for the same key contact registered from an exchange site for the same company for two different base currencies. A subordinate user is enrolled into the system by the key contact. The key contact sets up a system user ID and the password for the subordinate user. The key contact also specifies the exchange user ID for the subordinate user. When a key contact or one of the subordinates decides to escrow a transaction from the exchange site 16, a transaction is created in the system. The transaction is uniquely identified by a transaction ID.

The system for an embodiment of the present invention is not a "free access" system. That is to say, anyone can reach the system web site, but the primary activities at the home and secondary pages are segregated to limit navigational capabilities to non-registrants. The system of the present invention is designed to mandate that the registration process be initiated from a partner portal site, such as exchange 16. All registrations to the system are initiated by a user at the partner portal 16. This assumes that there are XML messages that carry registration conversations from the portal 16 to the registration area of the escrow service 10 of the present invention. Likewise, the system may send messages back to the portal partner 16. It is not expected that users will be aware of these conversations. The system is also designed to mandate that transactions be initiated from the partner portal site 16.

The system of the present invention is designed to have dual primary access modes. The first primary access mode is access from an affiliated portal/exchange/payments engine, such as exchange 16. The user is able to "beam" from a Uniform Resource Locator (URL) or a linked image to a main operational navigation screen. The user is not required to enter the user ID at this point, but only the password. It is expected that the system of the present invention will most often be a secondary destination. The second primary access mode is direct access and logon at the web site. The user goes to the "home" page of the system and logs on with a full user Id and password. A successful logon takes the user to the main operation navigation screen. The escrow service application 10 of the present invention can be accessed from the exchange site 16 by clicking on a registration link; by clicking on a transaction link; by clicking on a system home page link, and/or by typing in the system URL on a browser.

When a user wishes to access the system sign-on link, a system sign-on screen is displayed for the user on which the user can enter the system user ID and the password. The user ID must be set up for each key contact and subordinate for a company. When the user keys in the user ID and the password, the system validates the user ID to determine if it is valid. If the user ID is disabled, the system displays an error message. If the password is invalid, the system displays an error message. If the password has been reset, the user is taken to a change password screen where the user is required to change the password. The system then determines the company ID of the user and the membership type of the company. Based on the membership type, certain tasks are disabled on the home page. When the user clicks on a certain task, the task shows a list of all the transactions executed for the Company by all the users from all the exchange sites. If the password has expired, the application requires the user to change the password before proceeding with the application. The user credentials entered are authenticated using a Single Sign-On (SSO) mechanism. The login method validates the user Id and password against the underlying security system. On success, information about the user, such as the number of days before the password expires, is returned in the out parameters to be displayed to the user.

The escrow service 10 of the present invention resides on a web site. Its homepage features top-level navigation to general information channels, as well as providing for a user to log on. General navigation channels include, for example, "What is the Escrow Service?", "Learn How One Becomes a Member", "Learn About Our Portal Affiliations", and "How to Register". Supporting channels include, for example, "Customer Support", "FAQ's about B2B Escrow", "About the Financial Institution", and "Our Privacy Policy". Restricted navigation channels include, for example, "Deals", "Pending Deals", "Pending Payments", "Shipments", "Pending Shipments", "Tracking Shipments", "Inspection", "Pending Inspections", "Settlements", "Awaiting Settlements", "Settlement Statement", "Settled Deals", "Exceptions", "Pending Return Shipments", "Tracking Return Shipments", "Customer Service", "Amendment of Registration", "Enroll Users", and "Change Password". At the top of each screen, different links for static Hypertext Markup (HTM) pages, such as "About the Escrow Service", "About the Financial Institution", "Privacy", and the like are shown. "Help" in the form of static text is shown, for example, on a portion of the screen, and the available tasks are shown, for example, on another portion of the screen. Another location on the screen shows, for example, the graphics interchange formats (GIFs) of all the exchange sites from where the escrow service 10 is accessible. The command buttons/links are shown, for example, at another location on the screen.

In an embodiment of the present invention, registrations for the escrow service 10 can be initiated only from an exchange site, such as exchange 16. Each exchange site/portal has an URL/image on which a user can click and be taken to register on the escrow service 10. When the user initiates the request to register on the escrow service 10 from the exchange 16, a dialogue is initiated between the exchange site 16 and the registration module 34 of the escrow service 10. The exchange site 16 passes control to the escrow service site 10, and the escrow service 10 registration module 34 performs the validations, displays the screens and allows the user to navigate through the registration screens. Once registration is completed (successfully or not), the escrow service session is terminated and the browser window is closed.

The exchange site 16 passes a XML message to the escrow service 10 with predefined registration data elements. The message must include a request element as to whether the user is actively registered with the exchange 16. If not, any transaction data associated with the request cannot be used until the exchange registration is complete. This feature allows the escrow service 10 to establish a system-to-system registration session and create an internal company ID for the user requesting to register. The escrow service 10 displays completion messages to provide feedback to the user as to the success or failure of this conversation. The user is then asked to create an escrow service user ID password to complete the registration process. The user then receives a message/notice that the system will email the acceptance notification.

The registration is not be active until the AOM 46 authorizes it. Once data has been collected, specific data is handed off to external systems 40 for validation. The external systems 40 referred to include, for example, financial institution and third party corporate/business intelligence systems. The process by which these systems are interrogated is also off-line. This is performed manually by the AOM 46. On successful validation, the AOM 46 authorizes the registration and sends an email notification to the user indicating the user's registration has been made active. Once the user registration has been successfully completed, the key contact may directly logon to the escrow service 10 and/or go to the amendment of registration area and add new users. New users can be added without modifying core data. New users maintain individual user IDs within the corporate ID of the entity but have different passwords.

User IDs within the exchange site 16 are unique and are sent to the escrow service 10 via XML message. An external company reference ID within the exchange site 16 is unique and is sent to the escrow service 10 via XML message. As mentioned, all new registrations for the escrow service 10 are initiated through an exchange site 16, and a user must be actively registered under the exchange site 16 before requesting escrow service registration. Although the escrow service 10 validates this, the exchange/portal 16 does not allow users to initiate the escrow service registration process unless the user is actively registered with the exchange/portal 16. When the user requests registration from the exchange site 16, the site generates a message containing site ID, exchange user ID, mandatory company information and other data to be passed to the escrow service 10.

As also mentioned, the exchange site 16 must be registered with the escrow service 10 before any user can be registered, and the site registration is performed by the AOM 46. Once the exchange site 16 passes control to the escrow service 10, all processing, screen displays, and the like are handled by the escrow service 10. The escrow service 10 of the present invention generates a unique internal company ID associating or linking it to the external company reference ID. This internal ID links the same company from different exchange sites. It is assumed that the company is considered the same if it has the same registration or tax ID and the same base currency. As a result, the key contact may be different for the same company registered from two different sites. All registrations, whether new or amended, must be reviewed by the AOM 46.

In an embodiment of the present invention, all new transactions must be initiated through the exchange site 16 and are allowed only if a registration is in "Active" status. If the user abandons the registration process, all the data entered is lost, and there is no registration record in the system. The escrow service registration form is available in Hypertext Markup Language (HTML) format on the registration screen so that the user can print the form. The key contact specifies a base currency for the company during registration which is the currency in which all transactions are performed. The key contact can register the company as a Buyer or as a Seller or as a Buyer/Seller.

Figure 3:
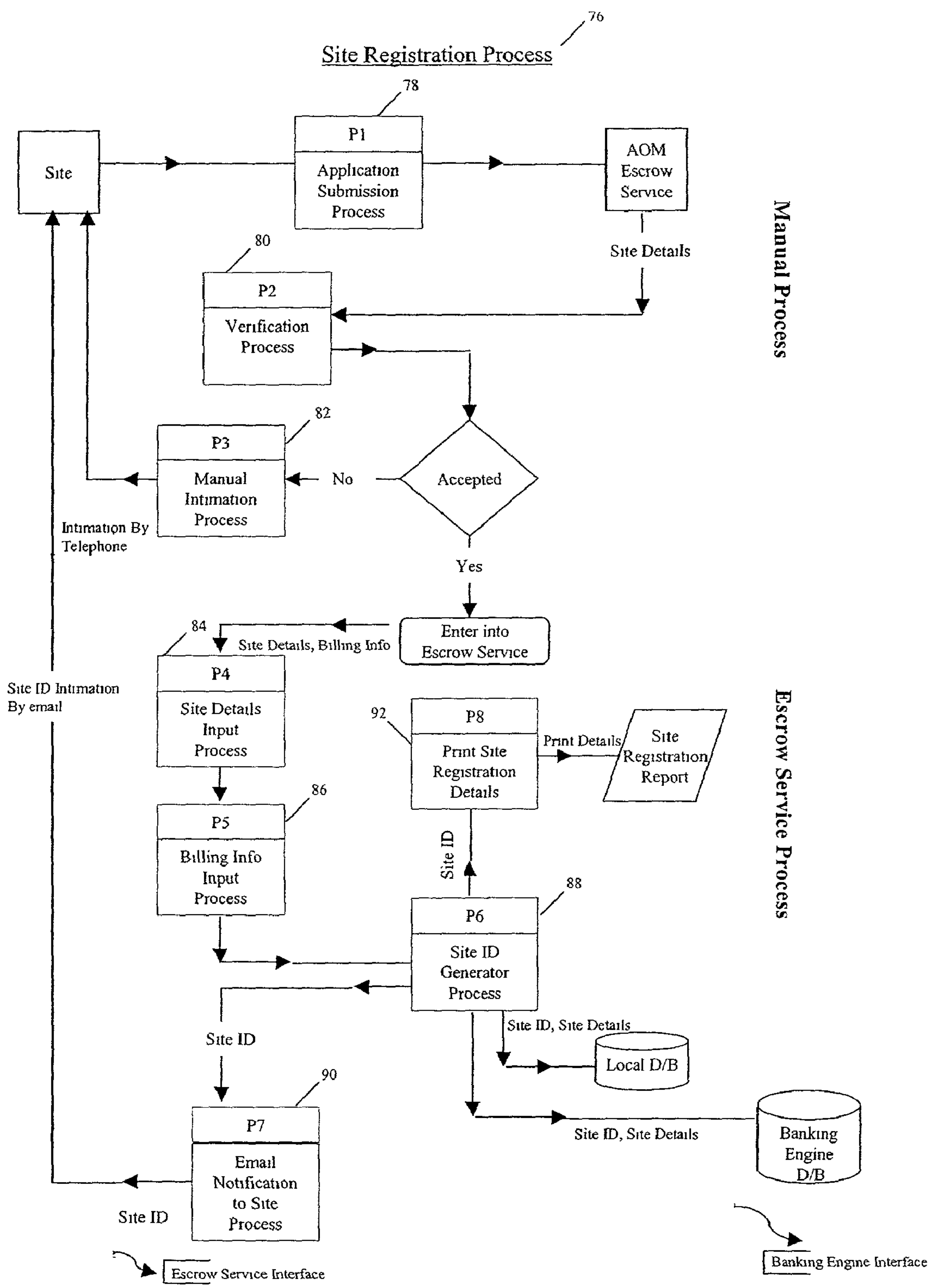
FIG. 3 is a flow chart that illustrates an example of the Site Registration Process for an embodiment of the present invention.

FIG. 3 is a flow chart that illustrates an example of the Site Registration Process 76 for an embodiment of the present invention. The Site Registration Process 76 utilizes, for example, an Application Submission Process 78, a Verification Process 80, a Manual Intimation Process 82, a Site Details Input Process 84, a Billing Info Input Process 86, a Site ID Generator Process 88, an Email Notification to Site Process 90, and a Print Site Registration Details Process 92. The site registration and maintenance process is an administrative function in the escrow service application 10 of the present invention. A site must be registered first before a company can request registration in the escrow service 10. The request for site registration is performed via an application form initiated by the exchange 16. The AOM 46 validates the information manually, and if the validations are successful, the AOM 46 registers the site 16 on an administration application. The exchange site 16 gives the GIF to the escrow service 10, and the AOM 46 loads the GIF on the server. Until the exchange site 16 is registered, users from the site 16 are not allowed to use the escrow service 10. The system generates a site ID that is communicated to the exchange site 16 via email. The site 16 has status values, including for example, "Active" or "Blocked".

The site registration and maintenance list process lists the exchange sites that are registered (all statuses). and links are provided to add new sites or modify an existing site. FIG. 4 shows a sample Site Registration—Site Details GUI screen 50 for an embodiment of the present invention. The site registration/maintenance details process allows the entry, update, or inquiry of the site details. In an add site mode, the Site Type 52 is selected, for example, as Commerce 56, Corporate 54 or Financial Institution-Within 58. The site Base Currency 60 is also selected, which is the currency in which the commission is paid by the escrow service 10 to the exchange site 16. The commission is a percentage (i.e., Commission Percentage 62) of the total value of the goods accepted by the buyer 12. The commission is deducted from the amount due to the seller 14 for the goods accepted by the buyer 12. A Default Inspection Period 64 is the period given to the buyer 12 to inspect the goods shipped by the seller 14. The Site GW 66 is provided by the exchange 16 to the escrow service 10. The Site GIF 66 is maintained on the server and the AOM 46 specifies the location of the Site GIF 66 on the server. The AOM 46 also specifies a Contact Name and Phone Number and an Email ID to which all site communication emails must be sent.

FIG. 5 shows a sample Site Registration-Billing Information GUI screen 70 for an embodiment of the present invention. A site billing details process captures the billing details for the site that allows the escrow service 10 to make commission settlement. This defines the default method of payment used to pay commissions to the exchange site 16. The valid methods of payment are, for example, ACH 72 and Wire Transfer 74. A facility to print the site registration is provided on a site registration list screen and when a site has been added/modified. The print screen lists all the details, such as general and billing. A site ID is generated by the system and sent to the exchange site contact person via email. This ID is used in the XML messages from the exchange site 16 for user registration and transaction. The site ID generated is notified to the contact via email to the site contact.

Figure 6:
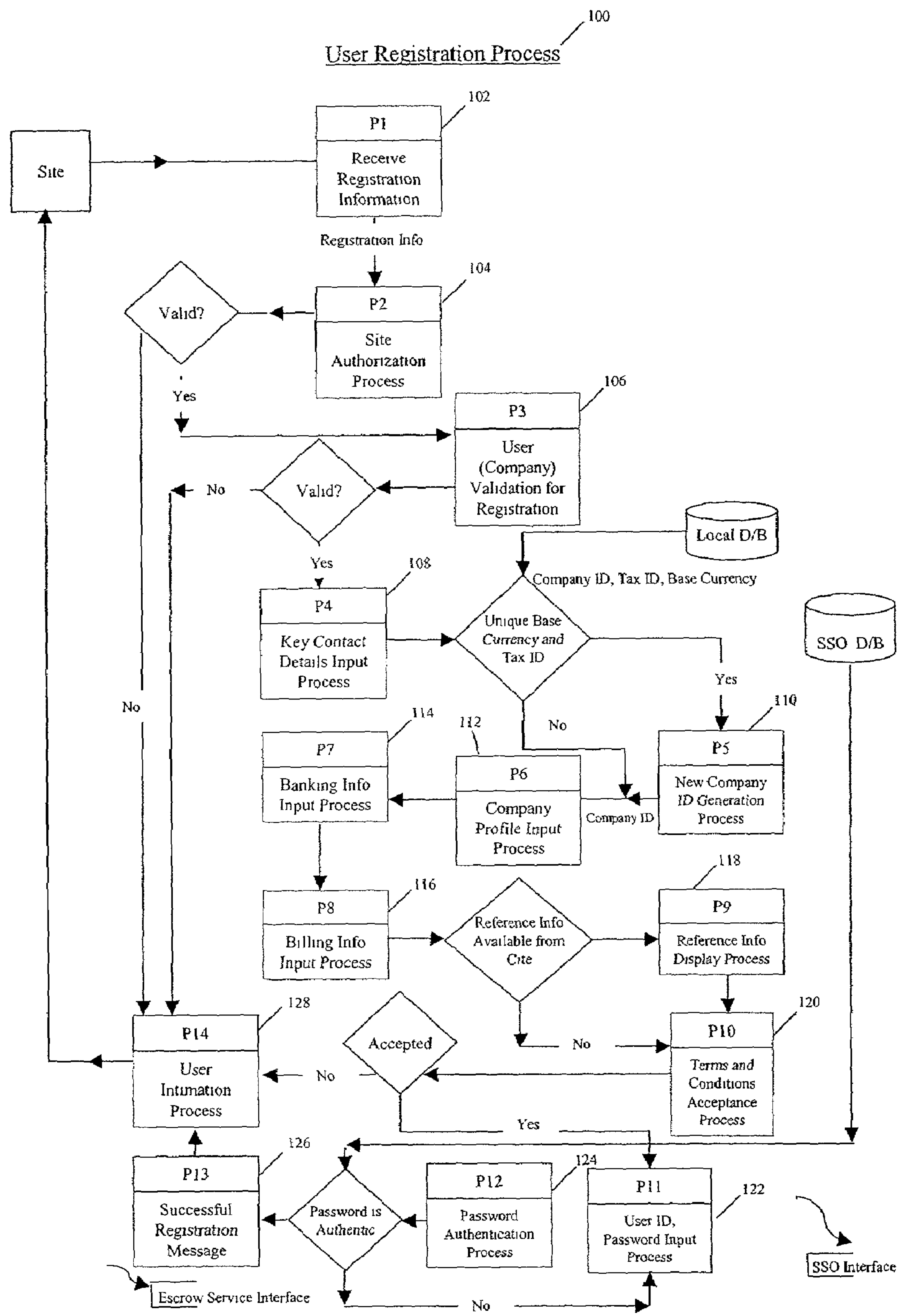
FIG. 6 is a flow chart that shows an example of the User Registration Process for an embodiment of the present invention.

FIG. 6 is a flow chart that shows an example of the User Registration Process 100 for an embodiment of the present invention. The User Registration Process 100 utilizes, for example, a Receive Registration Information Process 102, a Site Authentication Process 104, a User Validation for Registration Process 106, a Key Contact Details Input Process 108, a New Company ID Generation Process 110, a Company Profile Input Process 112, a Banking Info Input Process 114, a Billing Info Input Process 116, a Reference Info Display Process 118, a Terms and Conditions Acceptance Process 120, a User ID and Password Acceptance Process 122, a Password Authentication Process 124, a Successful Registration Message Process 126, and a User Intimation Process 128.

When a user initiates a request to register with the escrow service 10 on the exchange site 16 by clicking on the register link/IJRL, the exchange site ID, exchange user ID, company ID and the site registration details of the user are sent as a XML message to the escrow service site 10. There can be two types of registration requests that originate from the exchange 16, namely a request for a new registration and a request to redo a registration. The request to redo a registration is required when a registration submitted by a key contact for authorization is put into a "Redo" status because the registration validation failed for wrong information. The exchange site 16 passes a message to the escrow service 10 when the user clicks on the register link or the transaction link or the escrow service 10 home page link. Elements such as site ID, exchange user ID, actively registered and function ID are mandatory elements in the message.

The escrow service 10 performs a number of validations before displaying the registration screen to the user. The exchange site 16 must authenticate itself to the escrow service site 10. The escrow service 10 validates if the exchange site 16 is a valid registered site. If the exchange site 16 is not registered, the escrow service 10 displays a message "The exchange site is not registered with the Escrow Service" to the user. The exchange or portal 16 does not allow users to initiate the escrow service registration process 100 unless the user is actively registered with the exchange/portal 16. However the escrow service 10 validates the value of the registered flag from the exchange site 16. If the user is not actively registered, the user is not allowed to register on the escrow service 10. A message "You cannot register with the escrow service as you are not actively registered at your exchange site" will be given to the user. The escrow service 10 then validates if the user is already registered from the current exchange site 16, based on company ID, registration or tax ID and base currency. If the base currency is not being passed from the exchange site 16, this validation is performed when the key contact selects the base currency.

If the user has registered and the status of the registration is active or blocked, the user is given a message indicating that the user already registered. If the status is blocked, the user is not allowed to register and is displayed a message indicating that the user's registration is blocked. If the status is pending or change pending, the user is not allowed to register and is displayed a message indicating that the user's registration is pending authorization. If the status is reject, the user is not allowed to register and is displayed a message indicating that the user's registration is rejected. If the status is redo, the user is allowed to go back to the registration screen with the data from the exchange site 16 and the user's previous registration process and to change the elements. It is necessary that the data from the exchange site 16 takes precedence for the same element updated by the key contact during the user's previous registration. The system compares and displays the appropriate value. The system validates the user's company registration or tax ID with the registration or tax IDs existing in the system. If the system finds a match, the system validates the base currency selected by the key contact. If both these values match, the system links the company to the already existing company ID. If the values do not match, the system generates a new internal company ID. In the Validation Process 106, if any of the validations fail, an email is sent to the contact person of the exchange 16 indicating the error. The email is sent to the email of the key contact which is available in the message.

The User Registration Process 100 allows the user (key contact) to set up the registration information to enroll the company for the escrow service 10. The registration screens always display the default values passed in the XML message from the exchange site 16. The user then enters/updates details such as key contact, company profile, banking information, settlement information and reference information (if available from the exchange site 16). After all the information is validated and the user confirms to register, terms and conditions are shown to the user. On acceptance of the terms and conditions, the user is prompted to choose an escrow service user ID and password. The user ID and password must comply with a predefined user ID and password policy of the system. A completion message is sent to the user, such as "Your registration has been submitted! Please allow up to x business days for processing your application; upon approval you will receive an email notification." The escrow service session will be ended and the user is then taken back to the exchange site 16.

The number of business days that are required to process a registration, for example, is according to a parameter in a system table so that it can be changed in the future. The registration details from the exchange site 16 are put into a "Pending Authorization" status with the date and time stamp (GMT). These registration details must be validated by the AOM 46. Validation is defined as performing KYC checks with sources that are procedurally defined as acceptable. The validations that are performed by the AOM 46 include key contact details, such as whether the key contact is authorized to transact on behalf of the company, company profile, banking details, and settlement Information, such as credit card details, ACH details, and the like. After validation, the AOM 46 may put the registration into the appropriate status, such as "Active" if the registration information is complete and all the information can be validated, "Reject" if the requested registration is not valid, and "Redo" if the registration information is incomplete or some data, such as the credit card number or bank account number, are not valid. The result of the authorization of the registration is sent to the key contact. If the registration is made active, an email indicating that the registration is completed and that the user can start transacting is sent. If the AOM 46 rejects the registration, an email indicating that the registration has been rejected is sent. If the registration is to be redone, an email is sent indicating the missing or wrong information that requires updating.

Figure 7:
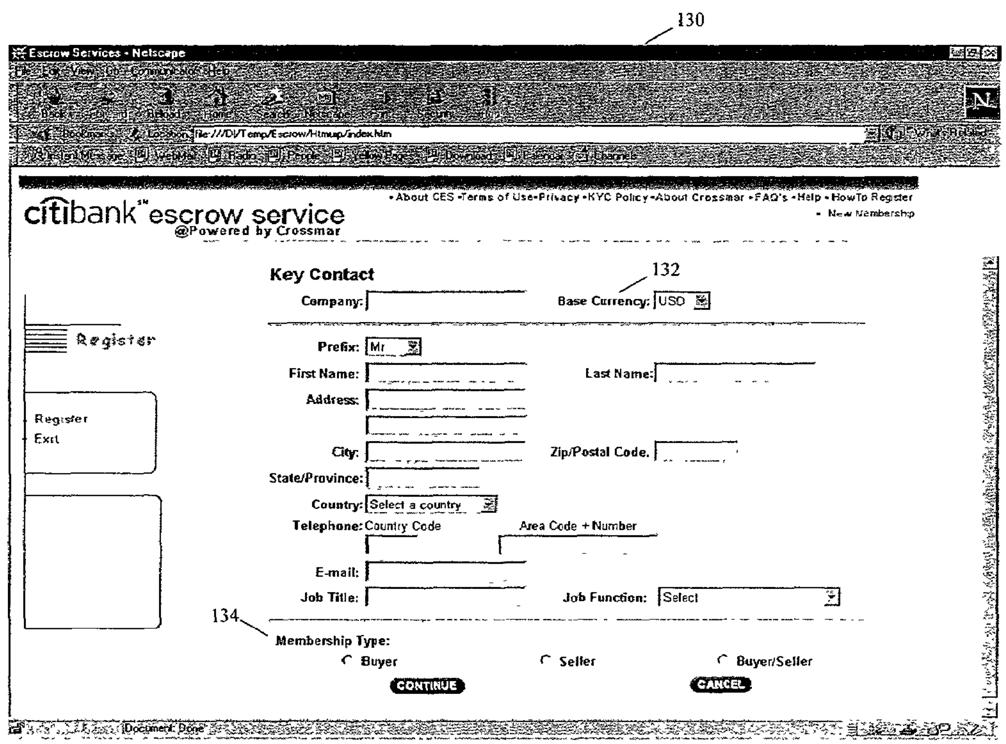
FIG. 7 is a sample Key Contact GUI screen for an embodiment of the present invention.

FIG. 7 is a sample Key Contact GUI screen 130 for an embodiment of the present invention. The Key Contact GUI screen 130 is the first screen of the registration application where the key contact enters his/her details. All mandatory elements from the exchange site in the XML message are pre-filled and then displayed. The key contact then selects the Base Currency 132 of the company in which all transactions will be performed. A validation is performed when the key contact selects the Base Currency 132. If the user has registered and the status of the registration is "Active" or "Blocked", the user is given a message indicating that the user is already registered. If the status is "Blocked", the user is not allowed to register and is displayed a message indicating that the user's registration is blocked. If the status is "Pending" or "Change Pending", the user is not allowed to register and is displayed a message indicating that the user's registration is pending authorization. If the status is "Reject", the user is not allowed to register and is displayed a message indicating that the user's registration is rejected. If the status is "Redo", the user is allowed to go back to the registration screen with the data from the exchange site 16 and the user's previous registration process and change the elements. The data from the exchange site 16 takes precedence for the same element updated by the key contact during the user's previous registration. The system must compare and display the appropriate value. There can only be only one key contact for a company from the exchange site 16. The system validates using the exchange site ID and company ID if there is already a key contact (Active or Change Pending or Pending or Redo). The key contact selects the Membership Type 134 for the company. The membership type can be different from the membership type of the same company registered from another exchange site.

Figure 9:
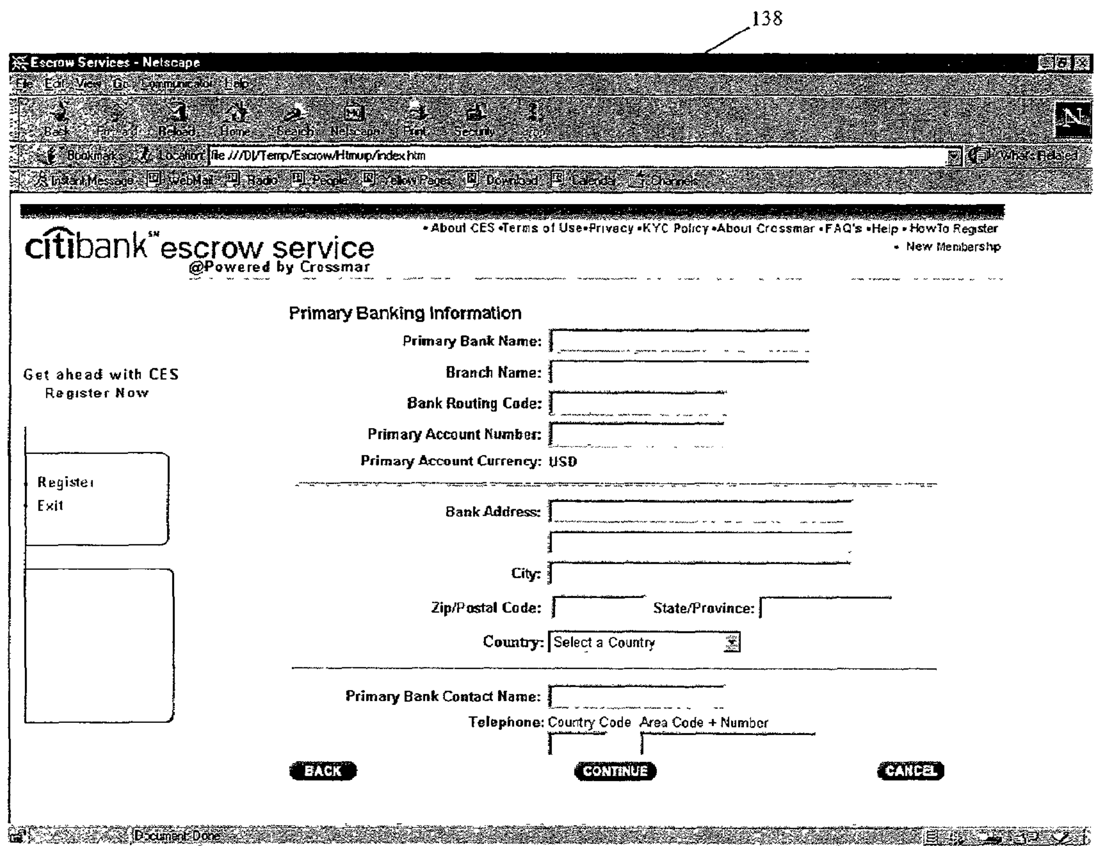
FIG. 9 is an example of a Primary Banking Information GUI screen for an embodiment of the present invention.
Figure 10:
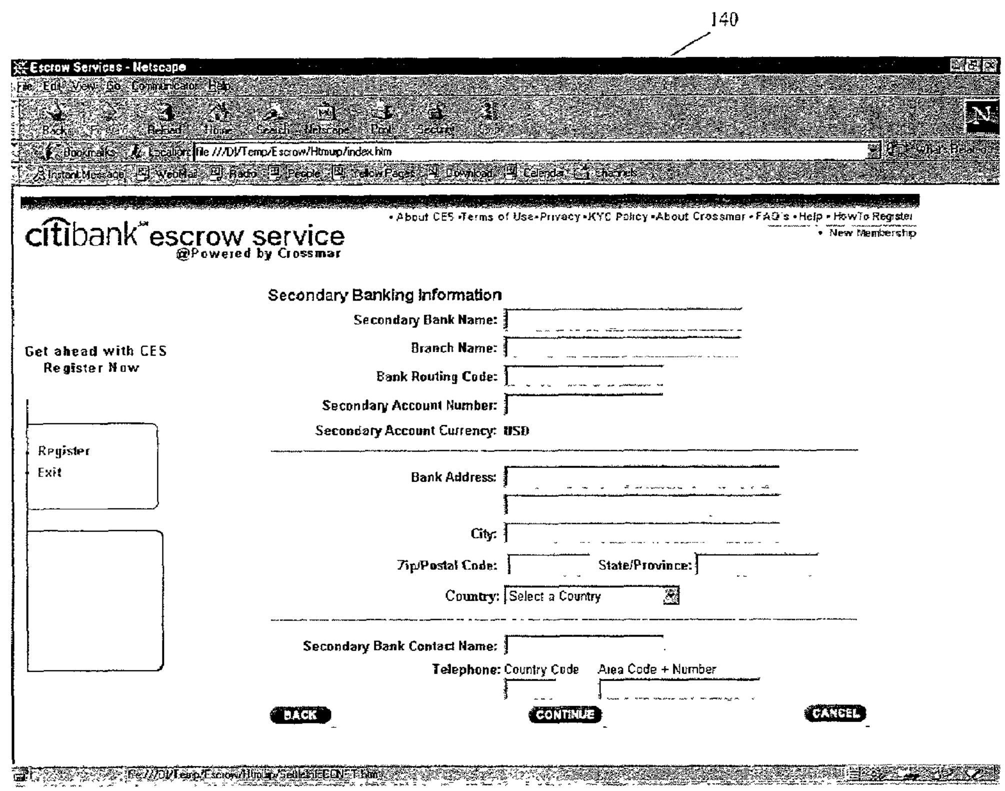
FIG. 10 is an example of a Secondary Banking Information GUI screen for an embodiment of the present invention.

FIG. 8 shows a sample of a Company Profile GUI screen 136 for an embodiment of the present invention. When the user clicks on the "Continue" button on the Key Contact screen 130 and all validations are successful, the user is brought to the Company Profile screen 136. All mandatory elements from the exchange site 16 in the XML message are pre-filled and then displayed. FIG. 9 is an example of a Primary Banking Information GUI screen 138, and FIG. 10 is an example of a Secondary Banking Information GUI screen 140 for an embodiment of the present invention. When the user clicks on the "Continue" button on the Company Profile screen 136 and all validations are successful, the user is brought to the Banking Information screen 138, 140. This screen allows the user to fill up the Banking Details. The two types of Banking Information that are set include, for example, Primary Banking Information 138, which is required for any membership type, and Secondary Banking Information 140, which is required when membership type is Buyer/Seller.

Figure 11:
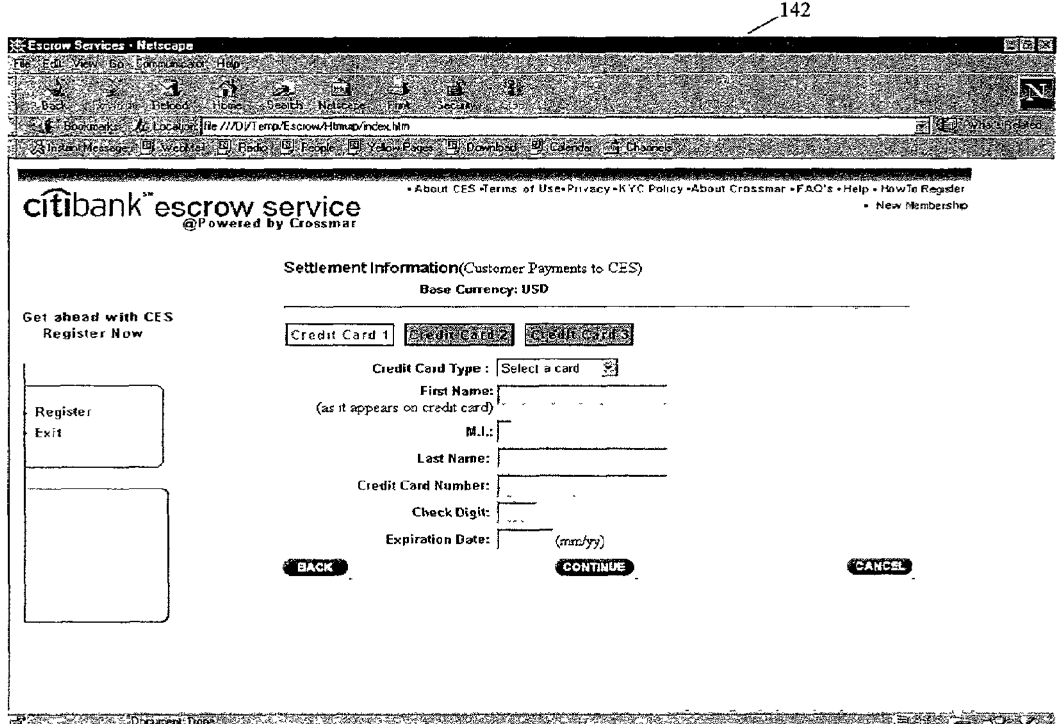
FIGS. 11, 12, and 13 are examples of Settlement Information GUI screens for an embodiment of the present invention.
Figure 12:
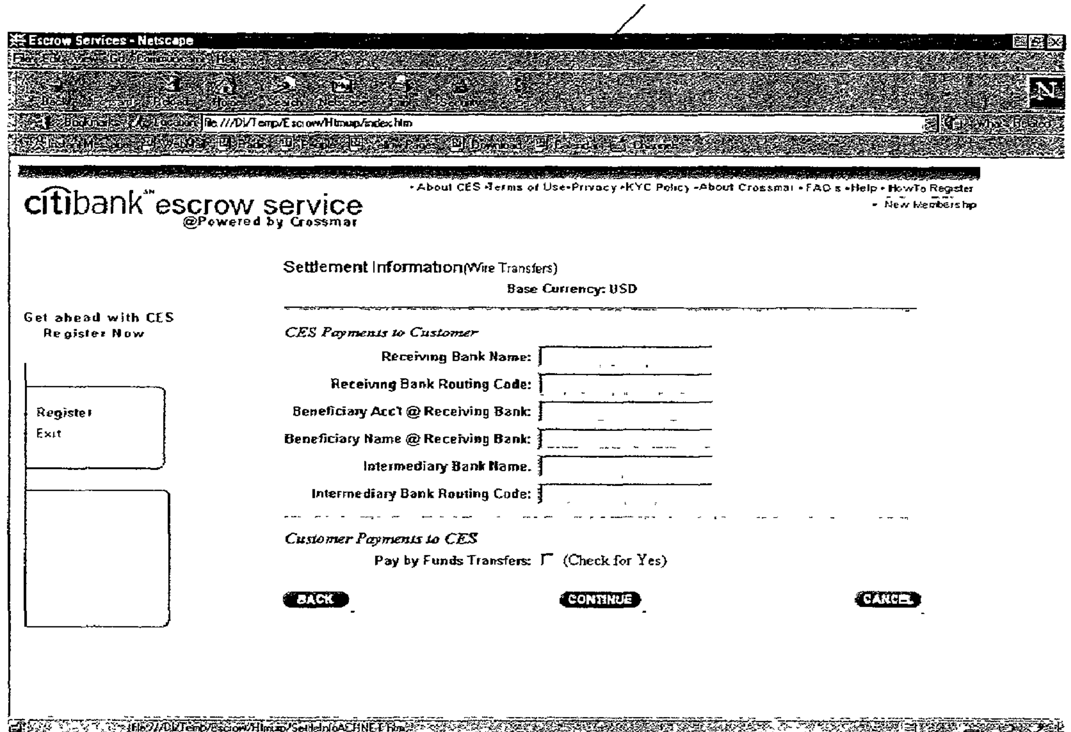
Figure 13:
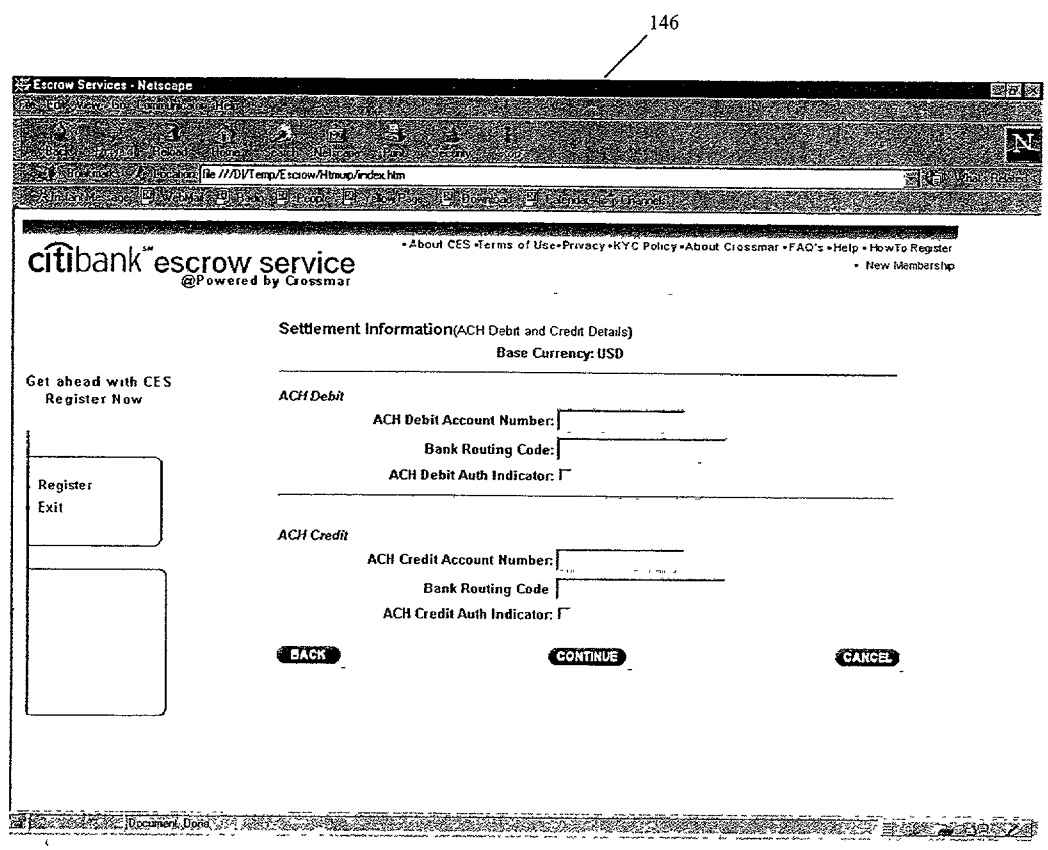

FIGS. 11, 12, and 13 are examples of Settlement Information GUI screens 142, 144, 146 for an embodiment of the present invention. When the user clicks on the "Continue" button on the Banking Information screen 138, 140 and all validations are successful, the user is taken to the Settlement Information screen 142, 144, 146. This screen allows the key contact to set up the details for different methods of payment (MOP). On this screen, there are tabs to set up different modes of payment (in and out), for example, for Credit Card 142, Wire Transfers 144, and ACH 146 MOP. The Credit Card MOP 142 is available when the membership type is a 'Buyer' or 'Buyer/Seller'. The Wire Transfer 144 and ACH 146 options are available to all membership types. One of the three payment modes is preferably set up for the buyer 12 and seller 14. The buyer 12 must specify at least one MOP for debiting funds and only one for crediting refunds in case of rejections. The seller 14 must specify one MOP for crediting payments received. In the case of credit card MOP, a maximum, for example, of three credit card types can be set up. Also in case of credit card MOP, it is assumed that the seller 14 accepts all the credit cards maintained in the system, and this is mentioned in the terms and conditions for the seller 14 at registration. In case of ACH MOP, the buyer 12 updates the ACH debit and the seller 14 updates ACH credit details. In case of wire transfer MOP, the account to which the money is to be credited must be specified. The buyer 12 must specify either the ACH credit or the wire transfer details so that this account will be credited in case of refunds due to rejections.

Figure 14:
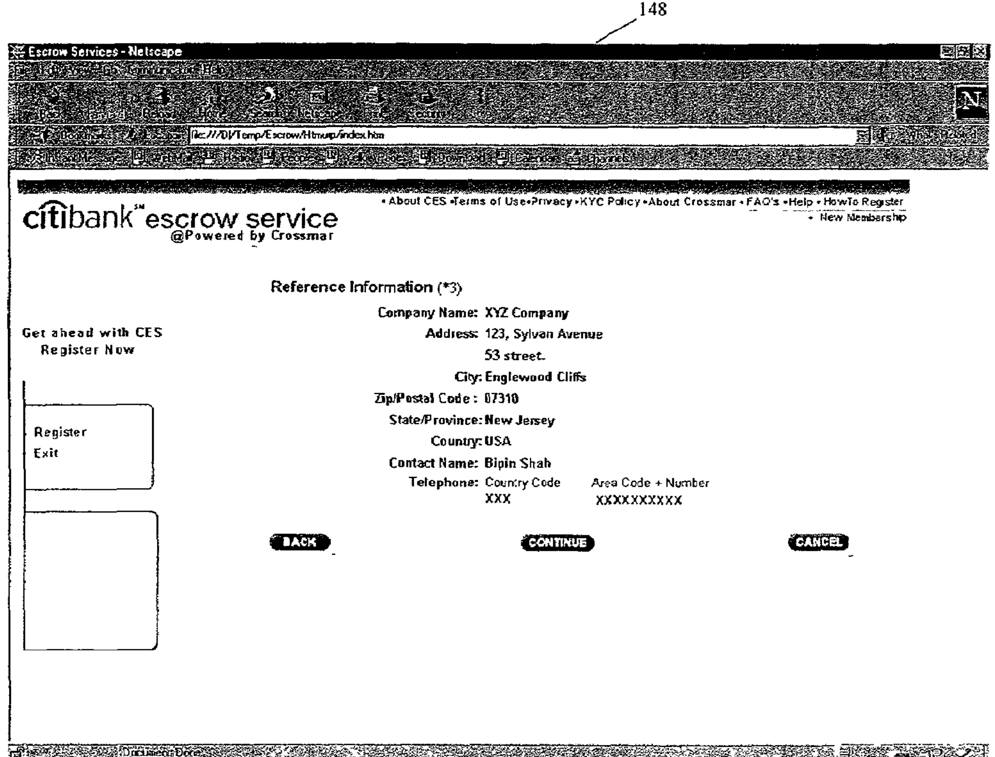
FIG. 14 is a sample Reference Information GUI screen for an embodiment of the present invention.

FIG. 14 is a sample Reference Information GUI screen 148 for an embodiment of the present invention. When the user (buyer 12) clicks on the "Continue" button on the Settlement Information screen 142, 144, 146 and all validations are successful, and if any reference information is available from the exchange site 16, the user is taken to the Reference Information screen 148. This information is optional for registration to be completed. A maximum of three references are available from the exchange site 16 (optional) and the reference details cannot be updated by the key contact. When the user clicks on the "Continue" button on the Reference Information screen 148, a registration confirmation screen is displayed.

When the user clicks on the "Continue" button on the Reference Information screen 148 and all validations are successful, the user is taken to a terms and conditions screen. The terms and conditions document is also accessible, for example, on the main page of the escrow service site 16. A legal agreement is maintained in the system, and the terms and conditions are static HTML pages that can be updated and maintained by the AOM 46. Different versions of terms and conditions are maintained on the web server, and the version of the terms and conditions to which the user agrees is updated in the data store. This allows the system to trace back the terms which apply to the user registration. The user can review the terms and conditions with the escrow service 10 and agree to accept or decline. If the user accepts, the version of the terms and conditions and the timestamp are updated.

When the user clicks on an "Accept" button on the terms and conditions screen, the user is taken to a user ID and password maintenance screen. The user can enter a user ID that will become the escrow service user ID. The password assigned by the user and the subsequent maintenance of passwords are governed by a predefined password policy, including data driven key password policy parameters. The user id and password created must be authenticated using SSO which is the underlying security system. It is assumed that the caller knows the appropriate group and organization for the application in which the user is being created. A result value of "1" indicates that there were errors from the security system, and a descriptive error message is passed back in the Message parameter. When the user clicks on a Submit button on the password maintenance screen, a completion message screen is displayed.

Figure 15:
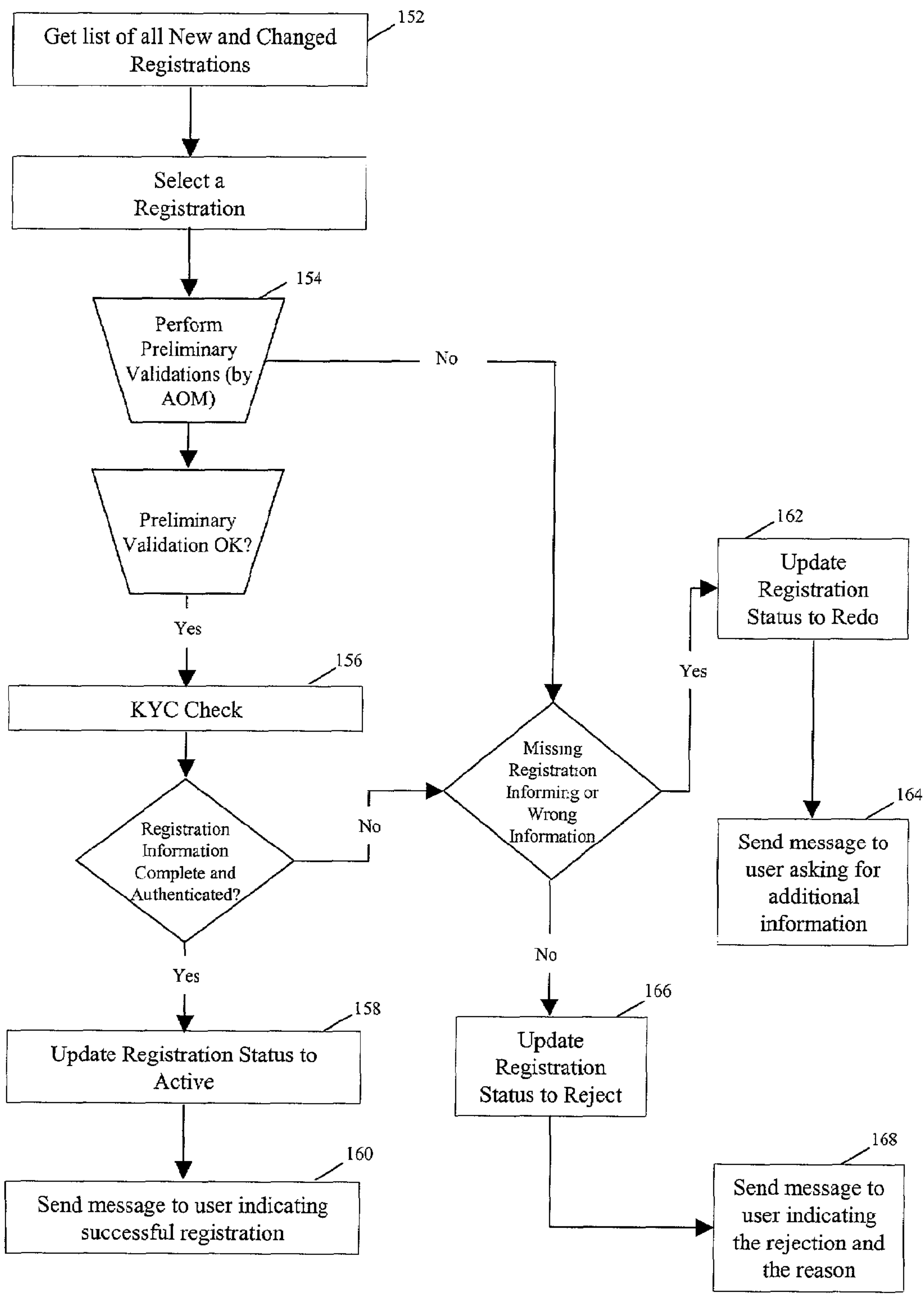
FIG. 15 is a flow chart that illustrates an example of an AOM Authorization of Registrations Process for an embodiment of the present invention.

FIG. 15 is a flow chart that illustrates an example of an AOM Authorization of Registrations Process 150 for an embodiment of the present invention. The AOM Authorization of Registrations Process 150 utilizes, for example, a Get List of All New and Changed Registrations Process 152, a Perform Preliminary Validations (by AOM) Process 154, a KYC Check Process 156, an Update Registration Status to Active Process 158, a Send Message to User Indicating Successful Registration Process 160, an Update Registration Status to Redo Process 162, a Send Message to User Asking for Additional Information Process 164, an Update Registration to Reject Process 166, and a Send Message to User Indicating the Rejection and the Reason Process 168.

The Authorize Registrations process 150 is an administrative function that allows the AOM 46 to validate and authorize the new registrations initiated from the exchange site 16, registrations amended by the user and registrations amended due to synchronization. When the user opts for registering with the escrow service 10 from the exchange site 16 and submits the registration details, the registration is in "Pending" status. The user is not actively registered and hence cannot initiate an escrow transaction. When the user amends the user's registration details from the escrow service home page, the registration status is "Change Pending". The AOM 46 performs basic validations and all KYC checks manually. All the registrations that are to be authorized are either in "Pending" or "Change Pending" status. A user who has amended his/her registration can be allowed to log on to the escrow service 10 but is not allowed to execute any transactions from the exchange site 16. While authorizing an amended registration, the AOM 46 can place it in "Active" or "Redo" or "Blocked" status. In case of "Redo" status, an email notification is sent to the key contact to amend the registration. In case of "Blocked" status, an email notification is sent to the key contact, and the company is not permitted to initiate any more transactions from the exchange site.

The pending authorization registrations list process 152 displays a list of registrations that need to be authorized along with their status. The registrations are sorted by exchange site. The AOM 46 highlights on any of the registrations and sees the details, which is the registration form that the user has completed and is now in "Pending" or in "Change Pending" status. When the AOM 46 selects a user requesting registration and clicks on a details link, a sequence of screens that are the same as for user registration is displayed. The screens include, for example, key contact details, company profile details, banking Information details, settlement information details and reference information details. On the last screen, when the AOM 46 clicks continue, an authorize registration screen is displayed.

The AOM 46 performs basic validations 154 manually for the registration selected. Thereafter, the AOM 46 performs the KYC checks 156 and validation processes 154 for the particular user. Depending on the results of the manual validations 154 and the KYC checks 156, the AOM 46 determines if the registration is to be set to 'Active' 158 or 'Reject' 166 or 'Redo' 162. For each status, an email message 160, 164, or 168 is derived from the system. In case of 'Reject' 166 or 'Redo' 162 of registrations, there are standardized reasons that the AOM 46 selects from a predefined list. In addition to all the predefined messages generated when a status is selected and a reason is selected, there is a message text on the screen wherein the AOM 46 can enter more messages. An email notification on registration status process generates an email notification to the key contact requesting the company registration on the status of the registration. On registration being made "Active" 158, an email 160 is sent to the user indicating that the user is successfully registered and that the user can begin transacting using the escrow service 10. On registration being "Rejected" 166, an email message 168 is sent to the user indicating that the user's registration request is rejected, together with the reason for the rejection. Once a registration has been rejected, the user is not allowed to logon to the escrow service 10. On registration being put in "Redo" status 162, an email 164 is sent to notify the user about the missing or wrong information with a request for the additional or correct information so that the registration can be completed. A facility to print the user registration details is disposed on the authorize registration List screen and when a user registration status is made "Active", "Reject" or "Redo". The print screen lists all the details, such as key contact, company, banking, billing and reference information.

FIG. 16 is an example of an Additional Users Details GUI screen 170 for an embodiment of the present invention. An additional users maintenance function is available from the escrow service home page to the key contact. It is available to both the user types (buyer 12 and seller 14). The key contact can use this function to add additional users who can access escrow service transactions. There is a maximum, for example, of three additional users active in the system for a company from the exchange site 16. When the user (key contact) clicks on "Enroll Users", an additional users List is displayed. The key contact sees a list of all additional users (irrespective of the status of the additional user) that the key contact earlier entered. Based on the escrow service user ID used (of the key contact), the system identifies the exchange 16 and displays corresponding users. The system does not show all the users across various exchanges since the key contact may be the same or may be different for different sites.

When the user clicks on 'Add' or 'Modify', the Additional User Detail screen 170 for entering and/or modifying the user details is displayed. When the key contact clicks on 'Activate', the system first validates whether the additional user account is deactivated, and if so, the system activates the account. If there are three active users, the system displays an error message. When the key contact clicks on 'Deactivate', the system first validates whether the additional user account is activated, and if so, the system deactivates the account. The additional user is then unable to perform any escrow service transaction. When the key contact clicks on an 'Add' link on the list of additional users screen, the system first checks if the number of active additional users is less than three, and if not, the system displays a message that the key contact cannot add any more additional users. The key contact must then deactivate an existing additional user in order to add a new one. When the Additional User screen 170 is displayed, the key contact enters all the data for the additional user and clicks on the 'Save' button 172. When the key contact clicks on 'Modify', the system first checks whether the additional user account selected is active, and it not, the system displays a message that in order to modify the additional user account details, the account should be active. If the account is active, the detail screen 170 is displayed, and the key contact person can modify any of the details except first name 174, last name 176, user ID 178, exchange user ID 180 and click 'Save' 172.

The user ID and password created must be authenticated using SSO, which is the underlying security system. It is assumed that the caller knows the appropriate group and organization for the application in which the user is being created. A result value of "1" indicates that there were errors from the security system, and a descriptive error message is passed back in the message parameter. A number of predefined parameters are passed to SSO interface for authentication.

An amendment of registration function is available to the key contact person of the company only. With amendment of registration function, the key contact person can change the key contact details, company profile, banking information and settlement information. Once the key contact has amended the registration details and submitted for authorization, the registration details cannot be amended by the key contact until the submitted registration is authorized (accepted/redo/reject) by the AOM 46. While authorizing the amended registration, the AOM 46 can put it in "Active" or "Redo" or "Blocked" status. In case of "Redo" status, an email notification is sent to the key contact to amend the registration. In case of "Blocked" status, an email notification is sent to the key contact and the company is not allowed to initiate any more transactions from the exchange site 16.

When the key contact selects the amendment of registration function from the escrow service home page the same sequence of screens as in the user registration is followed. The screens are displayed in order, for example, of key contact information, company profile, banking information, and settlement information, and the key contact is displayed the latest terms and conditions from the server, which may be different from the terms and conditions that were set up at the time of registration. The version of terms and conditions that applies to the amendment is stored in reference to the user (company). A change password function allows a user (key contact or any subordinate user) to change the escrow service password. The validations for the password are the same as the password policy that is applied when the user ID and password are set up for the first time. The changed password must be authenticated using SSO, which is the underlying security system. Registration synchronization is required when the exchange site registration details are changed and the same are updated in the escrow service 10, and a system process allows synchronization of registration updates.

It is possible that the request for registration from the partner portal 16 comes from a portal where the customer has previously registered using other financial institution related facilities. The escrow service 10 always checks these facilities to determine if the KYC validation process is complete or in progress with any of these facilities. At registration, core business information as described by the Bank Secrecy Act is validated against core services within and external to the financial institution. The registration details are manually validated by the AOM 46 with third-party systems. Regardless of which agency validated the customers' information, the escrow service 10 receives an approval or denial for the customers' registration.

An administrative module is provided to set up parameters that control certain restrictions on registrations/transactions or the way registrations/transactions are processed. This administrative application is, for example, an intranet system operated within a firewall and accessible only to internal staff. An administrative facility that is not available to end users is used by system administrators and the AOM 46 who administer the key parameters of the escrow service 10. There are, for example, two types of Administrators, namely system administrators and the AOM 46. Specific access rights must be assigned to a user to access the administrative facility. Access rights are required also on individual functions of this utility, and separate access rights are required for creating, modifying, and/or deleting the parameters.

An administrator, either a system administrator or the AOM 46, has privileges to different functions and can execute only those functions. Functions on which the administrator does not have privilege are not shown in the task list. For example, a system administrator may have the privilege only to create other users. The system administrator does not have the privilege to create site IDs, maintain sites, and authorize registrations. In such a case, when the user signs on to the application, the user's task list shows the tasks on which the user has access privileges. The AOM 46 cannot update the registration details of an escrow service user other than changing the key contact for a company registration from a site, and the AOM 46 cannot update transactions of escrow service users. Creating a system administrator, resetting a password and enabling a user ID, which are system administrator functions, are executed using a separate tool at the financial institution.

The create administrator function allows a system administrator to create an AOM who is able to use the administration utility. For security reasons, the password of the new user is reset so that when the administrator signs onto the system, he/she must change his/her password. A maintain administrator rights function allows a system administrator to set the access rights to various functions available in this application. The system administrator maintains a functions table, and there is no user interface for the functions table. All the administrative functions are available for an administrator to maintain privileges. A change profile function allows a system administrator to change the profile of any system Administrator or AOM. A change password function allows any administrator to change his/her password.

A block/activate site administrative function allows the AOM 46 to block or activate the exchange site 16. The AOM 46 selects the exchange site status and a list of exchange sites that belong to the selected status are displayed. The AOM 46 selects the exchange site 16, checks a 'Block/Activate' checkbox and saves. The block/activate site administrative function allows the AOM 46 to block or activate buyer or seller or buyer/seller (buyer or seller referred to here is a Company/Base Currency pair). When the AOM 46 selects this task, he/she is displayed a sub-menu that has two options, namely 'Block Buyer/Seller' and 'Activate Buyer/Seller'. A block buyer/seller screen allows the AOM 46 to select the user type. If the AOM 46 selects 'Buyer', all users registered as buyers with status of 'Active' are displayed. If the AOM 46 selects 'Seller', all users registered as sellers with status of 'Active' are displayed. The AOM 46 can select one or more users who need to be blocked and click on 'Save'. The AOM 46 can continue to block more users until he/she clicks on 'Close'. The buyer 12 or seller 14 is able to enter into any further transactions only if the AOM 46 changes the registration status from 'Blocked' to 'Active'.

An activate buyer/seller screen allows the AOM 46 to select the user type. If the AOM 46 selects 'Buyer', all users registered as buyers with status of 'Blocked' are displayed. If the AOM 46 selects 'Seller', all users registered as sellers with status of 'Blocked' are displayed. The AOM 46 can select one or more users who need to be activated and click on 'Save'. The AOM 46 can continue to activate more users until he/she clicks on 'Close'. The buyer 12 or seller 14 is able to enter into further transactions once the AOM 46 changes the registration status from 'Blocked' to 'Active'. The changed status of the company (Buyer/Seller) is notified to the respective key contact of the company, and the changed status of the company (Buyer/Seller) is notified to the respective contact of the site 16.

An email notification to exchange site for ad-hoc requirements function allows the AOM 46 to send ad-hoc email messages to the exchange site 16. The AOM 46 can select the exchange site 16 from a list and select a message code. The messages sent are stored in a sent message data store with the site ID, message code, sent date and the AOM user ID. An email notification to Buyers/Sellers for ad-hoc requirements function allows the AOM 46 to send email messages to the buyer 12 or seller 14 for ad-hoc requirements. The AOM 46 can select the exchange site 16 from a list, the buyer or seller type, the buyer or seller ID from the registered users at the selected site and select the message code. The messages sent are stored in a sent message data store with the site ID, buyer/seller ID, message code, sent date and the AOM user ID.

An amendment of key contact details process is an administrative function that allows the AOM 46 to change the key contact for a company and exchange site 16. The AOM 46 enters the new key contact details and creates a new user ID for the new key contact. A key contacts list process displays a list of active key contacts for various registrations sorted by site and company name (buyer/seller). Key contacts that have been disabled by earlier amendments are not displayed. The AOM 46 can click on a link for the company to change the key contact. When the AOM 46 clicks on the company and site record for which he/she wants to change the key contact, a key contact details screen similar to that in the user registration process is displayed.

The user ID and password created must be authenticated using SSO, which is the underlying security system. It is assumed that the caller knows the appropriate group and organization for the application in which the user is being created. A result value of "1" indicates that there were errors from the security system, and a descriptive error message is passed back in the message parameter. The Global Interdict check must be performed on the new key contact, and the AOM 46 does these validations manually before he/she sets up the new key contact in the system.

The amendment of key contact process generates an email notification to the new key contact that has been enrolled for the company. The user ID and the password are also communicated. The password policy for the escrow application 10 is maintained in a table and updated by the system administrator. There is no user interface on the administration application for the system administrator to update the password policy. In addition, a list of restricted passwords is maintained which no customer or escrow service administrator is allowed to use as the password.

Administrative functions for the escrow application 10 are maintained in a table used to maintain administrator rights and updated by the system administrator. There is no user interface on the administration application for the system administrator to update the administrative functions. A currency maintenance function maintains the currency list that is supported by the escrow service 10. It also allows the AOM 46 to define the payment charges that must be applied for each transaction when the buyer defines "Wire Transfer" as the method of payment. This amount is applied based on the buyer currency. A method of payment maintenance function allows the AOM 46 to maintain the method of payments that are used in registration and transactions in the escrow service 10. A business type maintenance function allows maintenance of business type that is used at the time of registration.

Figure 17:
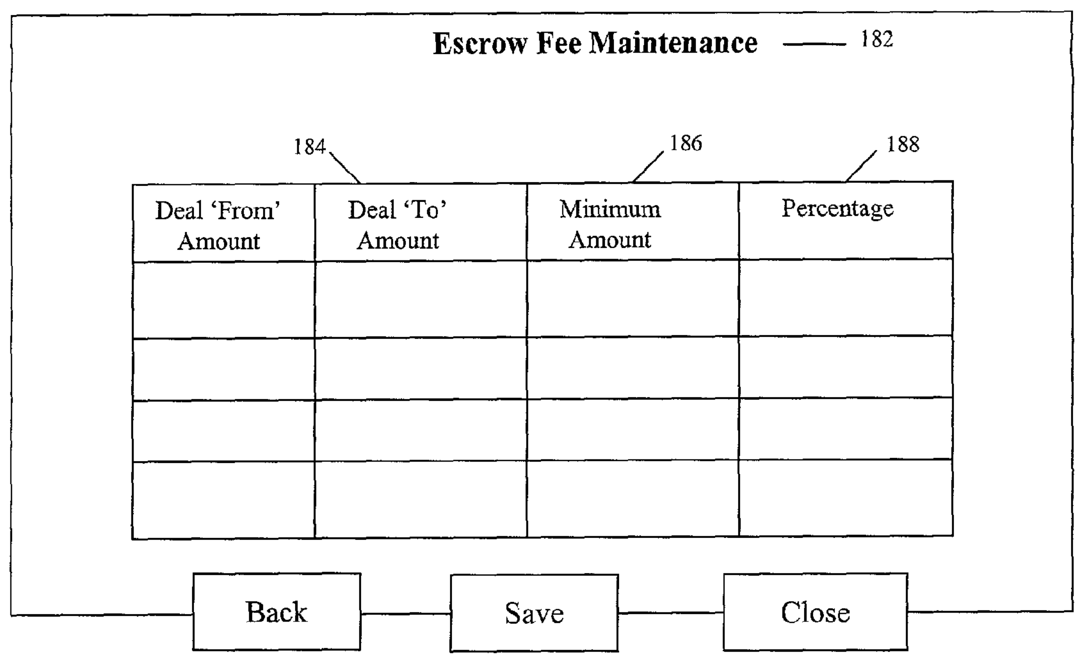
FIG. 17 is a sample Escrow Fee Maintenance GUI screen for an embodiment of the present invention.

FIG. 17 is a sample Escrow Fee Maintenance GUI screen 182 for an embodiment of the present invention. An escrow fee maintenance administrative function allows the AOM 46 to add/update an escrow fees table 184. The escrow fees table 184 maintained are applied to calculation of the escrow fees for a deal. The escrow fees are maintained as a fixed amount for a minimum tier amount 186 and then as a percentage 188 of the total deal amount. The AOM 46 defines the tier of amounts and then enters either a minimum amount 186 or a percentage 188. The minimum amount 186 can be set up for the first tier of deal amount and for the rest a percentage 188 is defined. If the escrow fee schedule has been entered into the system. this screen allows the AOM 46 to update the percentage 188 or add more tiers.

Figure 18:
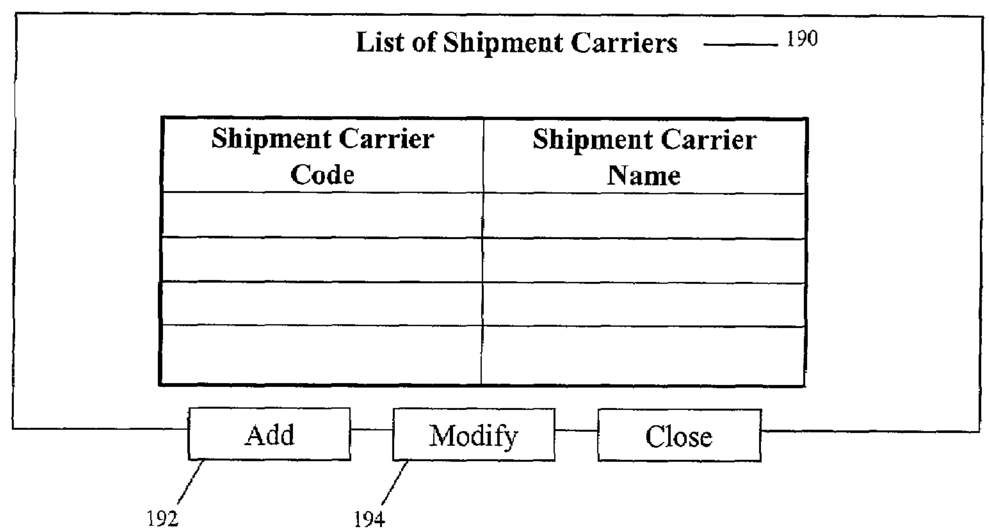
FIG. 18 is a sample Shipment Carriers Maintenance GUI screen for an embodiment of the present invention.
Figure 19:
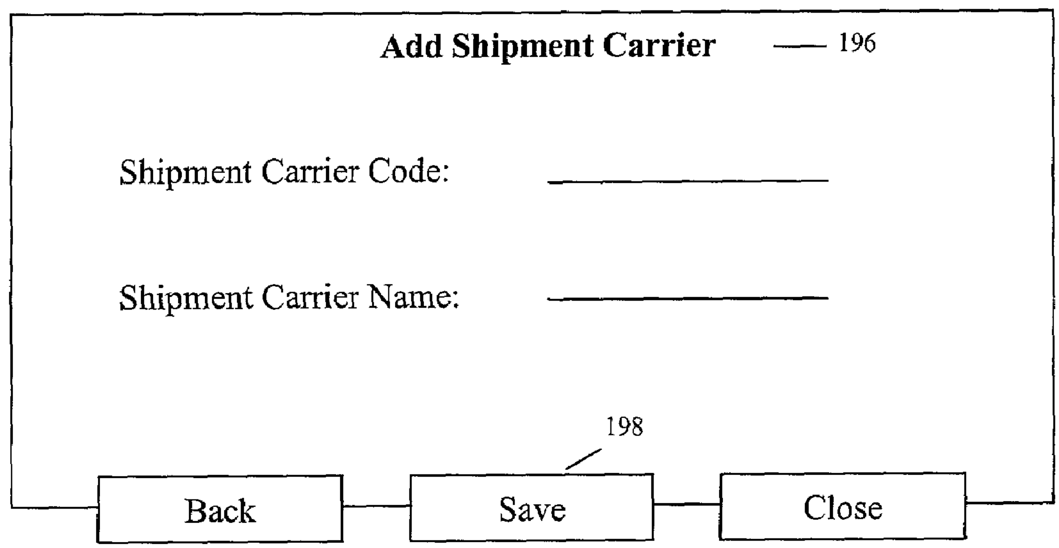
FIG. 19 is a sample Add Shipment Carrier GUI screen for an embodiment of the present invention.

FIG. 18 is a sample Shipment Carriers Maintenance GUI screen 190 for an embodiment of the present invention. A shipment carriers maintenance administrative function allows the AOM 46 to maintain (add or modify) shipment carriers that will be allowed by the system. The AOM 46 is able to enter the shipment carriers through this screen. When the AOM 46 clicks on 'Add' 192, he/she can enter the shipment carrier details. The shipment carrier name is displayed in dropdown to the seller 12 when he/she selects to enter shipment details. When the AOM 46 clicks on 'Modify' 194, he/she can only change the description of the shipping carrier but not the code, and the AOM 46 cannot delete a shipping carrier. FIG. 19 is a sample Add Shipment Carrier GUI screen 196 for an embodiment of the present invention. The AOM 46 is able to add shipment carriers through this screen, and when the AOM 46 enters the details and clicks on 'Save' 198, the shipping carrier entry is saved.

A registration reasons function maintains the reasons for rejecting or redoing a registration by the AOM 46. The AOM 46 selects the reason for rejecting or redoing a registration to the user (key contact). The AOM 46 is able to add different reasons for redoing or rejecting a registration through this screen. A prefix code maintenance function maintains prefix codes used for the key contact and the subordinate user. A job functions maintenance function maintains job functions used for the key contact details in registration. The AOM 46 is able to add different job functions through this screen. When the AOM 46 enters the job function and clicks on 'Save', the job function is saved. A revenue range maintenance function maintains the revenue range used for the key contact details in registration. A company ownership maintenance function maintains company ownership used for the company Information in registration. The AOM 46 is able to add different company ownership through this screen. When the AOM 46 enters the company ownership and clicks on 'Save', the company ownership is saved.

Figure 20:
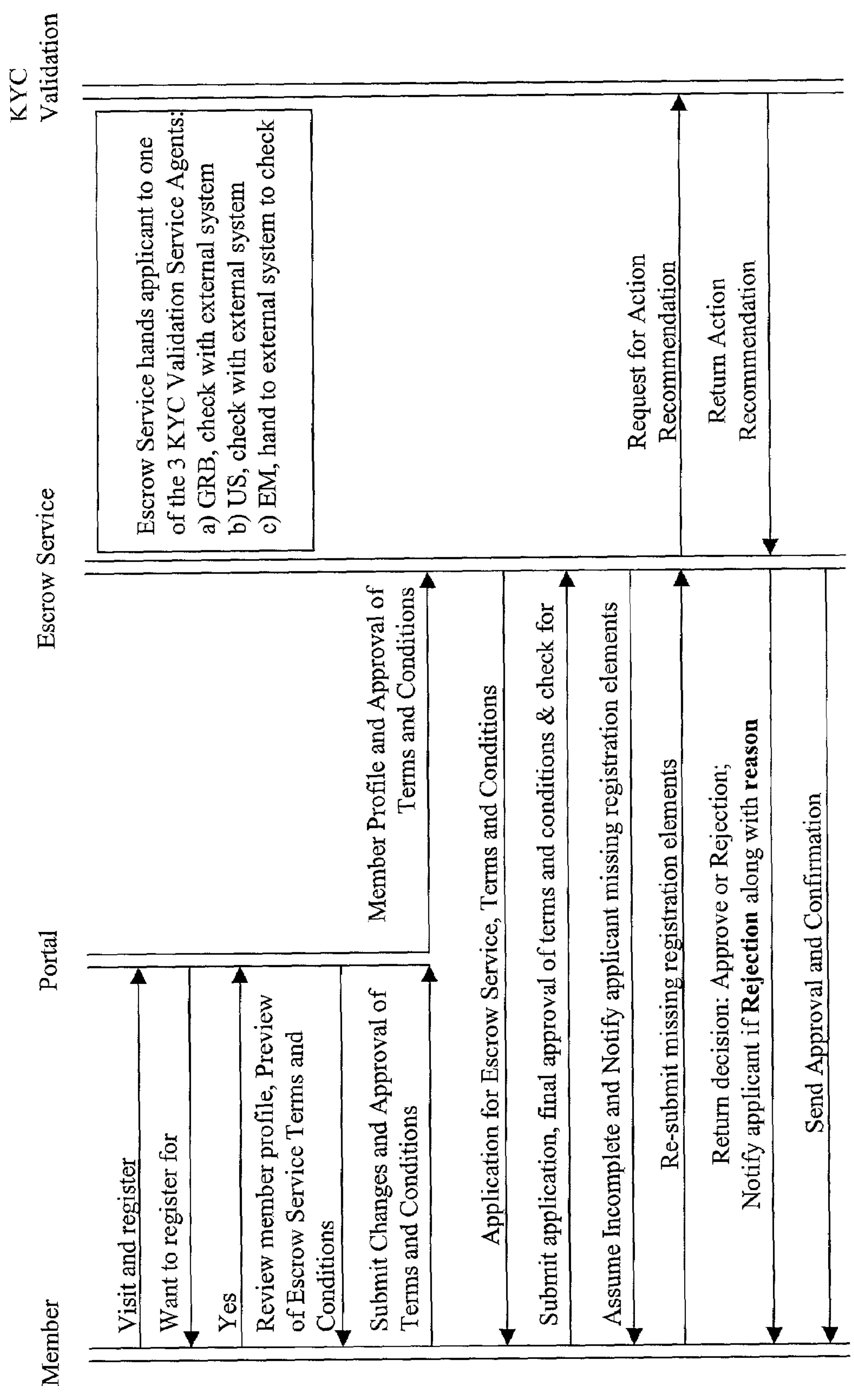
FIG. 20 illustrates and example of a generic registration use case for an embodiment of the present invention.
Figure 21:
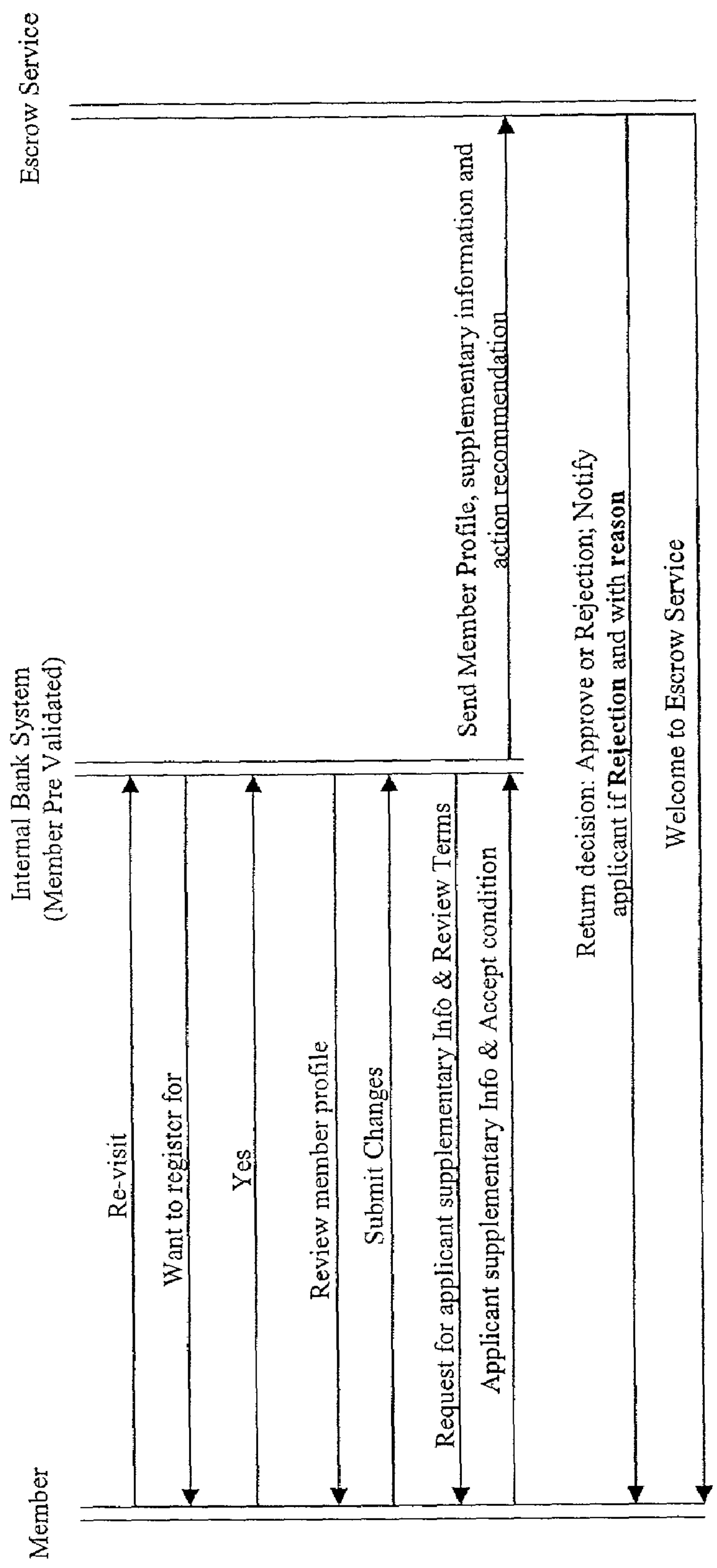
FIGS. 21 and 22 illustrate examples of exchange member registration use cases for an embodiment of the present invention.
Figure 22:
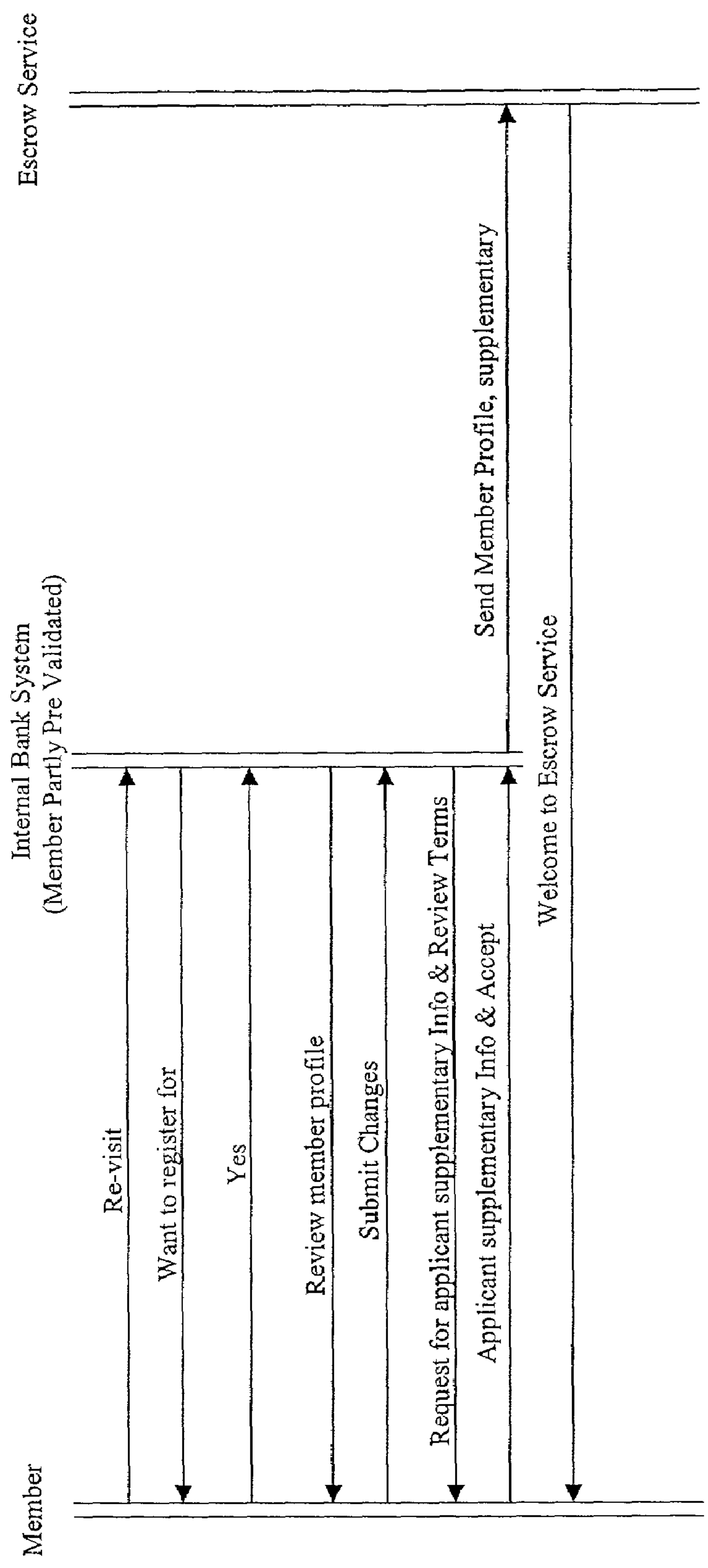

FIG. 20 illustrates and example of a generic registration use case for an embodiment of the present invention. FIGS. 21 and 22 illustrate examples of exchange member registration use cases for an embodiment of the present invention.

Another important aspect of the system for an embodiment of the present invention is the transaction process. Transactions utilizing the system can be initiated only by the buyer 12 and only from an exchange site, such as exchange portal 16. There are certain follow-up negotiations that can take place at the system website 10 and within the system. The execution of a transaction is between the buyer 12 and the seller 14, and most of the negotiations for the sale of merchandise are, in fact, accomplished at the exchange site 16. When the buyer 12 is either required to or intends to escrow a transaction because it does not know the seller 14, the buyer 12 clicks on the escrow link at the exchange site 16. This is normally another click-through link much like the click-through registration link. The exchange site 16 passes the transaction information containing the transaction data and the details of the buyer 12 and seller 14 to the escrow service 10. This is considered as an offer from the seller 14 to the buyer 12. The escrow service 10 can act as escrow agent at this point under an agreement between the seller 14, the buyer 12, and the escrow service 10, because at the completion of registration, each party agreed to terms whereby, for an individual transaction with an individual party, each promised to abide by the terms of a specific transaction as opposed to terms in general for escrowing activity.

Thus, there is a contract from the seller's perspective that has gone from the exchange site 16 to the escrow site 10, at which point, the buyer 12, who has been automatically brought to the escrow site, can review the contract, the details of which in terms of merchandise are all available for the buyer 12 to review. The buyer 12 can then move to another page on which the financial details of the contract can be reviewed, at which point, the buyer 12 can select a method of payment online on the system of the present invention. The buyer 12 can also make a selection regarding whether or not the buyer 12 wants to execute a Foreign Exchange (FX) transaction in order to pay within the buyer's currency, in case the currency of the buyer 12 and currency of the seller 14 are different.

The first process that the buyer 12 actually performs is to select a method of payment from among multiple methods of payments. Once the buyer 12 selects the method of payment, the buyer 12 can then review certain other negotiable activities and items that are displayed to the buyer 12. The first of these negotiable activities and items, for example, is by whom the escrow fee is paid. The contract as presented to the buyer 12 shows a default with the buyer 12 paying the escrow fee. However, the buyer 12 can request that the seller 14 pay the escrow fee, or the buyer 12 can express a willingness to split the escrow fee with the seller 14. The buyer 12 then reviews the method of paying the shipping charges, which are normally defaulted to the seller 14. There is likewise a default, through the exchange 16, of the inspection period. For a particular transaction, the buyer 12 may want to have either more days or less days to inspect the goods than provided by the default from the original contract.

When any of these negotiable items are clicked on by the buyer 12, it results in the contract being moved to a status whereby the seller 14 must reaffirm the seller's willingness to execute the transaction. However, this is not done through the exchange site 16. Instead, it is done within the confines of the escrow service 10, because the system for an embodiment of the present invention assures that there are always two affirmative notations made within the system, such that both the seller 14 and the buyer 12 have agreed to the terms of the contract, with the buyer 12 always being the last to approve the terms of the contract. The foregoing process is referred to as contract initiation in which the offer from the seller 14 has been presented to the buyer 14, and the buyer 12 has accepted the offer outright, or perhaps after some negotiations with the seller 14. If either the buyer 12 or the seller 14 rejects the offer made by the other party, the deal is deemed cancelled, and the parties are informed accordingly by the use of an email.

Assuming that the buyer 12 and the seller 14 have agreed to the terms of the specific contract, the next thing that the buyer 12 must do is to pay for the goods. The buyer 12 has already selected its method of payment choice. Assume, for example, that the choice of method of payment is a wire transfer. The buyer 12 is notified on the system of where to send the payment for the escrow service 10, as opposed to sending payment to the seller 14, and the seller 14 awaits the receipt of good funds from the buyer 12. Once the funds are received by the escrow service 10, the seller 14 is automatically notified by an email that the deal has moved from an awaiting payment status to an awaiting shipment status, and the seller 14 is prompted by the system to ship the goods and provide shipping details to the system.

At this point, both parties are protected by the system and method of the present invention in that the buyer 12 still has control of the buyer's money, and if the seller 14 does not ship, the buyer 12 gets the buyer's money back. The seller 14 does not have to ship the goods until the seller 14 knows that good funds are within the hands of the trusted third party. On receipt of the payment from the buyer 12, the system instructs the seller 14 to ship the goods by initiating an email to the seller 14 to do this. The seller 14 then signs on to the system and enters the tracking details of the shipment on an electronic form, so that both the buyer 12 and the seller 14 can track the shipment. In fact, both parties can cancel the deal before the goods are shipped. Once the goods are shipped, neither the buyer 12 nor the seller 14 can cancel the deal. Any cancellation at that point is actually a rejection once the goods are received by the buyer 12, which is discussed further below.

Figure 23:
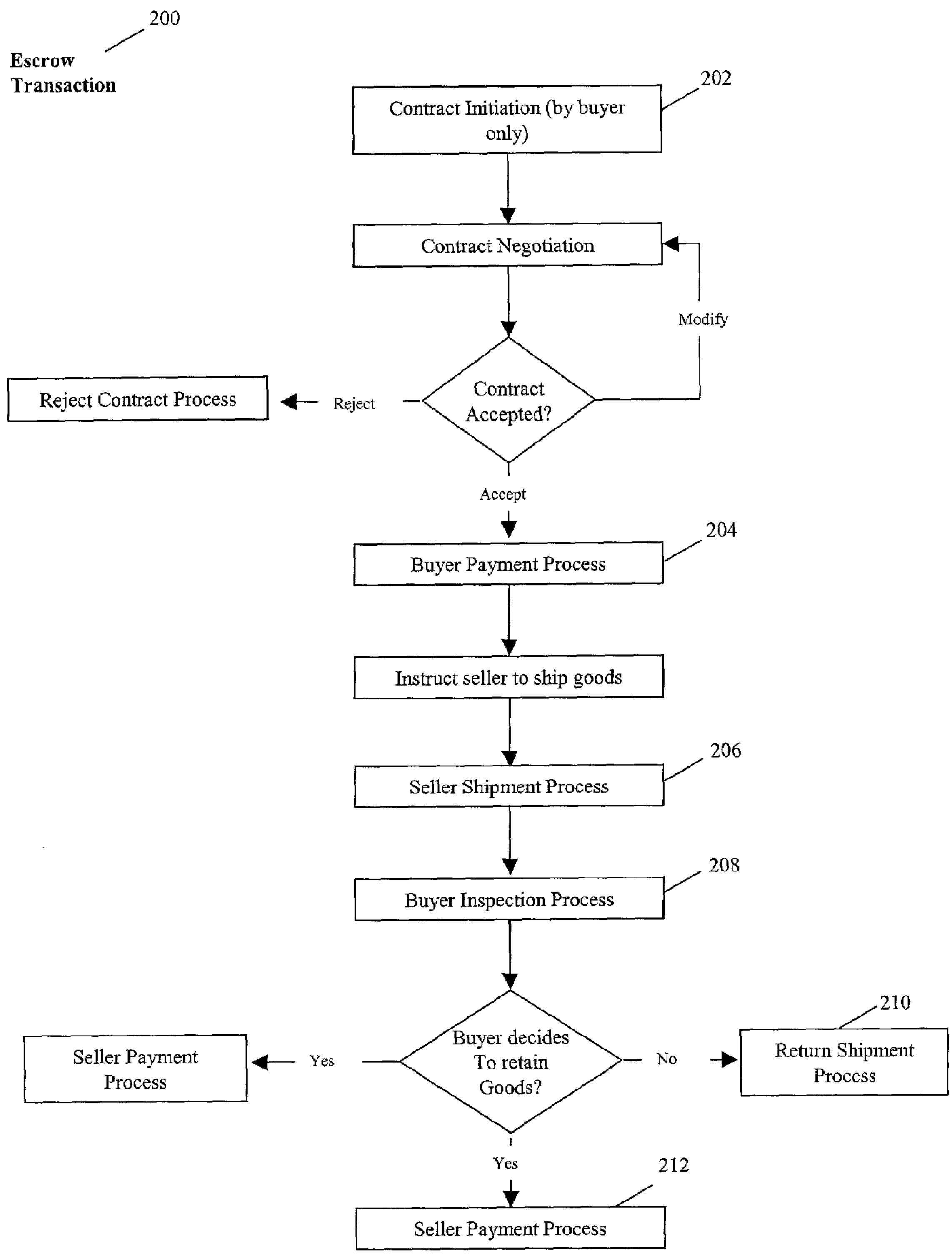
FIG. 23 is a flow chart which illustrates an example of the Escrow Transaction process for an embodiment of the present invention.

Turning now to a more detailed explanation of the escrow transaction, FIG. 23 is a flow chart which illustrates an example of the Escrow Transaction process 200 for an embodiment of the present invention. Escrow service transactions can be initiated by an end-user, for example, by initiation of the contract only by the buyer 12 and only from the exchange site 16 and negotiation and follow-up of the contract by both buyer 12 and seller 14 from the escrow service home page. The transaction is execution of the contract between the buyer 12 and the seller 14 and the follow-up of the buyer payment, shipment, receipt of shipment, acceptance of shipment and payment made to the seller 14. The main processes of the Escrow Transaction process 200 are Contract Initiation 202, Buyer Payment 204, Seller Shipment 206, Buyer Inspection 208, Buyer Rejection 210, and Seller Payment 212.

Figure 24:
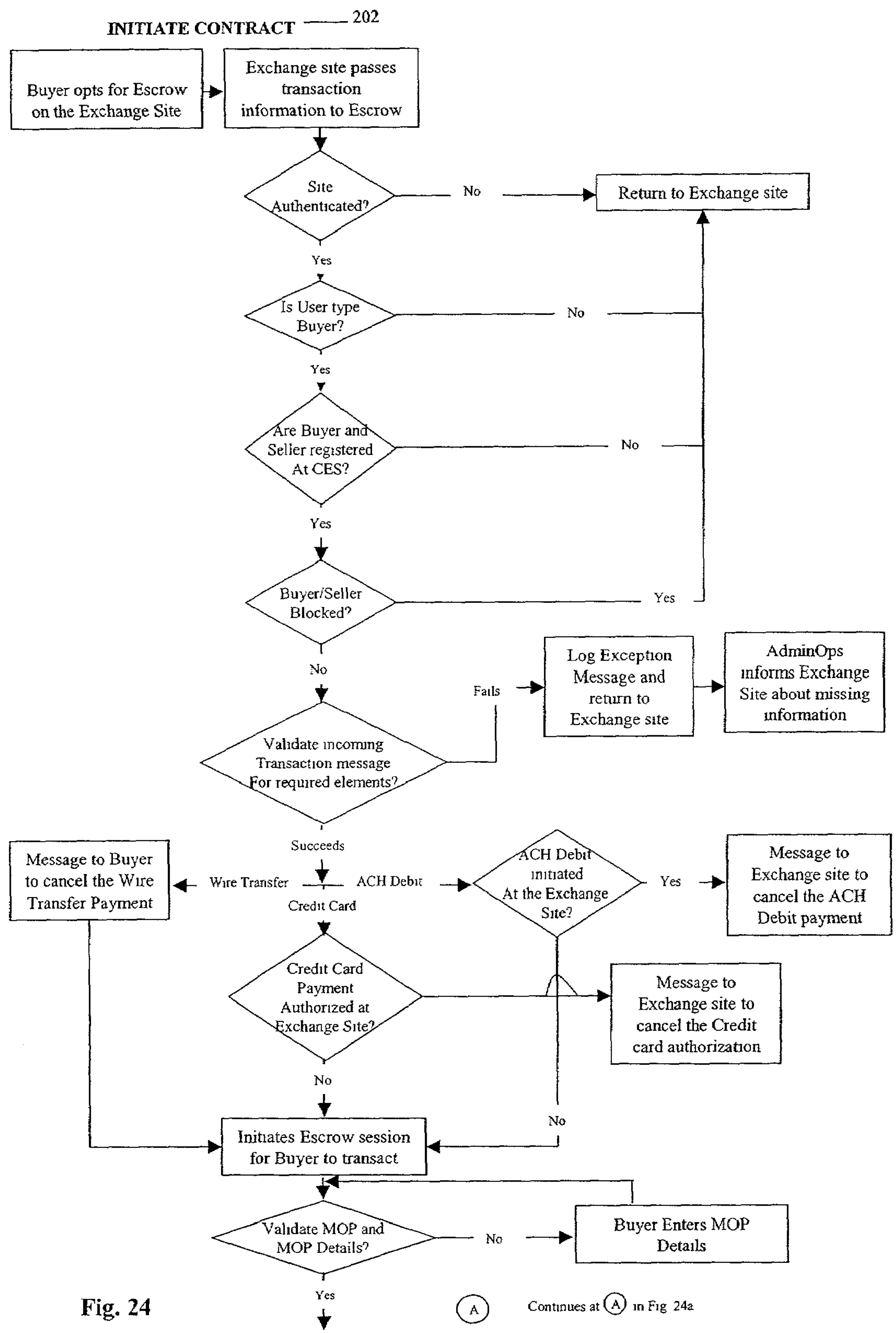

FIGS. 24 and **24*a* is a flow chart that illustrates an example of the Initiate Contract process 202 for an embodiment of the present invention. Escrow service transactions can be initiated only from the exchange site 16. When the buyer 12 intends to escrow a transaction at the exchange site 16, he/she clicks on an 'Escrow' link. The exchange site 16 passes the transaction information containing the required data of the transaction and the details of the buyer 12 and seller 14 to the escrow service 10. This is considered as an offer from the seller 14 to the buyer 12. The buyer 12 can either accept the offer from the seller 14 outright or accept after negotiations with the seller 14. If either the buyer 12 or the seller 14 rejects the offer made by the other party, the deal is deemed cancelled and the parties are informed accordingly. Once the buyer 12 confirms the offer made by the seller 14, the buyer 12 must make the payment arrangements according to a 'Method of Payment' (MOP) selected. On receipt of payment from the buyer 12, the system instructs the seller 14 to ship goods. The system waits for a stipulated period for a 'Buyer Payable Amount' from the buyer 12. In case the 'Buyer Payable Amount' is not received, the deal is cancelled and seller 14 is informed accordingly. Before receipt of payment by the system, the buyer 12 and seller 14** can cancel the accepted deal.

On receipt of payment from the buyer 12, the system instructs the seller 14 to ship goods. The seller 14 enters the tracking details of shipment so that the seller 14, buyer 12, and AOM 46 can track the shipment. The seller 14 can cancel the deal before the shipment (first in case of part-shipment) is shipped. Once the goods are shipped, neither the buyer 12 nor the seller 14 can cancel the deal. The AOM 46 tracks and updates the receipt of goods by the buyer 12. Once the buyer 12 receives the goods, the inspection period begins. The buyer 12 can either accept or reject the goods in the inspection period specified in the contract. If the buyer 12 does not accept or reject goods within this time, the system assumes that the goods are accepted and effects the seller payment and informs the buyer 12 accordingly. If the buyer 12 inspects and accepts goods within the inspection period, the seller 14 is paid the due amount and the exchange site 16 is paid its commission fees. The buyer 12 may reject the entire shipment or a part shipment. If the buyer 12 rejects a shipment fully or partially, the buyer 12 must send the rejected goods back to the seller 14. In case of part rejection, the seller 14 is paid for the goods that are accepted by the buyer 12. Once the seller 14 confirms the receipt of rejection goods, the buyer 12 is refunded the money due for the rejected goods.

The seller 14 is paid for the shipments minus a 'Site Commission'. In case the seller 14 has agreed to pay the escrow fees, they are deducted from the payment due. In case the buyer 12 has opted for 'Credit Card' as the MOP, the credit card charges are applied to the seller 14. The exchange site 16 is paid the commission amount as a percentage of the amount, or as a fixed amount, due to the seller 14, and the percentage or fixed fee is fixed for all sellers. The offer and counter-offer of a contract continues until the buyer 12 confirms the acceptance after the seller 14 confirms. The seller 14 always displays amounts in the contract at the exchange site 16 in his/her base currency. The exchange site 16 is paid the site commission twice a month. The exchange site 16 passes the tax amount for each item of the transaction to the escrow service 10. It is possible that the exchange site 16 may authorize a payment before the buyer 12 decides to escrow a transaction. In case the payment has been authorized at the exchange site 16, an 'Authorization Indicator' is passed that is set to 'Y'. The exchange site 16 should handle the authorizations before a user is allowed to come to the escrow service 10.

If the buyer 12 agrees to pay the shipping cost, the payment is paid to the escrow service 10 and the buyer 12 does not independently pay to the shipper 32. When the seller 14 acknowledges receipt of rejected goods from the buyer 12, the escrow service 10 pays the buyer 12 the rejection amount. One debit and one credit transaction is allowed in a day for an escrow account 24. The escrow service 10 absorbs any foreign exchange (FX) loss related to an FX reversal while paying back the buyer deal amount in his/her currency in case of deal cancellation. No charges is associated with the transfer of funds from a transaction account 26, 28 to the escrow account 24.

An additional user has the same right and privileges as the key contact person representing the company. A banking engine 38 is used to provide an indicative FX rate for a pair of currencies. The banking engine 38 in turn interfaces with a FX data management system 30 to get periodic updates for the currency rates. KYC and AML checks are manually done by the AOM 46. The seller 14 accepts credit card payments from the buyer 12 and also accepts all the credit cards defined in the escrow service 10. If buyer 12 pays the deal amount by credit card, the seller 14 absorbs the credit card charges. If the buyer's MOP for payment of the deal amount to the escrow service 10 is wire transfer, the buyer 12 pays the wire transfer charges. Similarly, if the seller's MOP for receiving funds from the system is wire transfer, the seller 14 pays the wire transfer charges.

The decision to use the escrow service 10 for a transaction at the exchange site 16 must be made before the buyer 12 is asked to pay at the site. Only a buyer 12 can initiate an escrow service transaction from an exchange site 16. A seller 14 cannot initiate an escrow service transaction. The exchange site 16 passes all the pre-defined required elements in an XML message to the escrow service 10 to escrow a transaction. The exchange site 16 passes an original reference ID that is the transaction ID of the transaction on the exchange site 16. A predetermined maximum number of items, such as nine items, can be sent from the exchange site 16 in a transaction for escrow. All items are offered to the buyer 12 in the base currency of the seller 14. For example, if the base currency of the seller 14 is defined as US dollars (USD), all the items are offered to the buyer 12 in USD. Taxes are available at item level from the exchange site 16. All line item amounts on the contract are displayed in the seller currency. The total amounts may be displayed in both buyer and seller currencies.

The inspection period is determined from the default value in the site registration that may range, for example, from 1-30 days. By default, the system assumes that the buyer 12 pays the shipment cost and the escrow Fees. Each deal must have two consecutive confirmation flags, one from the seller 14 and one from the buyer 12. The buyer 12 is the last party to confirm a deal. There are three methods of payment that the buyer 12 can use to make payment for the escrow transaction, namely 'Credit Card', 'Wire Transfer', and 'ACH Debit'.

The exchange site 16 passes a message to the escrow service 10 when the user clicks on the 'Transaction' link. Elements such as site ID, exchange user ID, actively registered and function ID are mandatory elements in the message. When the exchange site 16 brings up an escrow service session to escrow a transaction, it passes a XML message containing certain required elements of information. All validations, processing and screen displays are done by the escrow service system 10. At any point, if the buyer 12 decides to cancel the contract session or if the buyer 12 finalizes and accepts the contract, the escrow service session is terminated, and the browser window is closed.

The escrow service 10 performs a number of validations before displaying the Escrow contract to the buyer 12. For example, the system validates if the exchange site 16 is authenticated and properly registered with the escrow service 10. An exchange site may be blocked by the AOM 46. If the exchange site 16 is not properly registered with the escrow service 10, the user is given an error message indicating that he/she cannot escrow the transaction from the particular exchange site. The system validates if the user is the buyer 12 or the seller 14. If the user is coming in as the seller 14, the system displays an error message indicating that only the buyer 12 can initiate escrow transactions. The system then checks whether both the buyer 12 and the seller 14 are registered at the escrow service 10 and the status is "Active". In case the buyer 12 or seller 14 or both are not registered, an error message is displayed indicating that the buyer 12 or seller 14 or both should be registered at the escrow service site 10 to initiate the escrow service. If the status of the registration of buyer 12 or seller 14 is not "Active" and is in "Pending"/"Change Pending"/"Reject"/"Redo"/"Blocked" status, the system displays an error message indicating that the buyer 12 or seller 14 is not actively registered with the escrow service 10. If the exchange site 16 sends a XML message without mandatory information (required elements), the buyer 12 is given an error message indicating that the exchange site 16 has not passed sufficient information to escrow the transaction. The system validates if the transaction currency is the same as the seller base currency (defined at the time of seller company registration). The system also validates that a gross amount and total taxes is the sum of the line items gross amount and item tax. In case any validation fails, the escrow service session is terminated and the browser window is closed.

In case the XML message is sent without any mandatory information, an error is logged. This error requires the AOM 46 to send an email message to the exchange site 16 indicating that the mandatory information in the message from the exchange site 16 is missing. Once the initial pre-processing is completed, the system brings up a sign-on screen for the buyer 12. When the buyer 12 decides to escrow a transaction and the validations are successful, the user is displayed the sign-on screen. The screen displays the escrow service user ID identified by the site name, exchange user ID and the company ID. The buyer 12 must enter his/her escrow service password that the system validates. The buyer 12 is then taken to a product information screen. The system generates a unique deal ID for the transaction. It is assumed that the seller 14 has made this offer to the buyer 12. The transaction is now in 'Pending Acceptance' status. The exchange site 16 passes its own original reference ID for the particular transaction. The system maintains a cross-reference of the deal ID (generated) with the site original reference ID. In exchange commission settlements, the system refers to the site original reference ID to help the exchange 16 track its receivables. The system then performs the Global Interdict check. If the check fails, the system displays an error message to the buyer 12 indicating that the credit validations have failed. The system marks the transaction as 'System Reject' with the results of the Global Interdict system.

Once the initial validation and sign-on process is completed, the system brings up a contract session for the particular transaction. The contract screen is split into a number of screens, such as 'Product Information', 'Financial Information', and 'Payment Confirmation'. FIG. 25 is a sample Initiate Escrow Contract—Product Information screen 204 for an embodiment of the present invention. The Product Information screen 204 is same for 'Initiate Contract' (from exchange site 16) and for 'Pending Deals' (from the escrow Service home page). On the Product Information screen 204 of the contract, all the details of the transaction, such as the buyer details including buyer currency 206, seller details including seller currency 208, 'Ship To' details 210, item code 212, item description 214, unit price 216, number of items (quantity) 218, total goods cost 220, and total taxes 222, from the exchange site 16 are displayed. The screen also displays the deal ID 224 generated by the system. All amounts at line item level are shown in the seller currency. The total amounts are also shown in the seller currency.

FIG. 26 is an example of an Initiate Escrow Contract Financial Information GUI screen 226 for an embodiment of the present invention. The Financial Information screen 226 displays the financial details of the contract, such as method of payment 228, total goods cost 220, total taxes 222, shipment cost 230, escrow fees, inspection days 234 and the buyer payable amount (total amount due from the buyer 12). The total goods cost 220, total taxes 222 and shipment cost 230 are shown in seller currency. The buyer payable amount, which is the buyer receivable, is shown only in the buyer currency. Escrow fees are shown in the currency of the payor. The buyer 12 sees details mentioned in the contract and can update items on the screen, such as method of payment 228 (select from 'Credit Card' 238, 'Wire Transfer' 240 and 'ACH' 242) and the details of 'Shipping Cost (to be borne by Buyer or Seller) 244, and Escrow fees (to be borne by Buyer or Seller or Split) 246, and Inspection Days 234. The shipment cost is known from the exchange site 16 and sent in a message to the system.

In case the exchange site 16 passes zeroes in the shipment cost, the system assumes that the shipment cost is borne by the seller 14 by default. In case of a non-zero amount in the shipment cost from the exchange site 16, the system assumes that the shipment cost is borne by the buyer 12 by default. Accordingly, the appropriate radio buttons are enabled on the Financial Information screen 226.

By default, the system assumes that the escrow fees are borne by the buyer 12. The escrow fees are computed taking the total deal amount and applying the escrow fee schedule. The inspection days 234 are defaulted to the default value for the exchange site 16. This is the contract offer from the seller 14 to the buyer 12. If the buyer 12 accepts the offer without any changes to the payment terms on the contract screen 226, it indicates a confirmation from the buyer 12, and the contract is deemed as completed and updated to 'Accepted' status. If the buyer 12 makes any changes to any of the payment terms on the contract screen 226, the deal remains in the 'Pending Acceptance' status and awaits confirmation from the seller 14. If the seller 14 accepts the key element changes done by the buyer 12, the deal must be finally accepted by the buyer 12. The contract remains in 'Pending Acceptance' status until it is either accepted by both parties or rejected by one of the two parties.

The escrow service 10 interfaces with the banking module 38 to get the indicative rates. The banking module 38 updates the FX rates at periodic intervals from the FX data management system 30. The processing involved in FX includes, for example, seller currency to USD to compute the tier amount, USD to buyer or seller currency to compute the escrow fees, and seller currency to buyer currency to compute buyer receivable. The escrow fee schedule is maintained in USD in an escrow fee table. The fee amount varies depending on the amount tier in which the total deal amount falls. In case the seller currency is non-USD, the system must compute the USD equivalent of the total deal amount. Based on this computation, the escrow service 10 can determine the tier and compute the escrow fees that will be applied to a transaction. Based on the amount tier and the total deal amount, the escrow service 10 computes the escrow fees. The escrow service 10 gets the indicative rates for FX equivalent computations from the banking module 38. Based on who pays the escrow fees, there are one or two calls to the banking module 38 to get the rates. In case the seller currency is not the same as the buyer currency, the system gets an indicative rate from the banking module 38 for seller currency to buyer currency.

Once the indicative rate is available from the banking module 38 from seller to buyer currency, the system applies the customer spread, depending on the currency pair, amount slab (sell currency—buyer currency amount), and method of payment. The customer spread is a percentage that is added to the rate received from the banking module 38. This rate is then used to compute the buyer receivable in buyer currency. Facilities to print the contract details and to reject the contract are available on both the Product Information 204 and the Financial Information 226 screens. When the buyer 12 or the seller 14 reject a contract, the contract is put in 'Reject' status with details as to who (buyer 12 or seller 14) has rejected the deal and the reject date, and the system sends an email message to both the buyer 12 and seller 14 indicating the rejection with the Rejection Details.

FIG. 27 shows an example of a Payment Confirmation (from Buyer 12) GUI screen 248 for an embodiment of the present invention. A payment confirmation function allows the buyer 12 only to confirm the total payment amount in real-time executable rates for the transaction. The payment confirmation function recaps the information displayed on the Financial Information screen 226 such as the method of payment (MOP) 228, total goods cost 220, total taxes 222, shipment cost 230, escrow fees, buyer payable amount, currency, and inspection period 234. In case of wire transfer 240, the screen displays the bank name 250 and account number to which the buyer 12 should wire the total amount. All amounts to be paid by the buyer 12 are shown in the buyer currency in executable rates.

Figure 28:
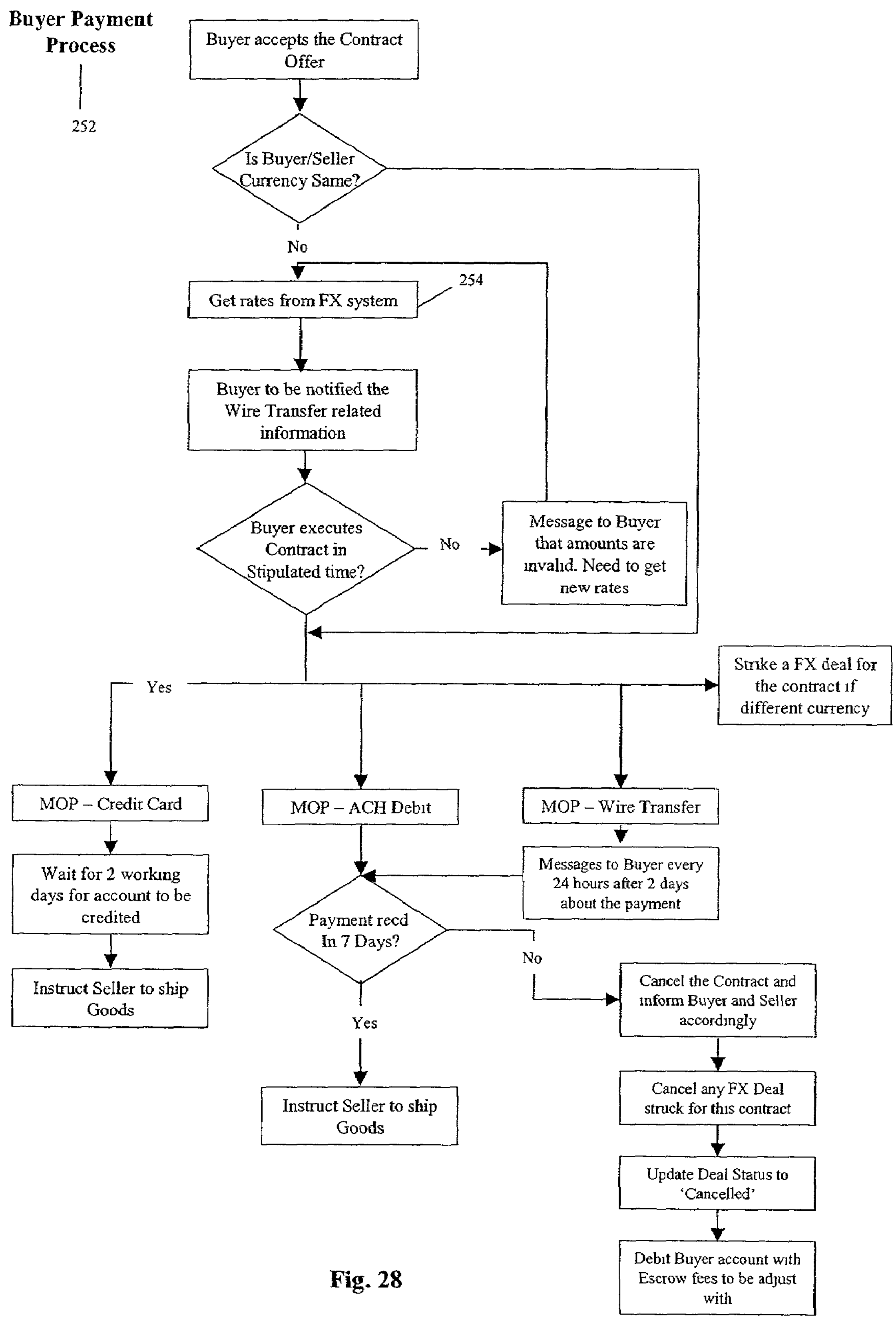
FIG. 28 is a flow chart that shows an example of a Buyer Payment process for an embodiment of the present invention.

FIG. 28 is a flow chart that shows an example of a Buyer Payment process 252 for an embodiment of the present invention. A number of processes take place before the Payment Confirmation screen 248 is displayed, including, for example, FX data management system Interface to get an FX Quote 254. In case of cross-currency transactions, such as USD-Great Britain pounds (GBP), GBP-USD, GBP-Australian dollars (AUD), a call is made to the FX data management system 30 to get the FX quote. Depending on the MOP selected by the buyer 12, different rates are applied to compute the amounts. For example, for 'Credit Card', a four day forward rate is applied, for 'Wire Transfer', a seven day forward rate is applied, or for 'ACH Debits', a seven day forward rate is applied. The FX data management system 30 is used to obtain currency price quotes from the financial institution. Typically, rates change on a continuous basis, and a price quote obtained from the FX data management system 30 is valid only for 10 seconds. However, for the escrow application 10, the price quote obtained from the FX data management system 30 is valid for a longer period, such as 1 minute. This is the window in which the buyer 12 must complete the transaction, and the window starts only from the point of time the price quote is given to the buyer 12. All FX price requests are sent to the FX data management system 30 on a real time, one-off basis using a particular function. The FX data management system 30 indicates if the rate returned is live or not.

The request is processed according to the time of the returned message and whether or not the rate is live. If the rate is live and the customer confirms/returns his/her request within, for example, 25 seconds, the FX deals is done on a real time basis. If the returned rate is live and the customer submits his/her request, for example, between 30 seconds and two minutes, and the rate has not changed, the deal is done as a real time deal. If the rate has changed, the deal is done as a market order. If the user submits his/her request, for example, after two minutes, a new rate is requested from the FX data management system 30 and displayed back to the user for confirmation, and the cycle resets itself. If the returned rate is not a live rate, the currency exchange performs a market deal with the FX data management system 30. The rate to the user is guaranteed, for example, for 2 minutes. After the price quote has been obtained from the FX data management system 30, if any of the fields which affect the FX deal, such as the bought or sold/amount or currency, are changed, a fresh price quote must be requested from the FX data management system 30. Also, if the customer exceeds, for example, the one minute rate limit, a fresh price quote is requested. The delivery date for the currency purchased depends on the settlement time required for the customer payment. All days are calculated in terms of banking days and not as calendar days, as the delivery is through the banking system. Only one of a buy amount and a sale amount is provided and the other one is null. The FX data management system 30 provides price quote and quote reference number for given FX deal details. An error code is returned if the FX data management system server not available and/or limits are exceeded.

The price that is quoted to the customer is the rate obtained from the FX data management system 30 with a predetermined spread to the customer added. The customer spread is a percentage that is added to the price received from the FX data management system 30. The rate is taken from a table for different currency pairs, method of payment and credit card types. There is a disclaimer on the screen indicating that the amounts with the computed rates are applicable for a time, for example, of two minutes. An exact time is predetermined and set up in the parameters table. If the buyer 12 does not confirm to pay within the time specified and confirms after the time period is over, the system displays a message indicating that new amounts must be computed. The system then computes the new amounts and refreshes the screen. When the buyer 12 clicks on an "OK" button, he/she is taken to the Payment Confirmation screen 248, and the amounts on this screen are displayed with the new executable rate.

A credit card processing gateway interface enables the escrow service 10 to authorize credit card payments of customers and perform address verification checks. The card details are authenticated based on the details provided. If the card fails authentication, the transaction is rejected, and the buyer 12 must change the payment details and re-submit the request. In such a case, the transaction is treated as a fresh transaction, and the price quoted in the previous transaction is no longer valid. The billing address is run through the an address verification system (AVS), and any mismatches are rejected. A card verification value or CVV is a three-digit number appearing on the back of credit cards, such as Visa and MasterCard credit cards. American Express version is 4-digits in length and appears on the front of the card. This information is an added security measure, since the card must be present at the time of registration and lessens the chance of fraudulent use such as a computer-generated card number. This number must be collected from the user and maintained in the escrow service database, preferably in an encrypted fashion, under the same security as the card number itself. For FX transactions, the escrow service 10 then initiates a deal with the FX data management system 30. The FX data management system 30 initiates an FX deal based on an acceptance of a quote. An error code is returned if the FX data management system 30 server is not available and/or the rate validity expired.

FIG. 29 shows a sample Pending Deals GUI screen 256 for an embodiment of the present invention. A pending deals function is available on the escrow service home page. This function is available to the buyer 12 and the seller 14 to view the deals in 'Pending Acceptance' status. When the user is registered as 'Buyer/Seller', the user is prompted to select the user type before he/she can see the pending deals. When the user selects 'Buyer' as user type and clicks on 'Continue', he/she sees the list of pending deals entered as a buyer. When the user selects 'Seller' as user type and clicks on 'Continue', he/she sees the list of pending deals entered from all buyers defining him/her as the seller 14. If a deal is in 'Pending Acceptance' status for more than a defined time period from the date it was initiated (the time in number of days is defined in the parameters table), it will remain in the same status forever. As an alternative, the escrow service system 10 closes the particular deal and updates the contract status to 'System Reject'. The Pending Deals GUI screen 256 displays a list of all the deals that are pending for a user type ('Buyer' or 'Seller' or both) for all exchange sites. The list of pending deals is sorted by Site Name 258, Deal Date 260 (descending order) and Seller/Buyer 262. The user can then select a particular deal and view the details.

FIG. 30 is an example of a Pending Payments GUI screen 264 for an embodiment of the present invention. A pending payments function is available on the escrow service home page to both buyer 12 and seller 14. This function displays the payments "Due" which are confirmed by the buyer 12 but not yet received by the escrow service 10. This function also allows both the buyer 12 and the seller 14 to cancel a deal. When the user is registered as a 'Buyer/Seller', the user is prompted to select the user type before he/she can see the pending payments. When the user selects 'Buyer' as user type and clicks on 'Continue', he/she sees the list of all of pending payments that he/she has confirmed to pay. When the user selects 'Seller' as user type and clicks on 'Continue', he/she sees the list of pending payments due as a seller 14. The status values include, for example, 'Contract level—Accepted' and 'Buyer Payment—Pending'.

The buyer 12 or the seller 14 can cancel a deal before the full receipt of buyer payment, but part cancellation of a deal is not allowed. In case of cancellation of the deal where the buyer 12 agrees to bear the escrow fees and before receipt of the funds from the buyer 12, the escrow fees payable by the buyer 12 (partly or fully) are waived and no outstanding is applied for the escrow fees. In case of cancellation of the deal where the seller 14 agreed to bear the escrow fees and before receipt of the funds from the buyer 12, the escrow fees payable by seller 14 (partly or fully) are waived and no outstanding is applied for the escrow fees. There is a buyer refund due to cancellation in this case as the payment has not been received by the system.

The Pending Payments List screen 264 displays a list of all the deals for which the payment has not been received by the system. The deals are sorted by Site Name 266 and Deal Date 268 (descending order). If the buyer 12 accesses this function, the deals are sorted by the seller 14, and if the seller 14 accesses, the deals are sorted by the buyer 12. The buyer 12 or seller 14 can then select a particular deal and view the details. On the detail screen, the buyer 12 or the seller 14 can cancel the deal. The Pending Payments List process displays the payment details of the deal. The buyer 12 or seller 14 can view the details and if required, cancel a deal. If a deal is cancelled before receipt of payment either by the buyer 12 or the seller 14, the contract status is updated to 'Cancelled' with 'System Date' as the cancellation date. If the buyer 12 agreed to pay the escrow fees (partly or fully), the escrow fees are waived by the system, and no outstanding is applied for the escrow fees. If the seller 14 agreed to pay the escrow fees (partly or fully), the escrow fees are waived and no outstanding is applied for the Escrow Fees. The system keeps a track of such cancellations, and a counter 'Number of Defaults' that is maintained for each user (buyer 12 or seller 14) is incremented each time the user cancels a deal. Based on business decisions on the number of defaults allowed, the AOM 46 can block the user (buyer 12 or seller 14).

In cases where FX is involved, it is necessary for the system to initiate a FX deal with the FX data management system 30 to reverse the original FX deal. This deal is initiated as a TOM deal. This is required to convert the buyer payment which is converted to seller currency by the original FX deal into the buyer currency. The parameters passed to the FX data management system 30 are the same as at the time of payment confirmation. However the currencies and the amounts are now reversed. There is no spread applied by the system. The amount which must be obtained due to deal reversal is the amount for which the FX deal was initiated. For example, if the original FX deal resulted in converting 1000 GBP into 1666 USD, the amount for which the deal reversal must be done is 1000 GBP. However, any FX exchange profit or loss (P/L) must be calculated, due to the difference in buy rate and sell rate. This amount is in the seller currency. The escrow service 10 then books this FX deal with the banking module 38 that then settles the deal. The escrow service 10 also reverses the buyer receivables that are booked at the time of payment confirmation. The system sends an email message to both the buyer 12 and seller 14 indicating the cancellation of the deal with details such as deal ID, cancelled by, and the cancellation date.

Figure 31:
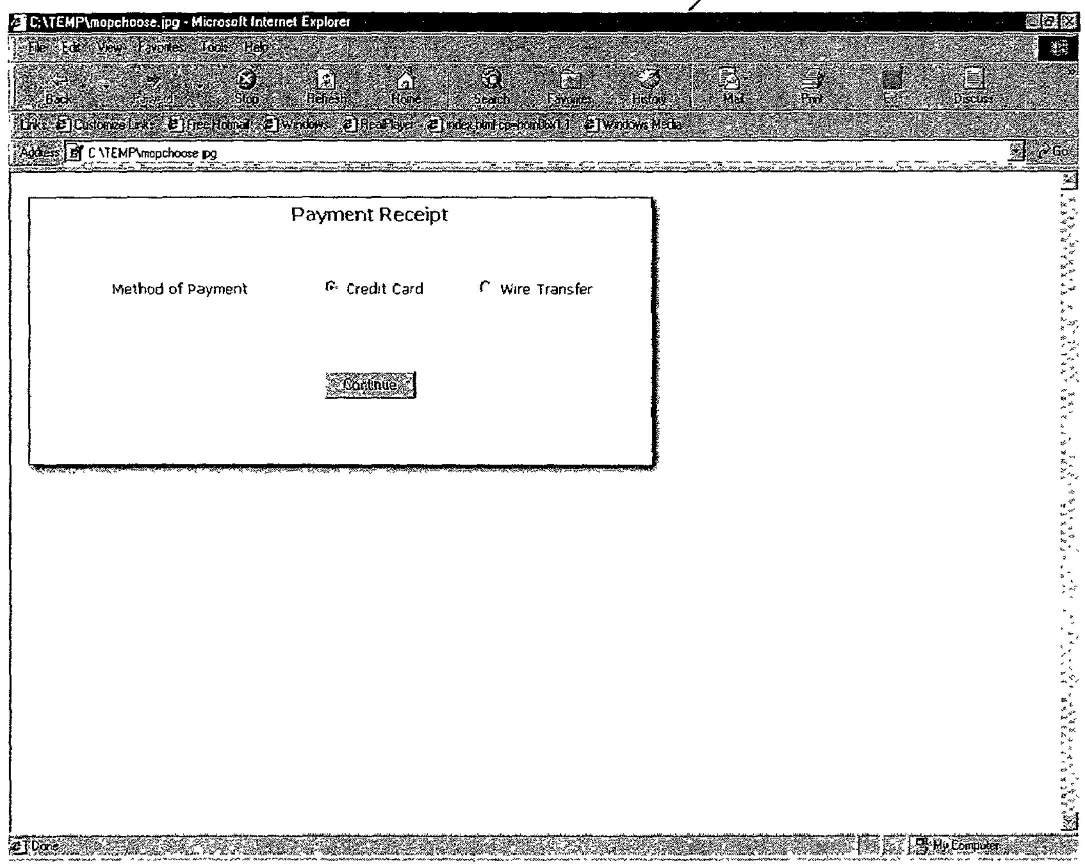
FIG. 31 show an example of a Payment Receipt GUI screen for an embodiment of the present invention.
Figure 32:
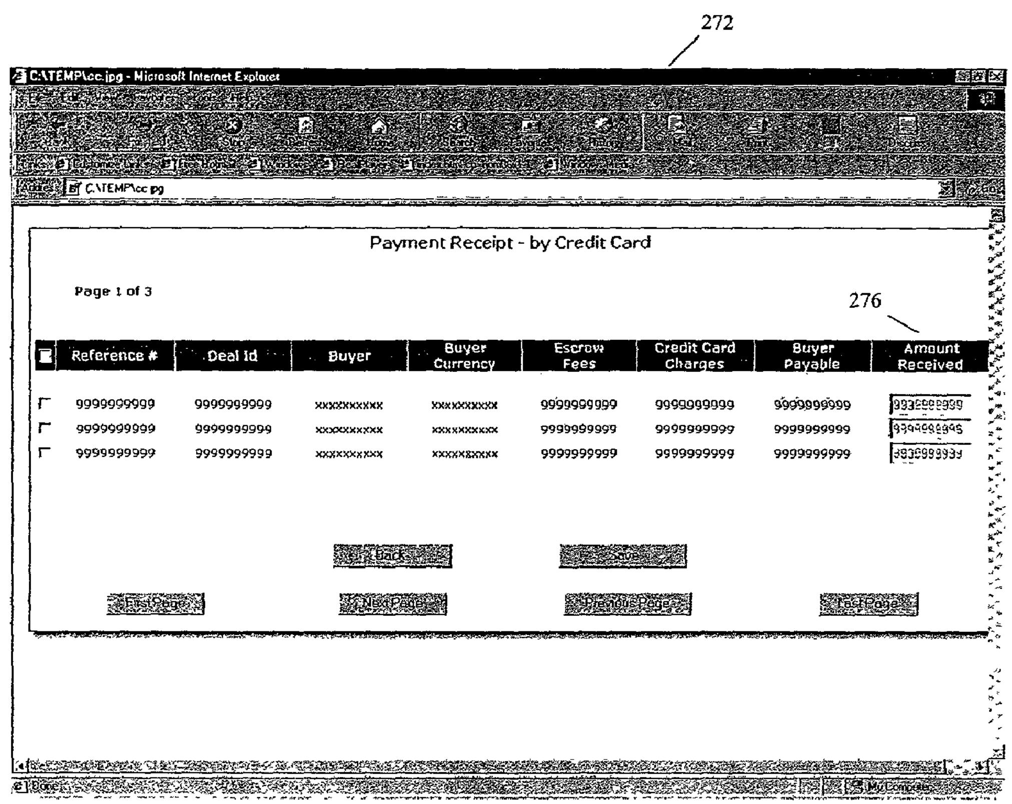
FIGS. 32 and 33 show examples of Payment Receipt by Credit Card and Payment Receipt by Wire Transfer GUI screens respectively for an embodiment of the present invention.
Figure 33:
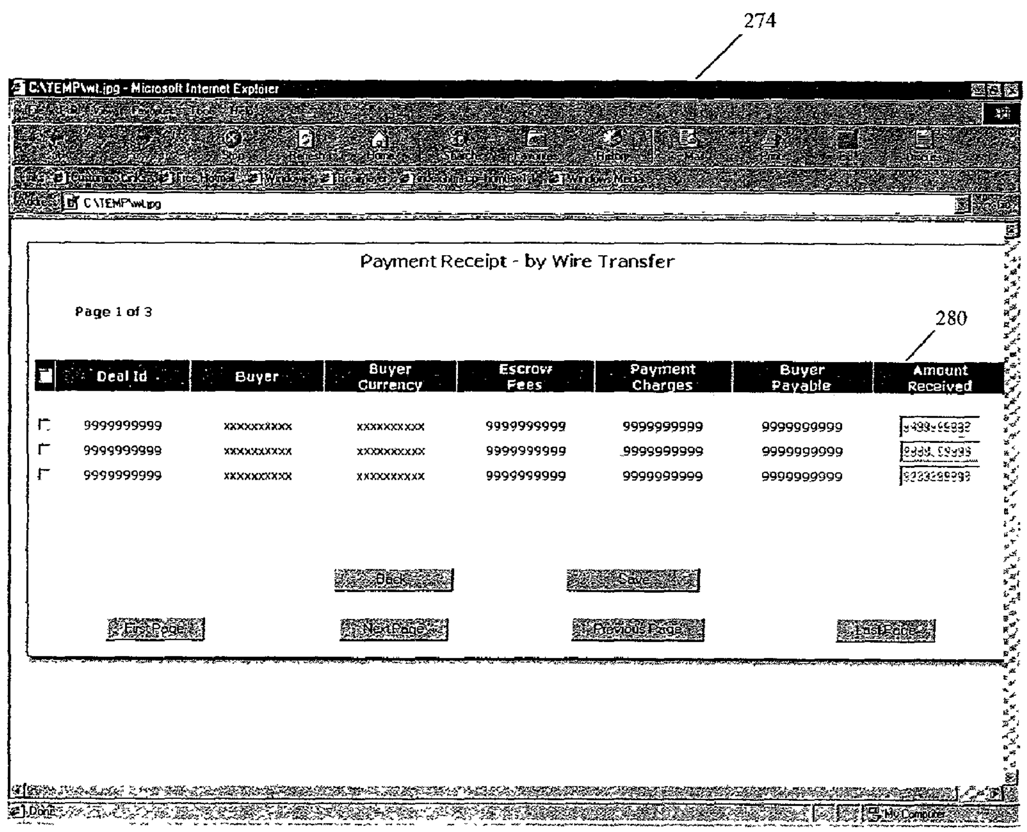

FIG. 31 show an example of a Payment Receipt GUI screen 270 for an embodiment of the present invention, and FIGS. 32 and 33 show examples of Payment Receipt by Credit Card 272 and Payment Receipt by Wire Transfer 274 GUI screens respectively for an embodiment of the present invention. Depending on the method of payment (MOP) selected by the buyer 12, processing of payment receipt includes, for example, in the case of a 'Credit Card', the payment is received from the credit card issuing bank within two (2) working days; in the case of a Wire Transfer, the payment is expected within seven (7) working days; and in the case of an ACH Debit, the payment is expected within seven (7) working days. Payments from the buyer 12 are received in the seller's transaction account 28 (financial institution) in the buyer currency and must be recorded into the escrow service 10. For both 'Credit Card' and 'Wire Transfer', an AOM utility is used to record the buyer payments. The utility allows the AOM 46 to select the MOP and the currency in which the payment has been received to record the buyer payments.

Depending on the MOP, various processing occurs. In the case of credit card payments, the AOM 46 records the payments by using an administrative utility. The credit card issuing bank or the credit card gateway issues a statement indicating the details of the transactions for which the total amount is credited into the direct deposit account (DDA account). This statement refers to an authorization number which is recorded at the time of the credit card authorization during payment confirmation. The Payment Receipt screen 272 shows all the credit card payments due irrespective of the deal date sorted in ascending order of deal date. It is assumed that the payment received from the credit card issuing bank for a transaction is for the total buyer payable amount for a deal and not net of credit card charges. For example, if the buyer payable amount is USD 1000 and the credit card charge is USD 50, the amount received is USD 1000. The buyer payment received column 276 defaults the value to the expected payment amount. In case of credit card payments, this is the buyer payable amount. The buyer payment received column 276 can be updated to record a lesser or greater amount. Any differences between the buyer payment expected and the buyer payment received is recorded as the payment processing P/L. The authorization number is used to reconcile the payments received. Regarding the processing, the AOM 46 selects the deal ID based on the credit card authorization number and enters the amount received. This amount is net of credit card charges applied to the buyer payable amount. The AOM 46 enters the amount received by the bank (DDA Account) for the deal on the screen. The system then updates the deal with buyer payment status as "Received" and buyer payment received amount and the payment processing P/L. The system calculates the amounts using pre-defined formulae and updates the database.

In case of wire transfer as the MOP, the AOM 46 records the payments by using an administrative utility. The AOM 46 uses a software tool which displays incoming wire transfers. The payment receipt screen 274 shows all the wire transfer payments due irrespective of the deal date sorted in ascending order of deal date. The payment received should be the net of wire transfer fees. For example, if the buyer payable amount is USD 1000 and the wire transfer fees are USD 40, the amount received is USD 960. The Buyer Payment Received column 280 defaults the value to the expected payment amount. The Buyer Payment Received column 280 can be updated to record a lesser or greater amount. The difference between the buyer payment expected and the buyer payment received is recorded as the payment processing P/L. With respect to processing, the AOM 46 selects the deal ID and enters the amount received. This amount is net of wire transfer fees applied to the buyer payable amount. The AOM 46 enters the amount received on the screen by the seller's bank 28 (DDA Account) for the deal. The system then updates the deal with buyer payment status as "Received" and buyer payment received amount and the result in computing the wire transfer fees and the payment processing P/L. The system calculates the amounts using pre-defined formulae, and updates the database.

For both types of payments, the system sends an email message to the seller 14 indicating that the payment is received and to ship the goods. The escrow service 10 intimates all incoming payments by currency and provides a handoff to the banking module 38 giving, for example, breakup of seller payment, escrow fees, and wire transfer fees. Two calls are made to the banking module 38, one for reversing the consolidated buyer receivables and the other for deal level seller payable and fees. At a pre-defined cut-off time during the day, the escrow service system 10 consolidates an amount that needs to be moved to the escrow account 24 held with the escrow agent. The escrow service 10 then hands off a funds transfer request to move the net total amount from the DDA account to the escrow account 24 held with the escrow agent. This request is made separately for each currency, and the site is defaulted to the main branch of the banking module 38. Only deals for which the incoming funds have been received and the FX settlement (if applicable) has taken place are considered for placing funds in the escrow.

A number of business rules apply to this process. For example, there is only one credit per day to the escrow account 24 for each currency. The amount that is put into the escrow account 24 is the total deal amount net of escrow fees payable by seller 14 and credit card charges. The accounting of this movement is done in the banking module 38. Once the amount has been moved into the escrow account 24, the escrow service 10 updates the status at the deal level to indicate that the funds have been moved. The escrow service 10 processes until all the currencies are processed, including, for example, selecting a currency from the currency table; selecting all deals where buyer payment status is "Success", the contract status is "Accepted", the credit escrow account flag is "N", and the seller currency is selected currency from the currency table; selecting from above the deals for which the FX settlement (if any) has taken place; summing up the deal escrow amount for each currency into a total credit escrow amount; and passing the details by each currency and site to the banking module 38

For each currency handoff, the escrow service 10 interfaces to the banking module 38 to record the entries. A table is maintained in the escrow service 10 which has mirror records of account numbers in the banking module 38. The escrow service 10 generates a report for the escrow agent 24 which lists the details of the amounts in the funds transfer request from a DDA account to the escrow account 24. In case of no payment within the payment expected date (for example, four days in case of credit card payments and seven days in case of wire transfers or ACH), the contract is terminated as the buyer 12 failed to pay. At a pre-defined cut-off time during the day, the escrow service 10 processes all deals for which payments are over-due and cancels the deals. The financial institution absorbs the loss due to FX exchange P/L in cases of transactions involving FX which must be reversed.

The escrow service processing includes, for example, selecting all deals where buyer payment Status is "Pending" and the system date is past the payment expected date. The contract status is updated to 'Cancelled' with the system date as the cancellation date. If the buyer 12 agreed to pay the escrow fees (partly or fully), the escrow fees are waived by the system and no outstanding is applied for the escrow fees. If the seller 14 agreed to pay the escrow fees (partly or fully), the escrow fees are waived and no outstanding is applied for the escrow fees. The system keeps a track of such cancellations, and a counter 'Number of Defaults' that is maintained for each user (buyer 12) is incremented each time the user cancels a deal. Based on business decisions on the number of defaults allowed, the AOM 46 can block the user (buyer 12).

In cases where FX is involved, it is necessary for the system to initiate a FX deal with the FX data management system 30 to reverse the original FX deal. This deal is initiated as a TOM deal. This is required to convert the buyer payment which is converted to seller currency by the original FX deal into the buyer currency. The parameters passed to the FX data management system 30 are the same as at the time of payment confirmation. However, the currencies and the amounts are now reversed. There is no spread applied by the system. The amount which must be obtained due to deal reversal is the amount for which the FX deal was initiated. For example, if the original FX deal resulted in converting 1000 GBP into 1666 USD, the amount for which the deal reversal must be done is 1000 GBP. However, any FX exchange P/L must be calculated due to the difference in buy rate and sell rate. This amount is in the seller currency.

The escrow service 10 books the particular FX deal with the banking module 38 that then settles the deal. The escrow service 10 also reverses the buyer receivables that are booked at the time of payment confirmation. An email message is sent to the buyer 12 and the seller 14 that the contract has been terminated because the buyer 12 failed to pay the buyer payable amount. It will also include details such as deal ID and the cancellation date. The system calculates the amounts using pre-defined formulae and updates the database. In case of part-payment, the contract is terminated, as the buyer 12 failed to pay the buyer payable Amount. The AOM 46 attempts to reconcile, and since the reconciliation failed, the AOM 46 terminates the deal. The system updates the buyer payment status from 'Pending' to 'Failed', and the contract status is updated to 'System Reject'. The escrow service 10 absorbs the escrow fees loss (if seller 14 has agreed to pay) and the currency risks (if any) and reverses the liability entries earlier booked. An email message is sent to the buyer 12 and the seller 14 that the contract has been terminated, because the buyer 12 failed to pay the buyer payable Amount. The system keeps a track of such non-receipt of funds from the buyer 12, and a counter 'Number of Defaults' maintained for each user (buyer 12 or seller 14) is incremented each time the buyer 12 defaults a payment. Based on business decisions on the number of defaults allowed, the AOM 46 can block the "Buyer". The system computes the amount to be refunded to the buyer 12 applying the escrow fees (if buyer 12 has agreed to pay). The EOD process at the seventh day then refunds this computed amount back to the buyer 12.

Figure 34:
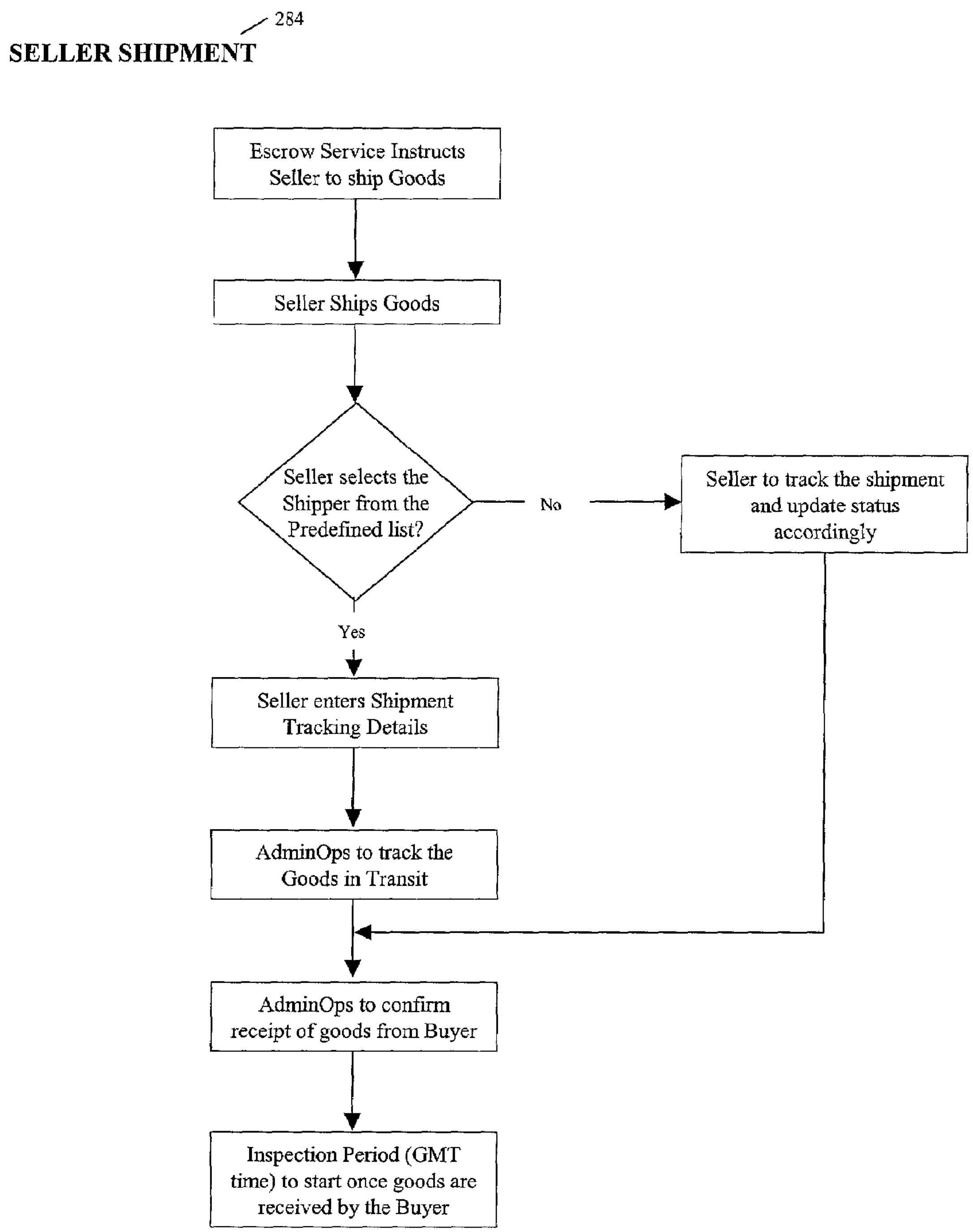
FIG. 34 is a flow chart that illustrates an example of the Seller Shipment process 284 for an embodiment of the present invention.

FIG. 34 is a flow chart that illustrates an example of the Seller Shipment process 284 for an embodiment of the present invention, and FIG. 35 shows a sample Pending Shipment Details GUI screen 286 for an embodiment of the present invention. A pending shipments function is available on the escrow service home page to both buyer 12 and seller 14. This function lists the shipments that are pending and allows the seller 14 to enter the shipment details for a deal. The seller 14 can select items individually and perform a part shipment. The seller 14 can also cancel a deal on the detail screen 286 before the first shipment. When the user is registered as a 'Buyer/Seller', the user is prompted to select the user type before he/she can see the pending shipments. When the user selects 'Buyer' as user type and clicks on 'Continue', he/she sees the list of all of pending shipments for him/her from various sellers. When the user selects 'Seller' as user type and clicks on 'Continue', he/she sees the list of pending shipments from him/her to various buyers. Status values include, for example, 'Contract Level—Accepted', 'Buyer Payment—Success', and 'Seller Shipment—Pending'.

Only the seller 14 can cancel a deal after receipt of buyer payment and before shipment of goods (first shipment). If the seller 14 has already done a part shipment, the seller 14 cannot cancel a deal. In case of cancellation of the deal by the seller 14 after receipt of the funds from the buyer 12 but before shipment, and in case the buyer 12 agreed to bear the escrow fees, the escrow fees are refunded to the buyer 12 less expenses. The loss of this refund is borne by the escrow service 10. If the seller 14 cancels the deal after payment is received from the buyer 12 but before shipment, the escrow fees, if payable by buyer 12, are shown as an outstanding/receivable from buyer 12. Regarding credit card charges, in case the deal is cancelled after the receipt of funds, the buyer 12 is given a full refund. The credit card charges paid to the card processor are posted as an outstanding receivable from the seller 14. The seller 14 cannot do part shipment at item level. If the seller 14 selects a shipment carrier different from the shipper 32 specified in the system, the seller 14 is responsible to track the shipment and inform the AOM 46. If the seller 14 does not ship goods and update the shipment details within specified period, the deal is deemed cancelled. The EOD process identifies such deals and cancels the deal and pays the buyer 12 a refund. A pending shipments list screen displays a list of all the deals for which the payment has been received from the buyer 12 (seller shipment status is 'Pending'). The list is sorted, for example, by site name, deal date (descending order) and buyer. The seller 14 can select a particular deal, view the details and update the shipment details. The buyer 12 can see the pending shipments summary screen but cannot update the details.

The Pending Shipment Details screen 286 allows the buyer 12 or seller 14 to view the details of a pending shipment. It also allows the seller 14 to select the items that he/she has shipped. By default, all the items are marked as selected for shipping. The seller 14 then enters the shipping details such as a shipment carrier from a predefined list or a shipment carrier not maintained in the system. The seller 14 also enters the tracking number and shipment date. If the seller 14 has performed part shipment for a deal, those items are not shown here. The system calculates the amounts using predefined formulae and updates the database.

If a deal is cancelled after receipt of payment (allowed to seller 14 only), the contract status is updated to cancelled with system date as the cancellation date. If the buyer 12 agreed to pay the escrow fees, the escrow fees are refunded to the buyer 12, and the amount is booked as a loss. In case of credit card payment, the credit card charges are booked against the seller 14. The system computes the amounts, for example, as the buyer refund amount equals buyer payable amount less payment charges and outstanding amount due from seller equals credit card charges (if any). If the seller 14 agreed to pay the escrow fees, the escrow fees are an outstanding amount due from the seller 14. This outstanding escrow fees amount is adjusted with future payments due to the seller 14. In case the amount cannot be recovered, it is waived. In case of a credit card payment, the credit card charges are booked against the seller 14. The system computes the amounts as the buyer refund amount equals buyer payable amount less payment charges; and outstanding amount due from seller 14 equals escrow fees plus credit card charges (if any). The system keeps a track of such cancellations, and a counter 'Number of Defaults' that is maintained for each user (buyer 12 or seller 14) is incremented each time the user cancels a deal. Based on business decisions on the number of defaults allowed, the AOM 46 can block the user (buyer 12 or seller 14). The system sends an email message to both the buyer 12 and seller 14 indicating the cancellation of the deal with details such as deal ID, cancelled by and the cancellation date.

In case of part or full rejection of shipment, the system also computes the amount of shipment rejected and the amount to be refunded to the buyer 12. The total shipment amount rejected is the sum of the goods cost and taxes of the items which have been rejected. The buyer refund amount is computed based on the shipment amount rejected and the FX rate that was quoted to the buyer 12 at deal confirmation. The system calculates the amounts using predefined formulae and updates the database. If the buyer 12 agreed to pay the amount by credit card, at a later date, the buyer 12 can cancel the contract by contacting the credit card company. In this case the bank debits the escrow service account with the deal amount. It is necessary here for the AOM 46 to terminate the contract and send email message to the seller 14 to stop the shipment of goods. If the goods are already dispatched, the seller 14 should inform the shipping company to return the goods to the seller 14. When the AOM 46 does such a termination of a contract, the buyer 12 account is 'Blocked'. The reversal of the FX deal must be performed and all the entries must be reversed.

FIG. 36 shows an example of a Tracking Shipments (including Return) GUI screen 288 for an embodiment of the present invention. A tracking shipments (including return) function allows the AOM 46 to update the tracking details of the shipments. The AOM 46 can access the tracking information based on the shipping company and the tracking number entered by the seller 14 at the time of confirmation of shipment. The tracking shipments process allows interfacing, for example, with shippers, such as UPS and FEDEX to track the shipments. If the interface cannot be given, the AOM 46 manually tracks the shipment and enters the details. The shipping company 32 is expected to update the receipt of shipment acknowledged by the buyer 12. When the goods are delivered to the buyer 12, based on the date and time recorded (GMT) by the shipping company 32, the inspection period for the contract starts. This is important, as the seller 14 is credited with the contract amount if the buyer 12 does not notify of the inspection result within the stipulated inspection period. In case the seller 14 uses a shipping carrier that is not defined in the system, it is the obligation of the seller 14 to inform the AOM 46 that the buyer 12 has received the shipment. Status values include, for example, 'Contract Level—Accepted', 'Buyer Payment—Success', 'Seller Shipment—Success', or 'Partial', and 'Buyer Shipment Receipt—Pending'. The AOM 46 retrieves the receipt information and updates this information into the escrow service 10. As a result, the buyer shipment receipt status changes from 'Pending' to 'Received'.

For the tracking shipments list function, the AOM 46 selects the type of shipment (new or return) that he/she is tracking. The AOM 46 selects the seller 14 (company/base currency pair) from a list of sellers and a list of shipments made by the seller 14 is displayed. The shipments are sorted by site ID and the shipment date. The AOM 46 can select a particular shipment and view the details. The Tracking Shipment Details screen 288 displays the details of the shipment and allows the AOM 46 to update the tracking status. In case of shipments which have been shipped, for example, by FEDEX, a daily process or a periodic process is required which automatically tracks a shipment and updates the receipt status of the shipment in the escrow service database. This process talks to the interface provided, for example, by FEDEX. Processing includes, for example, selecting all shipments which have used FEDEX as the shipping carrier and whose status is "Pending"; sending a tracking number to the FEDEX interface which returns the receipt status and the receipt date of the shipment; and computing an inspection expiry date based on the shipment receipt date and inspection period that was defined at deal level.

A tracking shipment inquiry function is available on the escrow service home page to both the buyer 12 and the seller 14 that allows the buyer 12 and the seller 14 to view the tracking details of the shipments. Only the AOM 46 can update the status of the buyer shipment receipt shipment to 'Received'. When the user is registered as a 'Buyer/Seller', the user is prompted to select the user type before he/she can see the shipments. When the user selects 'Buyer' as user type and clicks on 'Continue', he/she sees the list of all the shipments that have been shipped by sellers. When the user selects 'Seller' as user type and clicks on 'Continue', he/she sees the list of all the shipments that have been shipped to various buyers. The user is then prompted to enter a 'From Period' and 'To Period' to filter the shipments so that he/she can view only the shipments which are in the range of dates. If no range is entered, a first screen shows the last shipment (latest) and a last page shows the first shipment. The status values include, for example, 'Contract Level—Accepted', 'Buyer Payment—Success', 'Seller Shipment—Success' or 'Partial', and 'Buyer Shipment Receipt—any value 'Pending' or 'Received' or 'Accepted' or 'Rejected' or 'Partially Accepted'.

The seller 14 is responsible for tracking the shipment for a shipping company not predefined by the system. The seller 14 informs the AOM 46, who will update the tracking details of the shipment. A tracking shipments List screen displays a list of all the shipments done by the seller 14. The shipments are sorted by site name and shipment date (descending order). If the buyer 12 accesses this function, the deals are sorted by the seller 14, and if the seller 14 accesses, the deals are sorted by the buyer 12. The status column displays the status of the buyer shipment receipt. The buyer 12 or seller 14 can then select a particular deal and then view the details of tracking status updates and the item details for the particular shipment.

Figure 37:
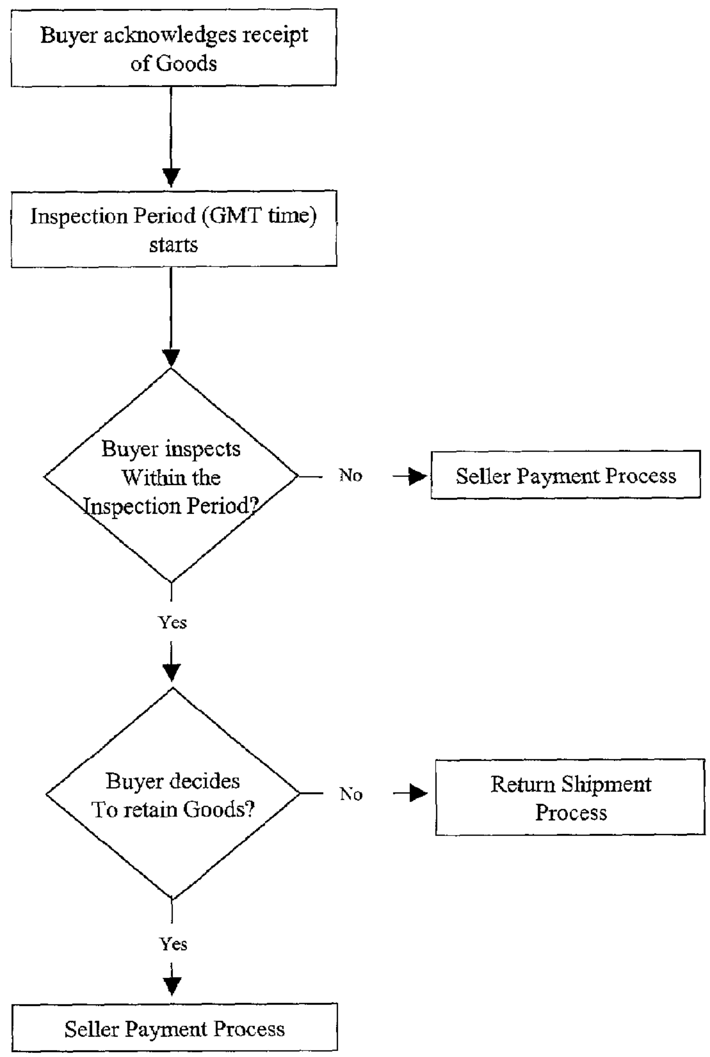
FIG. 37 is a flow chart which illustrates an example of the Buyer Inspection process for an embodiment of the present invention.

FIG. 37 is a flow chart which illustrates an example of the Buyer Inspection process 290 for an embodiment of the present invention. A pending inspections function allows the buyer 12 to update the inspection status of the shipment received from the seller 14. The status values include, for example, 'Contract Level—Accepted', 'Buyer Payment—Success', 'Seller Shipment—Success' or 'Partial', and 'Buyer Shipment Receipt—Received'. When the buyer 12 completes his/her inspection and confirms to retain the goods, the status of the seller shipment changes from 'Received' to 'Accepted'. When the buyer 12 does part acceptance of goods, the status of the seller shipment changes from 'Received' to 'Partly Accepted'. This gives permission to the escrow service 10 to give full/part credit of the contract amount payment to the seller 14. The buyer 12 cannot accept shipments partly at item level. If the buyer 12 fails to update the status within the inspection period, the system updates the seller shipment status to 'Accepted', and the seller 14 is paid for the amount of the shipment.

FIG. 38 shows a sample Shipment Inspection GUI screen 292 for an embodiment of the present invention. The Inspection at Shipment level screen 292 displays a list of all the deals for which shipment has been received by the buyer 12 (confirmed) and for which he/she has not updated the inspection status. The list is sorted by Site Name 294, Shipment Receipt Date 296 (descending order) and Seller 298. The buyer 12 can select a particular shipment, view the details and update the inspection details. The buyer 12 can decide to accept the entire shipment on the Inspection at Shipment level screen 292. When the buyer 12 wants to update the inspection status at item level of a particular shipment, he/she can select the shipment on the Inspection Shipment screen 292 and then click on a 'View Details' link. The buyer 12 can accept all or reject all items from the detail screen 292 also. On the detail screen 292, the buyer 12 can partially accept goods. Part acceptance is accepting one/few of the items of the item list. There is no part acceptance allowed at the item level. Items that are not accepted are assumed to be rejected by the buyer 12. On the detail screen 292, the Accept 300/Reject 302 are check boxes, with Accept 300 checked by default to indicate that the buyer 12 has accepted the item. If a buyer 12 needs to reject a particular item, the check box can be unchecked. The buyer 12 then clicks the "Accept Part" link 304 to accept the items that are checked.

The system computes the amount of shipment accepted by the buyer 12 and hence paid to the seller 14. The total shipment amount Accepted is the sum of the goods cost and taxes of the items which have been accepted. In case of part or full rejection of shipment, the system also computes the amount of shipment rejected and the amount to be refunded to the buyer 12. The total shipment amount rejected is the sum of the goods cost and taxes of the items which have been rejected. The buyer refund amount is computed based on the shipment amount rejected and the FX rate that was quoted to the buyer 12 at deal confirmation. The system calculates the amounts using predefined formulae and updates the database. If the buyer 12 fails to inspect the shipment within the inspection period and accept or reject the shipment, the system processes all outstanding inspections and deems them to be accepted.

At a pre-defined cut-off time during the day, the escrow service 10 processes all the shipments which are in "Received" status and whose inspection end date is past due. The system triggers an auto-acceptance of the full shipment and updates the seller shipment status to 'Accepted'.

A pending settlements inquiry function is available on the escrow service home page to the seller 14 to view the deals that are in pending settlement status. The status values include, for example, 'Contract Level—Accepted', 'Buyer Payment—Success', 'Seller Shipment—Success' or 'Partial', 'Buyer Shipment Receipt—Accepted'; and 'Seller Payment—Pending'. The seller 14 sees the list of deals executed with him/her, which are in pending settlement status from all exchange sites. These are the deals with different buyers for which the seller payment is due. The deals are sorted on site name, shipment inspection date (descending order) and buyer/seller.

At a pre-defined cut-off time during the day, the escrow service 10 consolidates the amount that needs to be moved from the escrow account 24 held with the escrow agent. The escrow service 10 then hands off a funds transfer request to move the net total amount from the escrow account 24 held with the escrow agent to the appropriate DDA Account. This request is made separately for each currency and the site is defaulted to the main branch of the banking module 38. A number of business rules apply to this process including, for example, selection criteria to determine moving funds from the escrow account to DDA accounts, such as consideration of deals for which the buyer 12 has inspected the shipment (accepted fully or accepted partly or rejected fully) and consideration of deals that have been cancelled after buyer payment was received and the funds moved into the escrow account 24. In case of part shipments and inspection of these part shipments, the amount moved from the escrow account 24 is only the amount applicable for the shipment. There is only one debit per day to the escrow account 24 for each currency. Once the amount has been moved from the escrow account 24, the escrow service 10 updates the status at the shipment level to indicate that the funds have been moved out of the escrow account 24. The accounting of this movement is done in the banking module 38.

The escrow service processing includes, for example, selecting all shipments where buyer shipment receipt status is "Accepted" or "Rejected" or "Partially Accepted" and the debit escrow account flag is "N"; summing up the shipment site commission, shipment seller payable Amount and shipment buyer payable amount for each shipment into shipment escrow amount; summing up currency wise into total debit escrow amount; selecting all deals where contract status is "Cancelled", buyer payment status is "Success", credit escrow account flag is "Y", and debit escrow account flag is "N"; summing up currency wise into total debit escrow amount; and passing the details by each currency to the banking module 38, and the escrow service 10 updates the database. For each currency handoff for funds to be moved from the escrow account 24 to a DDA account, the escrow service 10 interfaces to the banking module 38 to record the entries. A table is maintained in the escrow service 10 which has mirror records of account numbers in the banking module 38. The escrow service 10 generates a report for the escrow agent 24 which lists the details of the amounts in this funds transfer request from the escrow account 24 to a DDA Account.

Figure 39:
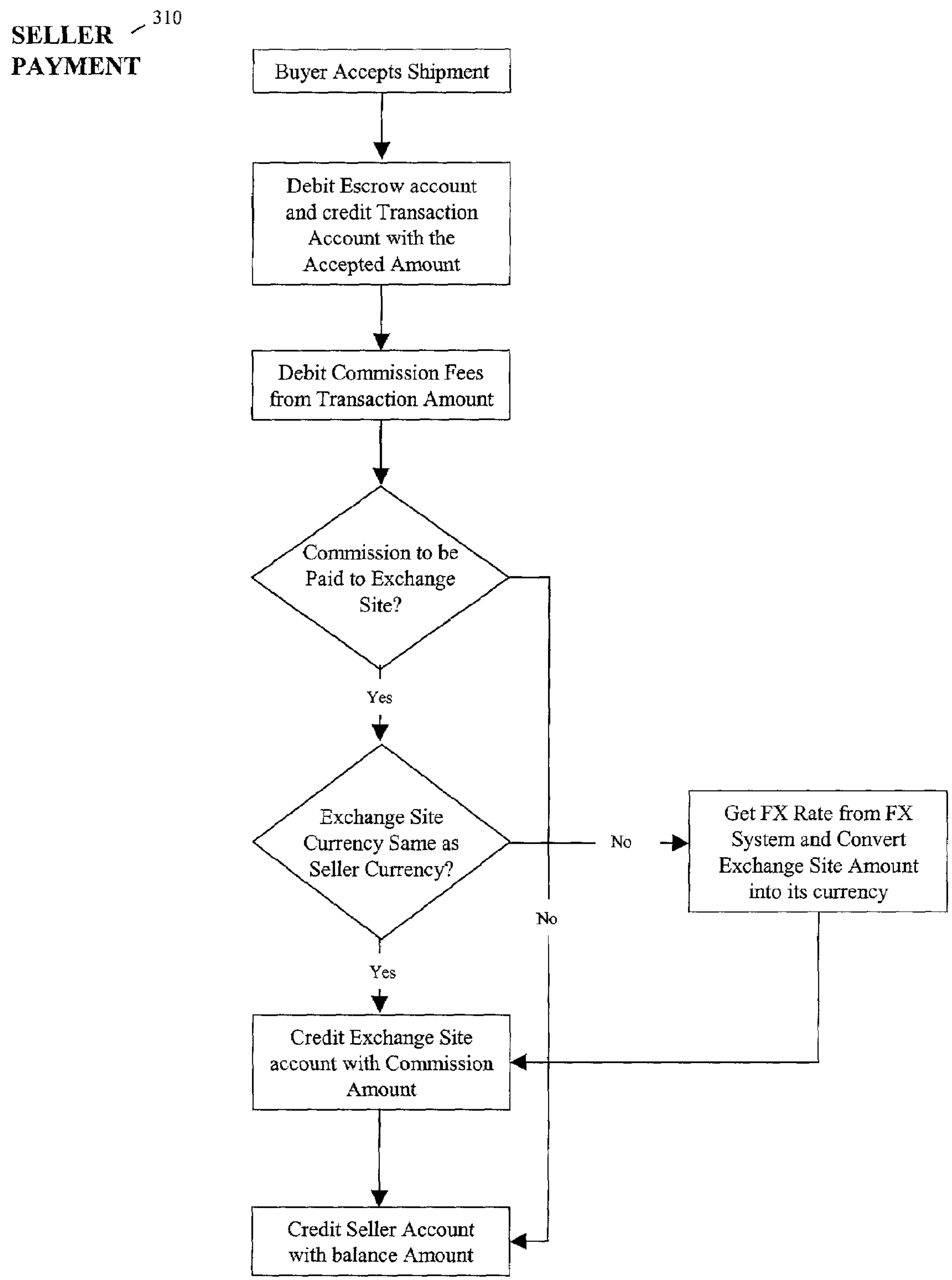
FIG. 39 is a flow chart that illustrates an example of the Seller Payment process for an embodiment of the present invention.

FIG. 39 is a flow chart that illustrates an example of the Seller Payment process 310 for an embodiment of the present invention. The escrow service 10 maintains a payment schedule for each seller. The sellers are paid either by wire transfer or ACH credit. The seller 14 sets up the method of credit payments at the time of registration. The seller 14 is paid at a periodic interval, and the payment schedule is maintained in the escrow service 10 by the AOM 46. The seller 14 is paid separately for each site, and the payments for each site are done on the same scheduled day. The seller 14 is paid for the shipments inspected and accepted by the buyer 12, and any outstanding escrow fees and credit card charges against the seller 14 for deals that are cancelled or shipments that are rejected are adjusted in the payment. Once the system has paid the seller 14, the seller 14 can view the settlement details on the online escrow service application 10. The task allows the seller 14 to drill down to the deal ID and shipment ID. When the seller 14 drills down on the settlement record, all the positive and negative amounts are displayed with the deal ID and the shipment ID (if any). For example, if the shipment accepted amount is USD 1,500 and there is outstanding on the seller 14 of USD 200 for some other previous cancelled deal, the seller 14 is paid USD 1,300. When the seller 14 drills down on the record of USD 1,300, it should show USD −200 against the cancelled deal and USD 1,500 against the shipment.

At a pre-defined interval of the day, the escrow service 10 triggers a process for seller payments. The process includes, for example, scanning the seller payment schedule table and identifying the sellers to be paid that day by the escrow service 10. For each seller, the escrow service 10 then identifies the shipments for which the buyer shipment receipt is "Accepted" or "Partially Accepted" and seller payments are "Pending" and the debit escrow account Flag is "Y". For all these payments, the system consolidates the shipment seller payable amount into a seller paid amount for each currency and each site. Each shipment record is updated where seller payment status is marked as "Success". For each seller, the system then identifies all the outstanding amounts to be recovered for escrow fees payable by seller and the credit card charges. These amounts are then added into the seller paid amount for each currency and each site. The outstanding amounts which are adjusted in this settlement are marked as recovered. The system then creates a settlement record for each seller by currency and site with the seller paid date and seller paid amount. The system then sends for each seller and currency the amount paid to the banking module 38 with the payment instructions and updates the database. For each consolidated seller payment for each site, the escrow service 10 hands off the details to the banking module 38.

Exchange site commissions payment is initiated by the AOM 46, and the exchange site 16 is paid either by wire transfer or ACH credit. The method of credit payment used for the site 16 is defined during site registration. The exchange site 16 is paid at a periodic interval and the site payment is initiated by the AOM 46. The commission payment is consolidated and paid to the site. The site commission is paid only for the shipments that are accepted (part or full) by the buyer 12. No site commissions are paid for cancelled deals and for rejected shipments. Site commissions are computed in the seller currency on the value of the goods that are accepted by the buyer 12, and the site commission is paid in the base currency of the site. The system generates a statement of site commission settlement that is sent to the site contact. The processing for exchange site payment includes, for example, consolidating the site commissions by the system for each shipment that has not been settled by site and currency.

For each consolidated amount by currency, if the currency is different than the site base currency, the system initiates an FX deal for the amount consolidated. These deals are initiated as TOM deals. The actual payments to the site are done after the FX settlement. The system then applies the customer spread on the amount. The spread calculation is similar to the calculation done at the time the contract is initiated. The system then books the FX deal with the banking module 38 and sends a future-dated payment instruction to the banking module 38 to pay the site the total consolidated amount across currencies in the site base currency. The payment instruction is done to move the site commission from the appropriate DDA Account to an exchange site settlement account. Each shipment record for which site commission has been consolidated and paid is updated to indicate commission settlement completion, and the escrow service 10 updates the database.

The escrow service 10 interfaces with the banking module 38 for processes, such as initiation of FX deals to convert all amounts to exchange site base currency and payment instruction to initiate future dated funds transfer to deliver funds to the exchange site 16. A deal credits (from sellers) function allows the seller 14 to give buyer 12 credits. A settlement statement inquiry function is available on the escrow service home page to the seller 14 only. This function allows the seller 14 to view the settlements made by the escrow service 10 to him/her. The seller 14 can drill down from the summary to the deal ID and the shipment ID with the payment instructions (wire transfer details). The seller 14 is prompted to select from a number of predefined periods for which the settlement statement is to be viewed, such as 'Last 1 week'; 'Last 1 month'; 'Last 3 months'; and 'Last 6 months'. The deals are sorted on settlement (value) date, and the seller 14 can click on an individual summary amount link and view the details of the deal ID and shipment ID. A settled deals inquiry function is available on the escrow service home page to both the buyer 12 and the seller 14 to view deals for which part or full payment has been received. The status values include, for example, 'Contract Level—Accepted'; 'Buyer Payment—Success'; 'Seller Shipment—Success' or 'Partial'; 'Buyer Shipment Receipt—Accepted'; and 'Seller Payment—Success'.

When the user is registered as a 'Buyer/Seller', the user is prompted to select the user type before he/she can see the settled deals. When the user selects 'Buyer' as user type and clicks on 'Continue', he/she sees the list of his/her settled deals executed as a 'Buyer'. These are the deals for which the part/full payments are done from the system and the seller 14 has received the amounts. When the user selects 'Seller' as user type and clicks on 'Continue', he/she sees the list of his/her settled deals executed as a seller. These are the deals with different buyers for which the part/full payment is received from the system. When the user clicks on 'Cancel', he/she is taken to the escrow service home page. The user is prompted to select a period for which the settled deals are to be viewed, such as last one week; last one month; last three months; and last six months. The deals are sorted on site name and seller/buyer.

Figure 40:
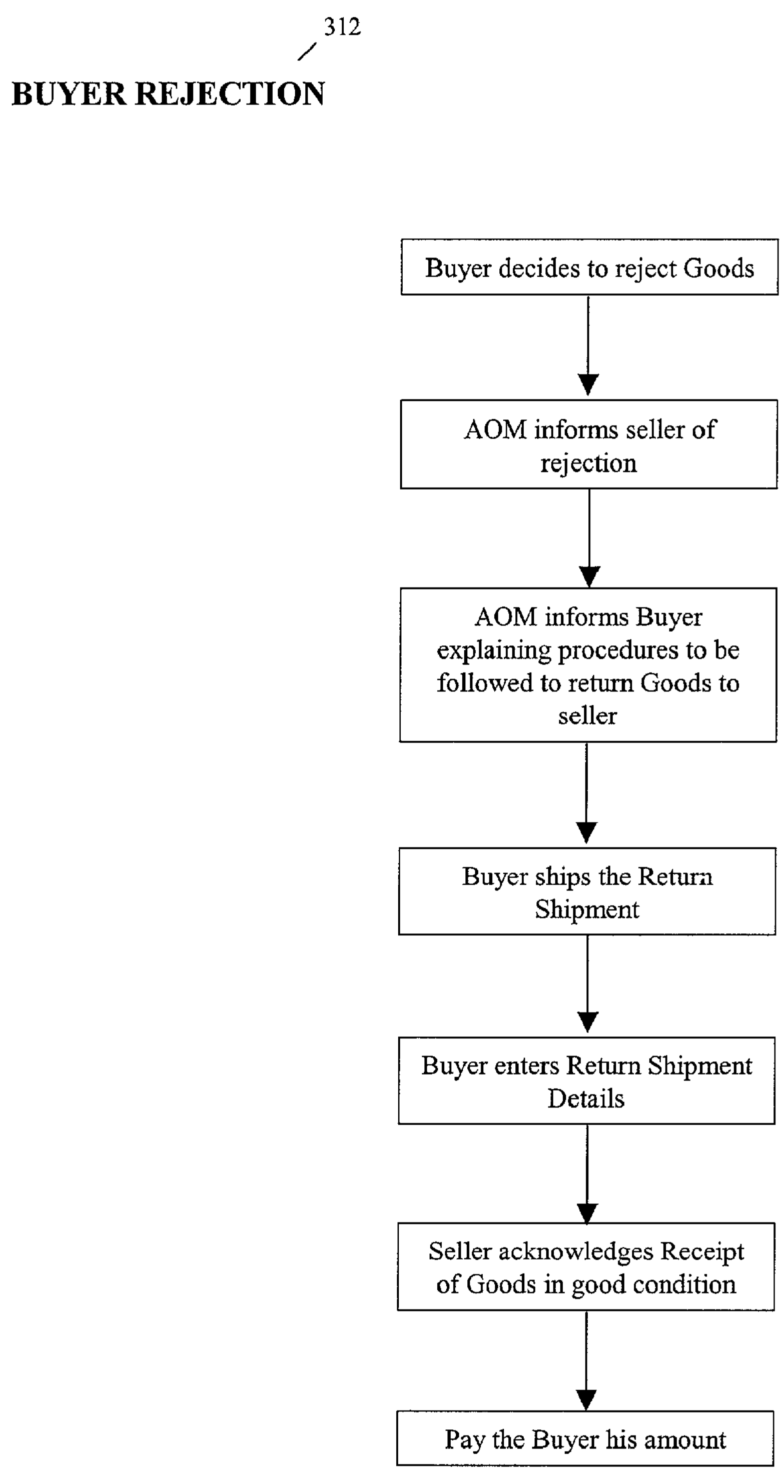
FIG. 40 is a flow chart that illustrates an example of the Buyer Rejection process.

FIG. 40 is a flow chart that illustrates an example of the Buyer Rejection process 312, and FIG. 41 shows a sample Reject Shipment Details GUI screen 314 for an embodiment of the present invention. A pending reject shipments function is available on the escrow service home page to buyers only. The status values include, for example, 'Contract Level—Accepted'; 'Buyer Payment—Success'; 'Seller Shipment—Success or Partial'; and 'Buyer Shipment Receipt level—Rejected' or 'Partially Accepted'. This function allows the buyer 12 to update the shipment details of the rejected goods. The buyer 12 enters the shipping carrier, shipping date and the tracking number of the return shipment. For a shipment done by the seller 14, if the entire shipment or a part shipment is rejected, the buyer 12 returns the goods by one return shipment only. Hence, there is no part return shipment handled by the system. Once the seller 14 confirms receipt of a rejected shipment (tracked by AOM 46 with either the shipping company 32 or buyer 12 or seller 14 informing AOM 46), the status of the 'Reject Shipment Receipt' level is updated to 'Received', and the buyer refund payment process is initiated. If the seller 14 inspects the returned goods and has a problem with the return shipment, then it is handled outside the escrow service system 10. A pending rejected shipments list screen displays a list of all the deals for which the shipments have been rejected fully or partly by the buyer 12. The list is sorted by site name, seller and deal ID and within a deal by shipment date. The user can then select a particular shipment, view the details of the rejected items and update the return shipment details. The Pending Rejected Shipments Details screen 314 allows the buyer 12 to see the items that he/she has rejected for a shipment that must be shipped back to the seller 14. The buyer 12 can enter the shipping details such as the shipping company, shipping date and the tracking code, and the escrow service 10 updates the database.

FIG. 42 shows a sample Return Shipment Tracking Details GUI screen 316 for an embodiment of the present invention. A tracking return shipment function is available on the escrow service home page to both the buyer 12 and the seller 14 that allows the buyer 12 and the seller 14 to view the tracking details of the return shipments. Only the AOM 46 can update the status of the reject shipment receipt to 'Received'. The status values include, for example. 'Contract Level—Accepted'; 'Buyer Payment—Success'; 'Seller Shipment Success' or 'Partial'; 'Buyer Shipment Receipt—Reject' or 'Partial Accept'; 'Reject Shipment—Success'; and 'Reject Shipment Receipt—Pending'. A return shipments tracking list screen displays a list of all the return shipments made by the buyer 12. The shipments are sorted by site name and shipment date (descending order). If the buyer 12 accesses this function the deals are sorted further by the seller 14, and if the seller 14 accesses, the deals are sorted further by the buyer 12. The screen also lists the reject shipment ID and the corresponding shipment ID. The buyer 12 or seller 14 can then select a particular return shipment and then view the details. A status column displays the status of the reject shipment receipt. The Return Shipment Tracking Details screen 316 displays the tracking status updates and the item details for the return shipment.

In case of cross-currency deals, the amount received from the buyer 12 in buyer currency is converted to seller currency and then moved to the escrow account 24. In case of a buyer refund due to deal cancellation or shipment rejection, the amount to be refunded must be converted from the seller 14 to the buyer currency. As a result, the buyer refund process is performed in two stages, step one of which is a buyer refund settlement process and step two of which is a buyer refund payment process. For step one, the buyer refund settlement process, in case of buyer refunds due to deal cancellation or shipment rejection, where FX is involved, the amount to be refunded to the buyer 12 must be converted to buyer currency from the seller currency before the buyer 12 is paid. The settlement process for buyer refunds is performed, for example, for deals for which the shipments which are rejected by the buyer 12, returned to the seller 14 and the seller 14 confirming receipt; deals which have been cancelled after receipt of buyer payment; FX Settlement for these records are pending (if FX is involved); and the amount has been moved from the escrow account 24 to a DDA Account. The escrow service 10 initiates a FX deal with the FX data management system 30 as a TOM deal and books the deal with the banking module 38 for settlement. The settlement process assumes that the amount to be refunded to a buyer 12 for the deal is computed by the cancellation or rejection process. Any FX losses due to this conversion will be borne by the financial institution.

At a pre-defined interval of the day, the escrow Service 10 triggers a process for buyer refund settlements. This process is a daily process and processes all buyers irrespective of the buyer payment schedule. The processing includes, for example, for each site and each currency pair, identifying the shipments by the escrow service 10 for which the reject shipment receipt is "Received", buyer refund is "Pending", debit escrow account flag is "Y" and buyer refund FX settlement status not "Success". For all these shipments, the system consolidates the buyer refund amount and determines the total amount that must be settled into the buyer currency. For each site and currency pair, the system then identifies all the cancelled deals for which buyer payment has been received and buyer refund is "Pending", debit escrow account flag is "Y" and buyer refund FX settlement status is not "Success". These amounts are then added into total amount that must be settled into the buyer currency. The escrow service 10 then initiates a FX deal with the FX data management system 30 passing the total amount to be settled (in buyer currency) and TOM for the rates. The escrow service 10 passes to the banking engine 38 the FX deal details initiated in the FX data management system 30 to cover FX requirements to convert buyer payment to seller currency. The amount returned by the FX data management system 30 is then used to compute the FX exchange P/L. Each shipment record selected is updated to make the FX settlement status "Success" and the Settlement date, and the escrow service 10 updates the database.

For step two, the buyer refund payment process, the escrow service 10 maintains a payment schedule for each buyer via an administrative function. The buyers are paid either by wire transfer or ACH credit. The buyer 12 sets up the method of credit payments at the time of registration. A buyer 12 is paid by the escrow service 10 at a periodic interval. The payment schedule is maintained in the escrow service 10 by the AOM 46. The buyer 12 is paid separately for each site, and the payments for each site are done on the same scheduled day. The buyer 12 is paid, for example, for deals for which the shipments which are rejected by the buyer 12, returned to the seller 14 and the seller 14 confirming receipt and deals which have been cancelled after receipt of buyer payment. The buyer 12 is paid only for the deals for which the FX settlement has taken place for the refunds (initiated by a separate process). The buyer 12 is always paid in the base currency that he/she registered. The escrow service 10 instructs the banking module 38 with the payment instructions and buyer details. The system generates a refund statement which lists the details for which the settlement has taken place.

At a pre-defined interval of the day, the escrow service 10 triggers a process for buyer refund payments. The processing includes, for example, scanning the buyer payment schedule table by the escrow service 10 and identifying the buyers to be paid that day. For each buyer 12, the escrow service 10 then identifies the shipments for which the reject shipment receipt is "Received" and buyer refund is "Pending" and the debit escrow account Flag is "Y". In cases where FX is involved, the buyer refund FX settlement status should be "Success" and the buyer refund settlement date should be less than or equal to the system date. For all these shipments, the system consolidates the buyer refund amount into buyer refund settlement amount by currency and by site. Each shipment record selected is updated where buyer refund status is marked as "Success". For each buyer, the system then identifies all the cancelled deals for which buyer payment has been received and a buyer refund is "Pending" and the Debit Escrow Account Flag is "Y" (or debit escrow account flag is "N" and credit escrow account flag is "N"). In cases where FX is involved, the buyer refund FX settlement status should be "Success" and the buyer refund settlement date should be less than or equal to the system date. These amounts are then added into the buyer refund settlement amount by currency and by site. Each deal record selected is updated to make the buyer refund status as "Success". The system then creates a settlement record for each buyer 12 by currency and site with the buyer paid date and buyer refund settlement amount. The system then instructs the banking module 38 to pay the buyer 12 the buyer refund settlement amount by currency and by site along with the payment instructions (including the method of payment and the beneficiary details). The escrow service 10 updates the database and generates a report for the buyer 12 that lists the details of the amount deal-wise and shipment-wise in the funds transfer to the buyer 12. There is one consolidated report for the buyer 12 sorted by currency and site name.

In case of full acceptance of the contract shipment, once the seller 14 has been paid, the reconciliation system closes the contract. In case of full rejection, once the buyer 12 has been paid, the reconciliation system closes the contract. In case of part acceptance and part rejection, only after both the seller 14 and buyer 12 have been paid, the reconciliation system closes the contract. The reconciliation process is an EOD process which tracks all the incoming payments from the buyer 12 and outgoing payments to buyer 12 and seller 14. The reconciliation process adds the escrow fees, credit card charges and wire transfer charges to the outgoing payments. If the debits and credits match, the contract is moved into 'Closed' status.

The sellers and the buyer 12 are paid by the escrow service 10 on a periodic basis. The AOM 46 maintains a payment schedule so as to stagger the payments across buyer 12 and sellers. This payment schedule drives the seller payment and the buyer refund process. Each company (membership type) has a single payment schedule. This applies to all the sites from where the company is registered. However, if a company is registered as a 'Buyer/Seller'; different schedules can apply for seller payment and buyer refunds. The payment frequencies available are, for example, daily, weekly and monthly. When the payment frequency is monthly, the day of the month is specified. When the frequency is weekly, the day of the week is specified. When the company is registered as a 'Buyer/Seller', a separate schedule for the seller payment and buyer refund is defined. This allows defining weekly payments for the company for all sales and a monthly payment for all refunds. The payment frequency and the payment day can be modified by the AOM 46 at any time. The processing includes, for example, listing the companies with the membership type by the payment schedule screen. Depending on the membership type, the AOM 46 is allowed to update the payment frequency and payment day of the company in 'Seller' or 'Buyer' mode or both. The AOM 46 can define different payment frequencies and days for the same company in different modes. The escrow service 10 updates the database.

A maintain accounts function allows the AOM 46 to maintain the accounts details (DDA and escrow) with the escrow agent 24 as a part of the currency maintenance function. This ensures that a currency is not enrolled into escrow until the DDA and escrow accounts are defined in the system. Each currency has one DDA account and one escrow account. The DDA account is quoted to the buyer 12 at the time the funds are being paid. This is the account in which the funds from wire transfer, credit card or ACH are remitted. The processing includes, for example, specifying both the DDA account and the escrow account with the escrow agent for each currency. The system validates that the account details are specified before saving the currency in the database. Modifications of the account are allowed (such as number, bank name, etc.).

In buyer payment receipt in case of credit card MOP, the amount received by the bank into the DDA account 26 is equal to the buyer payable amount. However, in case of wire transfers, the amount received may equal to the buyer payable amount or to the buyer payable amount less wire transfer fees. The wire transfer fees are accounted by applying to the buyer 12 fixed payment charges defined by currency. There is a possibility that the amount received into the DDA account 26 in case of wire transfer may be grossly different from the amount expected. In such a case, this payment should be discarded. There is also a possibility that the amount received may be slightly off from the buyer payable amount minus payment charges. This payment waive amount basically defines the maximum loss that the financial institution can take for incoming payments that are off the expected amount. The definition of this is based on payment amount range. The payment waive amount is defined based on the payment amount upper limit. The payment amount lower limit is generated by the system. The payment waive amount for an amount range can be modified by the AOM 46 at any time. The payment waive amount and the payment amount are defined in USD. The processing includes, for example, listing the payment amount upper limit and the waive amounts by the maintenance of payment waive amount schedule screen. When a new payment range must be defined, the upper limit for the payment amount is defined. The system then generates the lower limit for this range. In case the upper limit is within an existing range, the system adjusts automatically the lower limit of the next higher range. When a waive schedule for a payment range is deleted, the system automatically adjusts the lower limit of the next higher range to the lower limit of the range that was deleted. The escrow service 10 updates the database.

An escrow account breakdown by buyer or seller report gives the breakdown of the funds held in the escrow account 24 by each currency. Two types of reports include, for example, report by currency—consolidated and report by currency—individual buyer or seller. The reports list the movement of amounts from and to the escrow account 24 for each deal. A receivable by buyer report gives the breakdown of the payments receivable from buyer 12 by each currency. Two types of reports include, for example, report for all buyers by currency and report for each buyer by currency. Buyer payment received (for a period) for all buyers or a selected buyer. A buyer payment received report gives the breakdown of payment received from buyers by each currency. Two types of reports include, for example, report for all buyers by currency and report for each buyer by currency. A payable to seller (by age) for all sellers or a selected seller report gives the breakdown of payments due to sellers by each currency. Two types of reports include, for example, report for all sellers by currency and report for each seller by currency. A payable to buyer (by age) for all buyers or a selected buyer report gives the breakdown of payment due to buyer/s by each currency. Two types of reports include, for example, report for all buyers by currency and report for each buyer by currency. A site commissions payable (for a period) report gives the breakdown of site commissions payable for a period by each currency.

A credit card charges (for a period) report gives the breakdown of credit card charges for a selected period by each currency. An income statement report gives the breakdown of income from escrow fees, FX exchange P/L, payment processing P/L received by each currency. A seller payments made report is generated by the banking module 38. This report gives the breakdown of seller payments made for a given period by each currency. Two types of reports include, for example, report for all sellers by currency and report for each seller by currency. A buyer refunds made (for a period) for all buyers or a selected buyer report is generated by the banking module 38. This report gives the breakdown of buyer refunds made for a period by each currency. Two types of reports include, for example, report for all buyers by currency and report for each buyer by currency. A site commissions paid (for a period) report is generated by the banking module 38. This report gives the breakdown of site commissions paid for a selected period by each currency. If the Buyer 12 changes any condition (state), the escrow service 10 automatically sends an e-mail to the seller 14. If the seller 14 changes any condition (state), the escrow service 10 automatically sends an e-mail to the buyer 12.

Figure 43:
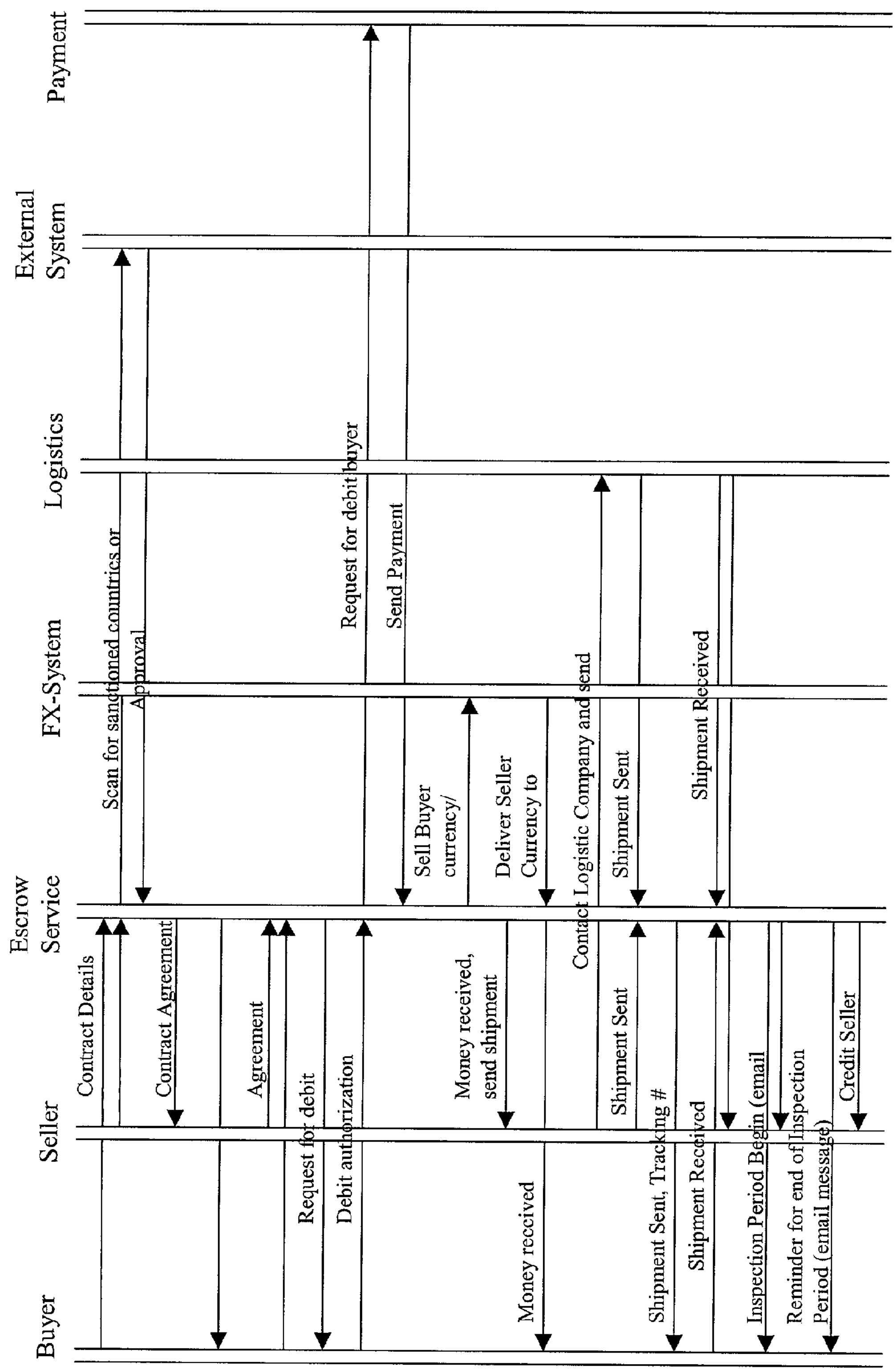
FIG. 43 shows an example of a Transaction Use Case for an embodiment of the present invention.

FIG. 43 shows an example of a Transaction Use Case 318 for an embodiment of the present invention.

A key feature of the method and system for an embodiment of the present invention is a tracking aspect. The system and the administrative staff that support the system of the present invention track and update the receipt of goods by the buyer 12 for specified logistics carriers. The system has an automatic interface with a carrier, such as FedEx. Once the seller 14 enters an input that the item was shipped by FedEx with the tracking number which FedEx provides the shipper, the system actually goes to FedEx on a automated basis on a regular schedule and requests the status of the shipment from FedEx. FedEx automatically provides this information to the system, and a report of the status is made available to both buyer 12 and seller 14. When the buyer 12 receives the goods, the goods are moved into a status of the contract in which the logistic carrier 32 has indicated that the buyer 12 has signed for the goods. This automatically generates an email message to the buyer 12 reminding the buyer 12 to acknowledge receipt of the goods. Once the buyer 12 acknowledges receipt of goods, this starts a clock within the system for the inspection time period. Otherwise, the buyer 12 can sign onto the system and update the status of the deal itself when the buyer 12 receives the goods, and the inspection period begins at that point. The buyer 12, through the techniques of the system, can either accept or reject the goods during the inspection period specified in the contract.

For an example of an important logistics feature of an embodiment of the present invention, assume that a particular shipment consisted of three line items. The buyer 12 can accept all three items, or the buyer 12 can accept only one or two of the three items. If within the inspection period, the buyer 12 accepts, for example, two of the three items shipped and indicates that the goods within the two items met the buyer's specifications, the system pays the seller 14 for only those two line items. Thus, even though the seller 14 shipped three items, the seller 14 is paid for the two items that were accepted, and the money for the one item that was rejected is returned to the buyer 12 once the rejected item(s) have been returned to the seller 14. Likewise, if three items are supposed to have been shipped by the seller 14, but only two items are available, the contract can allow a partial shipment of the two items to the buyer 12, so the system provides very sophisticated logistics on behalf of the seller 14, the buyer 12, and in conjunction with specific logistics carriers.

The shipment tracking and payment process functionality is an important aspect of an embodiment of the present invention that provides the ability to track and account for multiple line items. Although there is not a particular mathematical limit to the number of line items that the system can track and maintain, one embodiment allows, for example, up to nine items to be included within one deal which is the largest portion of a transaction. As an example of a line item, within a deal, the buyer 12 may have purchased from the seller 14 one line item which consisted of five widgets. A second line item might be five widget casings, and a third line item might be five audio components that are associated with widgets. Within the business world, those particular items may or may not be shipped, for example, in the same shipping carton, by the same shipper, or on the same day because of conditions, such as lack or availability of inventory.

A key feature of this aspect is the concept of a shipment group, which is an artificial concept that allows sellers to create a total flexibility when aggregating shipments designated to a specific buyer. For example, in the foregoing example, there are three line items. The lowest level of a shipment group is a shipment group that is equivalent to a line item. However, a shipment group can be a combination of the first and second line items, with a second shipment group being the third line item. It may also be that the first line item number is one shipment group, and the next day the second and third line items are pulled together by the seller 14 using the system to create a second shipment group. In an instance where there are, for example, nine line items for a particular deal, there can be any combination of shipment groups up to nine shipment groups. There can be anywhere from one shipment group up to nine shipment groups.

There can be shipment groups created by the seller 14 that are shipped on one day, another shipment group created the next day, and a third shipment group created on a subsequent day. The system for an embodiment of the present invention maintains the connectivity between all of these shipment groups and the respective carriers that are used to deliver the goods from the seller 14 to the buyer 12. The tracking of a particular line item is part of a shipment group, but the system allows both the buyer 12 and the seller 14 to access information at the shipment group level and/or at the line item level. This important feature allows maximum flexibility by sellers and still allows the buyer 12 to receive and accept or even receive and reject individual line items as they are processed during the normal course of business. Control shipment group codes are created for this purpose and are carried right through the settlement of the entire deal transaction.

The system of the present invention keeps track of the inspection period and notifies the buyer 12 by email that the time frame for inspecting the goods is expiring. If the buyer 12 inspects and accepts the goods within the inspection period, the seller 14 is automatically paid the due amount and the exchange 16 is paid any commission fees that are due it. The buyer 12 can reject the entire shipment or part of the shipment. If the buyer 12 rejects a shipment fully or partially, the buyer 12 must send the rejected goods back to the seller 14. In case of partial rejection, the seller 14 is paid for the goods that are accepted by the buyer 12. Once the seller 14 confirms the receipt of the goods that the buyer 12 rejects, the buyer 12 is refunded the money due for those rejected goods.

For those goods that are accepted by the buyer 12, the system of the present updates its internal statuses, along with its internal banking engine 38, pulls the funds put into escrow for the transaction out of the escrow account 24 to a transaction account, and forwards the funds by an agreed upon method of payment to the seller 14. Sellers can allow the system to credit their accounts automatically, in which case this is done. No checks or cash are handled by the system, and all funds movements are electronic. Another part of the settlement process by the system includes the ability of the system to extract commission payments that may be due to the exchange 16 and the ability of the system to collect those payments and to periodically pay them to the exchange 16. This is another important aspect of the system for an embodiment of the present invention.

Turning now to a more detailed explanation of the shipment tracking and payment process and the shipping group concept for an embodiment of the present invention, assume the buyer 12 and seller 14 conclude a deal using the escrow service 10; the buyer 12 remits funds to the escrow service 10; the AOM 46 reconciles payments when received; and the escrow service 10 e-mails the seller 14 that funds have been received. A deal consists, for example, of one to nine line items, and a line item can consist, for example, of one to nine individual shipments designated by shipper tracking numbers. The shipment group is an artificial concept borne to allow sellers to maximize flexibility when aggregating shipments designated to a specific buyer. A shipment group, at its most basic, is one line item with one to nine tracking numbers. Conceptually, one line item with one tracking number is the same as one line item with nine tracking numbers. A shipment group, at its most complex, is nine line items of a deal. Tracking numbers of a specific line item are never a part of more than one shipment group.

The system generates a control shipment group code at the pending shipment detail status for each line item of the deal. If there are four line items in a deal, the system presents to the seller 14 four shipment groups designated, for example, shipment group A, shipment group B, shipment group C, and shipment group D. It is mandatory that a seller selects at least one shipment group from the list created by the line items for the deal. The seller 14 can select any of the available shipment groups available, as long as at least one is selected (e.g., if four shipment groups are available, the seller 14 can ship all line items under shipment group C). The seller 14 can assign line items at will for each shipment group available. The system generates a unique numeric ID for each shipment group in a deal. Upon the "Save", the system assigns the randomly generated ID's, provides a message to the user stating that ID's have been created, and moves the shipment group(s) saved to the shipment tracking status. The buyer 12 is able to inspect and accept items at the line item level at the inspection screens.

The system updates an "Edit Tracking Details for Shipment Group" field as a seller 14 selects a shipment group for each line item. The system does not repeat a selection in this field if the seller 14 repeats a selection at a "Pending Shipment Details" portion of the screen. If a line item is not designated with a shipment group, it is assumed that the line item is not shipped, and the deal, with the line item(s) without an assigned shipment group remain in a pending shipment status. A line item that has no assigned shipment group can be assigned a shipment group at a later date. It is to be noted that if multiple Line Items are aggregated to a shipping group, it may be that there are fewer unshipped line items, than are shipping groups available. The system, when the user "Saves" his data by selecting the "Save" button, matches unused line items to unused shipping groups, and discards unneeded shipping groups. For example, assume that there are nine line items and three of which are aggregated to shipping group A; three of which are aggregated to shipping group D. Three are unshipped when the user hits a 'Save' button. There are now three line items unshipped. The system "cleans up" the available shipping groups to allow A, B, and C, and the others are discarded.

When a shipment group code is selected at the "Edit Tracking Details for Shipment Group", the seller 14 is able to enter up to nine tracking numbers for a shipment group. The screen shows five, and the user is able to add incremental lines. The system automatically saves the inputs for each line, unless the data is cleared. There is a comments field associated with each tracking number item. The seller 14 is able to enter up to two lines of comments with each line allowing up to 35 characters. There is a pop-up calendar associated with the date field, and is entered as mmddyyyy. The status for any data within a shipment group advances to the next status when a 'Save' button is pressed. If a 'Cancel Deal' button is pressed, a warning is given to the user, and if the intent is confirmed, the deal is cancelled and the appropriate e-mails are sent to the parties.

A user view mode selection screen is shown to any user that is registered as both a 'Buyer' and a 'Seller'. Otherwise the selection of "Tracking Shipments" from a secondary navigation bar takes the user to a tracking shipments selection screen. The first two selection boxes, for example, are the date range boxes for "From Shipping Date" to "To Shipping Date". A pop-up calendar is associated with the date field, and is entered as mmddyyyy. The selection includes the 'To' and 'From' dates within the search criteria. The user is presented with four selection boxes. An exchange site selection box is pre-populated with all exchange sites with whom the user has open items in a shipping status. A last box is labeled, for example, "Seller" if the user is the buyer 12 and "Buyer" if the user is the seller 14. The user is allowed to select from all counterparts with whom it has at least one open deal with in a shipping status. A deals database is searched for applicable deals when a "Search" button is pushed. Other display screens include, for example, a tracking summary screen and a tracking detail screen.

An additional important aspect of the method and system for an embodiment of the present invention is the internal banking mechanism 38. When funds come in to the system, a sub-account is set up with an internal banking system 38 that is integral to the process, such that the funds that were expected are reconciled with the funds due, and a movement of funds is then initiated through this banking mechanism to a separate DDA Account, so that funds are segregated for the customer as previously mentioned. When goods are received and the status of the transaction is updated to indicate that the goods are received and inspected and approved by the buyer 12, the system itself recognizes that it must get a certain amount of the seller's funds out of the escrow system, and those funds are moved from the escrow account 24 to the system transaction account prior to delivery to the seller 14. This again is an important feature of the system in which all of these processes are integrated, so that accuracy and timeliness criteria are met by the system for both buyer 12 and seller 14 for the exchange 16.

The banking module 38 that handles short-term transactions within the escrow service 10 is an important feature of the totality of the system for an embodiment of the present invention, which goes beyond the provision of the registration module 34 and the transaction module 36. An item of banking software is used to create for each major entity a branch, and within that branch each buyer and seller becomes a customer. Further, each customer has a series of accounts, and these accounts are all recorded. All of the recording of all movements in these accounts is maintained within the banking system 38, and customer statements are used by the system for reconciliation purposes. As transactions within the transaction module 36 change statuses, or activities take place. the status of these activities, represented as a status change, is communicated from the transaction module 36, or in case of registration, the fact that a registration has been successfully completed or even has been initiated is communicated by the registration module 34 to the banking module 38. Based upon this, the banking module 38 performs a series of actions.

For example, the fact that the buyer 12 sends money to a bank account that the system maintains is not unique, but the fact that the internal banking module 38 expects that money is unique. When a reconciliation is performed and that money is accepted, the banking module 38 automatically performs a series of actions, for example, to collect all monies due for a day and to move money from a transaction account to an escrow account or from an escrow account to a transaction account. The banking module 38 automatically sets up these accounts upon successful registration. The banking module 38 automatically tracks through a series of online reports the recording and reconciliation of these activities. Based on an instruction from the escrow service 10, the banking module 38 automatically generates a request execute for an exchange deal. Based on instructions from the escrow service 10, the banking module 38 automatically generates the confirmation and the settlement of that deal. The banking module 38 generates money movement and funds transfer messages based on instructions from escrow service 10.

Thus, the system for an embodiment of the present invention effectively provides a passive banking engine 38 that creates an entire communications network between the transaction module 36 and the banking module 38, such that the banking engine 38 functions semi-autonomously based on instructions given to it by the main transaction module 36. The combination of these activities and how that process is handled allows tremendous expansion, because more branches can be created and set up. In other words, within the banking network, additional branches can be created and additional activities performed. An electronic branch is effectively created to perform activities, and within that branch, not only are monies passively received and the fact that monies have been received into a DDA account recorded, but based on the instructions by the controlling transaction module 36, the branch actively performs the entire series of activities.

The banking engine 38 for the escrow service 10 maintains detailed accounts for each buyer and seller registered on the site and the financial books will be published from the banking engine 38. In addition, all FX and money settlement functions will be performed within the banking engine 38. The escrow service 10 supports several methods of payment, including credit cards, and authorized ACH or equivalent direct debit/credits. All funds movements are electronic. It supports transaction level detail through its banking engine accounts; funds movements from its currency accounts, and will escrow funds to currency based escrow accounts. The escrow service 10 is the transaction engine for the escrow services. Buyers and sellers directly interact using the web interface provided by the escrow service 10. The escrow service 10 has the business rules to track the escrow transaction from the initiation stage through to settlement and computes all the transaction amounts, fees and commissions that are required to be paid/received. The escrow service 10 interface with the Banking engine 38 for functions, such as accounting engine functionality, FX processing engine functionality, currency services functionality, and money settlement functionality. The accounting engine functionality maintains separate financial books for each exchange site with its own base currency; sets up of accounts for each buyer and seller registered in the escrow service 10; provides detailed financial accounting of all buyer and seller transactions; maintains the General Ledger for the escrow service 10, and produces the Trial Balance, Balance Sheet and Profit and Loss Statement for the escrow service 10.

The FX Processing Engine functionality processes all cover FX deals done with the financial institution for converting buyer payments to seller currency, generates FX Confirmations and sends them to CMS for confirmation matching, and provides FX Deal Accounting and FX Deal Settlement. The Currency Services functionality provides indicative rates and currency conversions for the escrow service 10. The Money Settlement functionality Maintains DDA and Escrow Accounts and all movements, Generates Payment Instructions for account transfer from DDA account to escrow account 24 and vice-versa, and Generates Payment Instructions for payment to seller settlement account.

The primary user of the banking engine 38 is the escrow service 10 through a well-defined computer user interface. For each of the above-mentioned functions within the banking engine 38 scope, the escrow service 10 initiates a transaction to the banking engine 38, and the banking engine 38 performs the accounting and settlements functions as specified in the transaction request. The escrow service 10 initiates these requests not as part of the online transaction between the buyer 12 or seller 14 but will initiates these requests to the banking engine 38 on a deferred basis either one transaction at a time or multiple transactions in the same request. All transactions initiated by the escrow service 10 are auto authorized in the banking engine 38 and do not require any manual intervention to process the requests. In case of any error encountered during the processing of the transaction request, the banking engine 38 returns an error code to the escrow service 10.

The escrow service 10 supports transactions originating from multiple exchanges and buyers and sellers registering in the escrow service 10 from multiple exchanges. The banking engine 38 is configured to support multiple exchanges, each with its own base currency, financial books and profit and loss tracking. Each site is represented in the banking engine 38 as a separate branch each with its own base currency. This allows the banking engine 38 to have separate financial books for each exchange and it can be done in the currency of choice of the exchange 16. All buyers and sellers are set up as customers in the banking engine 38, each with their own unique customer ID. In addition, accounts are opened for each buyer and seller to record all payables and receivables. These accounts are operated by the escrow service application 10 based on the transactions initiated in the escrow service 10 and the business rules in the escrow service 10 that govern the escrow application 10.

A further important aspect of the escrow service 10 for an embodiment of the present invention is, for example, the functionality that allows the buyer 12 to pay in one currency and the seller 14 to receive payment in a different currency. Thus, a foreign exchange component is built into the system of the invention. For example, the buyer 12 comes online and sees an exchange rate and wishes to go ahead and transact a particular deal. The financial institution performs what is called a forward, in which the financial institution basically enters into a contract that provides, for example, that in four days the financial institution wishes to sell one currency and receive a different currency. In doing that, the financial institution actually takes on a risk, called a pre-settlement risk, in that if the buyer 12 does not send the currency to the financial institution that it intends to sell to execute on its forward, the financial institution may have to reverse the forward. The risk exposure to the financial institution is, for example, a possibility of change in the currency exchange rate. Thus, if the buyer 12 does not send the currency, the financial institution must basically reverse the forward, and if the exchange rates have moved adversely, the financial institution will suffer a loss. The financial institution does not suffer a loss of the entire principal amount, but it must reverse that forward and may lose out on the amount of foreign exchange movement.

The system of the present invention includes, for example, several built-in controls in the system that enables the financial institution to limit this risk. A first built-in control sets a limit by currency on the size of any transaction that can be subject to a foreign exchange deal. For example, a user may not be able to come in and perform a million dollar deal through escrow when the user wishes to include a currency exchange. Thus, the system provides a capability to input a particular dollar limit on a foreign exchange deal that can be monitored and changed. Another control is that overall, for a particular day, the system imposes a limit to the total dollar amount of transactions involving foreign currency exchange and/or across currencies. For example, the system can impose a limit on the amount Euros the financial institution has outstanding. A further control involves a capability to have a credit line on a customer by customer basis, so that any one customer cannot come into the system and use up the entire limit for a particular currency. Thus, the system for an embodiment of the present invention enables imposing limits on the individual transaction by currency, the total outstanding based on value dates, and the total outstandings across a particular currency.

The currency risk management feature allows the escrow service application 10 to control the allowable maximum amount size of each deal for the related currency and further prevents the escrow service 10 from exceeding the allowable maximum outstanding limit for each currency. The escrow service 10 takes a conservative approach in which the limits are defined lower than the ones defined in the FX data management system 30. Additionally, the escrow service 10 controls the risk management at customer level by means of customer pre-settlement exposure limit amount. The running totals are applied to the currency, regardless of buying or selling.

Each currency has a specific currency delivery limit amount, and when that limit is reached, the escrow service 10 prevents new deals for the currency in question. The running total amount employs the concept, in which, if the running total exceeds the specific currency delivery limit amount, no new deals for that currency are allowed until the payments can be applied to the running total. The specific currency delivery limit concept is specific to the escrow service application 10. However, it is closely related, for example, to a delivery limit of the FX data management system 30. The escrow service 10 itemizes the delivery limit amount for each currency and calls it specific currency delivery limit. At no time will the sum of all specific currency delivery limit amounts exceed the delivery limit amount. The maximum transaction limit amount controls the maximum allowable total deal size. For a given deal, the total deal size cannot exceed this amount. Similarly, the customer pre-settlement exposure limit provides a limit in which the customers can submit their transactions as long as the limit is not exceeded. The new pre-settlement exposure associated with each transaction is calculated using a pre-settlement exposure conversion factor, added to any existing customer pre-settlement exposure, and compared to the customer pre-settlement exposure limit.

For an example, assume the buyer's currency is Chilean Peso (CLP) and the seller's currency is GBP. The buyer 12 initiates a deal, and the escrow service 10 gets the indicative rate and the USD equivalent amount for both currencies from the banking engine 38. Based on the lesser value of the USD equivalent amount, the escrow service 10 decides to apply the currency risk consideration to CLP. The escrow service 10 calculates the pre-settlement exposure for the transaction. This is calculated by multiplying the PSE conversion factor for the CLP by the USD equivalent transaction amount. The escrow service 10 checks whether the total deal amount (USD equivalent) is less than the customer's customer pre-settlement exposure limit amount. If the customer already has pending deals, the logic is such that the running total for customer pre-settlement exposure plus the new deal—customer pre-settlement exposure must be less than the customer pre-settlement limit amount specified. If the above condition holds true, the transaction proceeds to the next step; otherwise, the transaction is stopped and an explanatory message is displayed denying the transaction.

The system for an embodiment of the present invention enables buyers and sellers to receive a series of status reports by which either the buyer 12 or the seller 14 can select transactions within a defined status system and review their details. There are numerous such status reports including, for example, status reports for pending deals, pending payments, pending shipments, tracking shipments, pending inspections, pending settlements and settled deals. All of these status reports are created online and on the fly, such that the latest information is electronically available to both buyers and sellers.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the scope of the present invention.

What is claimed is:

1. A method of escrow service for web-based transactions, comprising:

registering an exchange site on a registration module on an escrow service server by an admin operations manager of the escrow service, registering a user as at least one of a buyer and a seller on the registration module of the escrow service server by the admin operations manager via the registered exchange site;

receiving information by a transaction module on the escrow service server for a transaction for the user registered as a buyer with a second user registered as a seller from the exchange site via a link, the transaction information comprising at least a selection of a method of payment for the user registered as the buyer;

receiving an acceptance for the user registered as the buyer of a currency exchange rate by the transaction module based on a currency exchange rate quote received from a currency exchange data management system via a banking module on the escrow service server, if a buyer currency pre-selected by the user registered as the buyer and a seller currency pre-selected by the user registered as a seller are different;

receiving a buyer payment for the transaction by the transaction module from the user registered as the buyer in the buyer currency according to the method of payment selected by the user registered as the buyer, if the user registered as the buyer elects to proceed with the transaction and executes the buyer payment;

allowing the user registered as the seller to enter tracking details of a shipment for the transaction on the transaction module, if the buyer payment is received and if the user registered as the seller elects to proceed with the transaction and ships at least part of the goods;

receiving an acknowledgement by the transaction module for the user registered as the buyer of receipt of the shipment, if the user registered as the seller ships at least part of the goods;

initiating a predetermined period of time by the transaction module for inspection of the shipment by the user registered as the buyer, if the shipment is received by the user registered as the buyer;

initiating a transfer of at least part of the buyer payment to a seller transaction account for the user registered as the seller in the seller currency according to a preselected seller method of payment by the transaction module via the banking module upon the occurrence of one of receipt by the transaction module of an election by the user registered as the buyer of acceptance of the shipment and an expiration of the inspection period before receipt by the transaction module of an election by the user registered as the buyer of rejection of the shipment;

initiating a return of at least part of the buyer payment to the user registered as the buyer in the buyer currency according to the buyer method of payment by the transaction module upon receipt by the transaction module of the election of the user registered as the buyer of rejection of the shipment before the expiration of the inspection period; and wherein receiving the acceptance of the currency exchange rate based on the currency exchange rate quote received from the currency exchange data management system further comprises:

receiving a currency exchange rate quote from the currency exchange data management system on a real time, one-off basis that depends at least in part on the method of payment selected by the buyer and that is valid only during a predetermined window of time after receipt of the quote by the user registered as the buyer, the currency exchange rate quote being computed using a pre-determined forward rate that depends at least in part on the method of payment, the method of payment being selected from a group consisting at least in part of credit card, wire transfer, and automated clearing house, and the pre-determined forward rate used in computing the rate quote for the credit card method of payment being different from the pre-determined forward rate used in computing the currency exchange rate quote for either of the wire transfer or automated clearing house methods of payment, performing a currency exchange on a real time basis according to the quoted currency exchange rate for the customer registered as the buyer upon the occurrence of one of receipt of an acceptance of the rate quote from the user registered as the buyer within the predetermined window of time and receipt of an acceptance of the rate quote from the user registered as the buyer outside the predetermined window of time absent a change in a market currency exchange rate, and receiving a succeeding currency exchange rate quote from the currency exchange data management system on a real time, one-off basis that is valid only during a succeeding predetermined window of time after receipt of the quote by the user registered as the buyer if an acceptance of the rate quote from the user registered as the buyer is received outside the predetermined window of time and there is a change in the market currency exchange rate.

2. The method of claim 1, wherein registering the exchange site further comprises allowing the exchange site to initiate an application form to register, the application form including exchange site details information.

3. The method of claim 2, wherein allowing the exchange site to initiate the application form further comprises performing a verification of the exchange site details information by the admin operations manager.

4. The method of claim 3, wherein performing the verification further comprises verifying a credit capability, a financial backing, and a business capability of the exchange site.

5. The method of claim 4, wherein performing the verification further comprises registering the exchange site by the admin operations manager, if the verification is successful.

6. The method of claim 1, wherein registering the user further comprises allowing the user to submit user registration information on a web site of the escrow service via the registered exchange site.

7. The method of claim 6, wherein allowing the user to submit the user registration information further comprises performing a validation of the user registration information by the admin operations manager.

8. The method of claim 7, wherein performing the validation further comprises validating the user registration information according to predefined credit, know-your-customer, and anti-money laundering banking standards.

9. The method of claim 8, wherein performing the validation further comprises updating the registration for the user to an active status by the admin operations manager, if the validation is successful.

10. The method of claim 1, wherein receiving the transaction information further comprises receiving the selection for the user registered as the buyer of the method of payment for the transaction selected from a group of electronic payment methods consisting of a wire transfer, a credit card account charge, and an automated clearing house debit.

11. The method of claim 1, wherein receiving the buyer payment further comprising notifying the user registered as the seller by the transaction module to ship goods according to the transaction, if the buyer payment is received by the transaction module within a predetermined period of time.

12. The method of claim 1, wherein receiving the buyer payment further comprising notifying the user registered as the seller by the transaction module of cancellation of the transaction, if the buyer payment is not received by the transaction module within the predetermined period of time.

13. The method of claim 1, wherein allowing entry of the tracking details further comprises tracking the shipment and updating receipt by the user registered as the buyer of the shipment by the admin operations manager on the transaction module, if the user registered as the seller ships at least part of the goods.

14. The method of claim 1, wherein initiating the inspection period further comprising allowing the user registered as the buyer an election of one of acceptance of the shipment and rejection of the shipment within the inspection period.

15. The method of claim 14, wherein initiating the inspection period further comprising confirming an acceptance of the shipment, if no rejection is received by the transaction module from the user registered as the buyer within the inspection period.

16. The method of claim 1, wherein initiating the transfer of at least part of the buyer payment further comprises initiating the transfer of at least part of the buyer payment to a transaction account for the exchange site for a commission on the transaction in a preselected exchange site currency by the transaction module via the banking module.

17. A system for escrow service for web-based transactions, comprising:

a registration module on an escrow service server that is adapted for registering an exchange site by an admin operations manager of the escrow service, wherein the registration module is also adapted for registering a user as at least one of a buyer and a seller by the admin operations manager via the registered exchange site;

a transaction module on the escrow service server that is adapted for receiving information for a transaction for the user registered as the buyer with a second user registered as the seller from the exchange site via a link, the transaction information comprising at least a selection of a method of payment for the user registered as the buyer, and wherein the transaction module is also adapted for receiving an acceptance for the user registered as the buyer of a currency exchange rate, if a buyer currency pre-selected by the user registered as the buyer and a seller currency pre-selected by the user registered as a seller are different;

a banking module on the escrow service server that is adapted for furnishing the currency exchange rate quote to the transaction module, the currency exchange rate being received from a currency exchange data management system coupled to the banking module; and wherein the transaction module is further adapted to receive a buyer payment for the transaction from the user registered as the buyer in the buyer currency according to the method of payment selected by the user registered as the buyer, if the user registered as the buyer elects to proceed with the transaction and executes the buyer payment; to receive entry by the user registered as the seller of tracking details of a shipment for the transaction, if the buyer payment is received and if the user registered as the seller elects to proceed with the transaction and ships at least part of the goods; to receive an acknowledgement for the user registered as the buyer of receipt of the shipment, if the user registered as the seller ships at least part of the goods, and to initiate a predetermined period of time for inspection of the shipment by the user registered as the buyer, if the shipment is received by the user registered as the buyer; to initiate a transfer of at least part of the buyer payment to a seller transaction account for the user registered as the seller in the seller currency according to a preselected seller method of payment by the transaction module via the banking module upon the occurrence of one of receipt by the transaction module of an election by the user registered as the buyer of acceptance of the shipment and expiration of the inspection period before receipt by the transaction module of an election by the user registered as the buyer of rejection of the shipment; and to initiate a return of at least part of the buyer payment to the user registered as the buyer in the buyer currency according to the buyer method of payment upon receipt by the transaction module of the election of the user registered as the buyer of rejection of the shipment within the inspection period;

wherein the transaction module for receiving an acceptance for the user registered as the buyer of a currency exchange rate is further adapted:

for receiving a currency exchange rate quote from the currency exchange data management system on a real time, one-off basis that depends at least in part on the method of payment selected by the buyer and that is valid only during a predetermined window of time after receipt of the quote by the user registered as the buyer, the currency exchange rate quote being computed using a pre-determined forward rate that depends at least in part on the method of payment, the method of payment being selected from a group consisting at least in part of credit card, wire transfer, and automated clearing house, and the pre-determined forward rate used in computing the rate quote for the credit card method of payment being different from the pre-determined forward rate used in computing the currency exchange rate quote for either of the wire transfer or automated clearing house methods of payment, for performing a currency exchange on a real time basis according to the quoted currency exchange rate for the customer registered as the buyer upon the occurrence of one of receipt of an acceptance of the rate quote from the user registered as the buyer within the predetermined window of time and receipt of an acceptance of the rate quote from the user registered as the buyer outside the predetermined window of time absent a change in a market currency exchange rate, and for receiving a succeeding currency exchange rate quote from the currency exchange data management system on a real time, one-off basis that is valid only during a succeeding predetermined window of time after receipt of the quote by the user registered as the buyer if an acceptance of the rate quote from the user registered as the buyer is received outside the predetermined window of time and there is a change in the market currency exchange rate.

18. The system of claim 17, wherein the registration module is further adapted for allowing the exchange site to initiate an application form to register, the application form including exchange site details information.

19. The system of claim 18, wherein the registration module is coupled to at least one external system for verification of the exchange site details information by the admin operations manager.

20. The system of claim 19, wherein the escrow service server is coupled to the external system for verification of at least one of a credit capability, a financial backing, and a business capability of the exchange site.

21. The system of claim 20, wherein the registration module is further adapted for registration of the exchange site by the admin operations manager, if the verification is successful.

22. The system of claim 17, wherein the registration module is further adapted for allowing the user to submit user registration information on a web site of the escrow service via the registered exchange site.

23. The system of claim 22, wherein the registration module is coupled to at least one external system for validation of the user registration information by the admin operations manager.

24. The system of claim 23, wherein the registration module is coupled to the external system for validating the user registration information according to predefined credit, know-your-customer, and anti-money laundering banking standards.

25. The system of claim 24, wherein the registration module is further adapted for updating the registration for the user to an active status by the admin operations manager, if the validation is successful.

26. The method of claim 17, wherein the transaction module is further adapted to receive a selection for the user registered as the buyer of the method of payment for the transaction selected from a group of electronic payment methods consisting of a wire transfer, a credit card account charge, and an automated clearing house debit.

27. The system of claim 17, wherein the transaction module is further adapted to notify the user registered as the seller to ship goods according to the transaction, if the buyer payment is received by the transaction module within a predetermined period of time.

28. The system of claim 17, wherein the transaction module is further adapted to notify the user registered as the seller of cancellation of the transaction, if the buyer payment is not received by the transaction module within the predetermined period of time.

29. The system of claim 17, wherein the transaction module is further adapted to allow tracking the shipment and updating receipt by the user registered as the buyer of the shipment by the admin operations manager, if the user registered as the seller ships at least part of the goods.

30. The system of claim 17, wherein the transaction module is further adapted to allow the user registered as the buyer an election of one of acceptance of the shipment and rejection of the shipment within the inspection period.

31. The system of claim 30, wherein the transaction module is further adapted to confirm an acceptance of the shipment, if no rejection is received by the transaction module from the user registered as the buyer within the inspection period.

32. The system of claim 17, wherein the transaction module is further adapted to initiate a transfer of at least part of the buyer payment to a transaction account for the exchange site for a commission on the transaction in a preselected exchange site currency by the transaction module via the banking module.

* * * * *